US012789301B2

(12) United States Patent
Brockway

(10) Patent No.: US 12,789,301 B2
(45) Date of Patent: Nov. 10, 2026

(54) AUTOMATED FASTENER SYSTEM HAVING AUTOMATED WASHER INSTALLATION

(71) Applicant: The Boeing Company, Arlington, VA (US)

(72) Inventor: Monica J. Brockway, Bothell, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 19/297,997

(22) Filed: Aug. 12, 2025

(65) Prior Publication Data

US 2025/0367772 A1 Dec. 4, 2025

Related U.S. Application Data

(62) Division of application No. 18/679,236, filed on May 30, 2024, now Pat. No. 12,434,337.

(51) Int. Cl.
*B23P 19/08* (2006.01)
*B23P 19/00* (2006.01)
(Continued)

(52) U.S. Cl.
CPC ............. *B23P 19/08* (2013.01); *B23P 19/002* (2013.01); *B23P 19/007* (2013.01); *B25J 15/08* (2013.01);
(Continued)

(58) Field of Classification Search
CPC ....... B23P 19/08; B23P 19/002; B23P 19/007; B23P 2700/01; B23P 19/004; B23P 19/06;
(Continued)

(56) References Cited

U.S. PATENT DOCUMENTS 3,989,984 A 11/1976 Amason et al.
4,927,367 A 5/1990 Salvagno
(Continued)

FOREIGN PATENT DOCUMENTS

EP 4101559 A1 12/2022
JP H10180569 A 7/1998

OTHER PUBLICATIONS

European Patent Office Extended European Search Report dated Jan. 19, 2026, for counterpart EP application 25169665.4, Applicant The Boeing Company, 13 pages.

*Primary Examiner* — Lee A Holly

(57) ABSTRACT

There is provided an automated fastener system having an automated washer installation. The automated fastener system includes an automated washer feed system holding and dispensing one or more washers, and providing a selected washer for the automated washer installation. The automated fastener system further includes an automated fastener holder assembly holding and dispensing one or more fasteners, and providing a selected fastener for the automated washer installation; an automated shuttle assembly; an automated inspection system; an automated delivery system; an automated installation system; and a control system. The automated washer installation is performed at one or more of, before inspection of the selected fastener, after inspection of the selected fastener, or after delivery of the selected fastener and the selected washer by the automated delivery system to the automated installation system.

20 Claims, 21 Drawing Sheets

(51) Int. Cl.
*B25J 15/08* (2006.01)
*B64F 5/10* (2017.01)
*F16B 43/00* (2006.01)

(52) U.S. Cl.
CPC ............ *B64F 5/10* (2017.01); *B23P 2700/01* (2013.01); *F16B 43/00* (2013.01); *F16B 2200/93* (2023.08)

(58) Field of Classification Search
CPC ......... B23P 19/12; B23P 19/006; B25J 15/08; B64F 5/10; F16B 43/00; F16B 2200/93; B64D 45/02
See application file for complete search history.

(56) References Cited

U.S. PATENT DOCUMENTS

| | | | | |
|---|---|---|---|---|
| 11,162,906 | B2 | 11/2021 | Nygaard et al. | |
| 11,260,481 | B2 * | 3/2022 | Maeda .................... | B23P 19/06 |
| 2018/0362182 | A1 | 12/2018 | Tristant | |
| 2022/0056943 | A1 | 2/2022 | Rizzo, Jr. et al. | |

* cited by examiner

AUTOMATED FASTENER SYSTEM HAVING AUTOMATED WASHER INSTALLATION

CROSS-REFERENCE TO RELATED APPLICATION

The present application is a divisional of and claims priority to pending application Ser. No. 18/679,236, filed May 30, 2024, now U.S. Pat. No. 12,434,337 B1, issued Oct. 7, 2025, entitled AUTOMATED FASTENER SYSTEM AND METHOD HAVING AUTOMATED WASHER INSTALLATION, AND METHOD OF USING A CONDUCTIVE WASHER, the entire contents of which is incorporated herein by reference.

FIELD

The present disclosure relates generally to automated fastener systems and methods, and more particularly, to automated fastener systems and methods having automated washer installation of washers, such as conductive washers, with fasteners, to obtain a fastener and washer assembly for installation in a structure, such as an aircraft structure.

BACKGROUND

Fasteners, such as bolts, rivets, screws, blind fasteners, pins, and bushings are typically used to join two or more structural members together to assemble a structure. With an increase in automated assembly and manufacturing processes, such fasteners may be automatically installed in structures, such as aircraft structures, spacecraft structures, rotorcraft structures, watercraft structures, and other vehicles and structures, to join the structural members together. Typically, washers may be coupled to fasteners, such as installed under a fastener head of a fastener, or under a nut or a collar as a grip or fastener length adjustment. However, known systems and methods for installing washers under fastener heads of fasteners, or under nuts or collars, involve manual installation. Such manual installation may be time consuming and labor intensive, which, in turn, may result in increased time and costs of manufacturing.

In addition, metal fasteners are used to join composite structures together, such as in the manufacture of aircraft, spacecraft, rotorcraft, watercraft, and other vehicles and structures. Such composite structures are typically made of a composite material comprising a matrix material, such as a resin, reinforced with fiber material, such as carbon fiber. The resin is not generally electrically conductive, in contrast to the fiber material. Good electrical contact between composite aircraft wings, fuselage, or other aircraft structures, and metal fasteners used to secure such structures together, is important to provide electrical conductivity and static dissipation, such as in the event of a lightning strike or other electromagnetic effects (EME) and electrical events, in order for the current energy from the lightning strike to be dissipated and conducted to ground through the surface of the composite structure. For example, composite wing structures require an electrical path to distribute the high current caused by a lightning strike. If electrical contact between the metal fasteners and such composite aircraft structures, for example, composite wing skins or panels, is inadequate, the current energy from the lightning strike may not dissipate, may remain in the vicinity of the struck fasteners, and may be conducted into the substructure and possibly a fuel tank in the wing, where unwanted discharge or sparking may occur as the result of electrical arching, and/or hot plasma particles ejected from joints due to decomposition of material systems, leading to a potential ignition source.

Known systems and methods exist to prevent or mitigate discharge and effects from lightning strikes in aircraft composite structures, such as wing fuel tanks and other aircraft composite structures. Such known systems and methods include distributing current through the fit of the fastener to the hole, where the fastener material engages fibers of the composite in the bore of the hole to direct the current through the connection and distribute the current in the major structure. For example, interference fit fasteners where the fastener shank contacts the hole bore and countersunk fasteners where the countersunk fastener head contacts the hole bore, may be used. However, such interference fit fasteners may be used with a sleeve that may result in increased parts and labor. Moreover, such countersunk fastener heads may not be conductive enough to transfer sufficient load. Further, clearance fit fasteners having a gap between the fastener shank and the hole bore may not conduct current well due to a lack of contact or minimal contact of the clearance fit fastener shank with the composite fibers in the hole bore.

In addition, known systems and methods may require special fastener materials having multiple pieces. This may result in increased manufacturing costs and production issues.

Further, known systems and methods may require the application of electrically insulating coatings or sealants and the use of fastener cap seals to cover metal fasteners in the aircraft composite wing fuel tanks, to contain the discharge in the fastened joint and direct it away from the fuel tank or other aircraft composite structures. However, such known electrically insulating coatings or sealants and fastener seal caps may be time consuming and labor intensive to apply or install and inspect in the aircraft composite wings and fuel tanks, or other aircraft structures, which, in turn, may result in increased manufacturing and inspection time and increased labor costs. Moreover, such known electrically insulating coatings or sealants may be heavy, and such known fastener seal caps may be numerous in number, and both may add weight to the aircraft, which may result in reduced performance and increased fuel consumption, and, in turn, may result in increased fuel costs.

Accordingly, there is a need in the art for an improved fastener system and method that is automated and provides automated washer installation of washers, such as conductive washers, onto metal fasteners that can be used for electromagnetic effects (EME) applications, that does not require special fastener materials having multiple pieces, that minimizes or eliminates the use of electrically insulating coatings or sealants and the use of fastener cap seals, that saves weight, and that provides advantages over known fastener systems and methods.

SUMMARY

Example implementations of the present disclosure provide for an improved automated fastener system and method having automated washer installation. As discussed in the below detailed description, versions of the improved automated fastener system and method may provide significant advantages over known systems and methods.

In a version of the disclosure, there is provided an automated fastener system having an automated washer installation. The automated fastener system comprises an automated washer feed system holding and dispensing one or more washers, and providing a selected washer for the automated washer installation. The automated fastener system further comprises an automated fastener holder assembly holding and dispensing one or more fasteners, and providing a selected fastener for the automated washer installation. With the automated washer installation, the selected fastener is inserted in the selected washer, so that the selected washer is in contact with, and positioned under, a fastener head of the selected fastener, to obtain a fastener and washer assembly.

The automated fastener system further comprises an automated shuttle assembly having one or more shuttle cups. A selected shuttle cup receives and transports one of, the selected washer from the automated washer feed system, the selected fastener from the automated fastener holder assembly, or the fastener and washer assembly.

The automated fastener system further comprises an automated inspection system having two or more inspection gripper fingers configured to pick up, to inspect, and to release one of, the selected fastener, or the fastener and washer assembly. The automated fastener system further comprises an automated delivery system having a delivery device configured to transport one or more of, the selected fastener, the selected washer, or the fastener and washer assembly. The automated fastener system further comprises an automated installation system having an end effector with two or more end effector gripper fingers configured to pick up from the delivery device, one or more of, the selected fastener, the selected washer, or the fastener and washer assembly, and further configured to install the fastener and washer assembly in a structure.

The automated fastener system further comprises a control system comprising at least a controller, one or more power supplies, and a computer system. The control system is configured to control the automated fastener system and the automated washer installation. The automated washer installation is performed at one or more of, before inspection of the selected fastener by the automated inspection system, after inspection of the selected fastener by the automated inspection system, or after delivery of the selected fastener and the selected washer by the automated delivery system to the automated installation system.

In another version of the disclosure, there is provided a method of using a conductive washer to distribute current in an aircraft structure. The method comprises installing an aircraft fastener and conductive washer assembly into the aircraft structure. The aircraft structure comprises one or more of, wings, fuselage, or tail, of an aircraft. The aircraft fastener and conductive washer assembly comprises a conductive washer made of a conductive material, or having a conductive coating. The aircraft fastener is made of one of, a metal material, or a metal alloy material, wherein the conductive washer is in contact with, and positioned under, a fastener head of the aircraft fastener.

The method further comprises distributing the current from a lightning strike made to the aircraft structure, through the aircraft fastener and conductive washer assembly, and to the aircraft structure, wherein the conductive washer transfers the current from the fastener head of the aircraft fastener to the aircraft structure.

In another version of the disclosure, there is provided an automated method of performing automated washer installation in an automated fastener system. The automated method comprises providing the automated fastener system.

The automated fastener system comprises an automated washer feed system holding and dispensing one or more washers, and providing a selected washer for the automated washer installation. The automated fastener system further comprises an automated fastener holder assembly holding and dispensing one or more fasteners, and providing a selected fastener for the automated washer installation. With the automated washer installation, the selected fastener is inserted in the selected washer, so that the selected washer is in contact with, and positioned under, a fastener head of the selected fastener, to obtain a fastener and washer assembly.

The automated fastener system further comprises an automated shuttle assembly having one or more shuttle cups. A selected shuttle cup receives and transports one of, the selected washer from the automated washer feed system, the selected fastener from the automated fastener holder assembly, or the fastener and washer assembly.

The automated fastener system further comprises an automated inspection system having two or more inspection gripper fingers configured to pick up, to inspect, and to release one of, the selected fastener, or the fastener and washer assembly. The automated fastener system further comprises an automated delivery system having a delivery device configured to transport one or more of, the selected fastener, the selected washer, or the fastener and washer assembly.

The automated fastener system further comprises an automated installation system having an end effector with two or more end effector gripper fingers configured to pick up from the delivery device, one or more of, the selected fastener, the selected washer, or the fastener and washer assembly. The automated fastener system further comprises a control system comprising at least a controller, one or more power supplies, and a computer system. The control system is configured to control the automated fastener system and the automated washer installation.

The automated method further comprises performing the automated washer installation, at one or more of, before inspection of the selected fastener by the automated inspection system, after inspection of the selected fastener by the automated inspection system, or after delivery of the selected fastener and the selected washer by the automated delivery system to the automated installation system. The automated method further comprises installing, with the automated installation system, the fastener and washer assembly in a structure.

In another version of the disclosure, there is provided an automated fastener system having automated washer installation. The automated fastener system comprises an automated washer feed system holding and dispensing one or more conductive washers, and providing a selected conductive washer for the automated washer installation. The automated fastener system further comprises an automated fastener holder assembly holding and dispensing one or more fasteners, and providing a selected fastener for the automated washer installation, wherein with the automated washer installation, the selected fastener is inserted in the selected conductive washer, so that the selected conductive washer is in contact with, and positioned under, a fastener head of the selected fastener, to obtain an aircraft fastener and conductive washer assembly.

The automated fastener system further comprises an automated shuttle assembly having one or more shuttle cups. A selected shuttle cup receives and transports one of, the selected conductive washer from the automated washer feed system, the selected fastener from the automated fastener holder assembly, or the aircraft fastener and conductive washer assembly.

The automated fastener system further comprises an automated inspection system having two or more inspection gripper fingers configured to pick up, to inspect, and to release one of, the selected fastener, or the aircraft fastener and conductive washer assembly. The automated fastener system further comprises an automated delivery system having a delivery device configured to transport one or more of, the selected fastener, the selected conductive washer, or the aircraft fastener and conductive washer assembly. The automated fastener system further comprises an automated installation system having an end effector with two or more end effector gripper fingers configured to pick up from the delivery device, one or more of, the selected fastener, the selected conductive washer, or the aircraft fastener and conductive washer assembly, and further configured to install the aircraft fastener and conductive washer assembly in an aircraft structure.

The automated fastener system further comprises a control system comprising at least a controller, one or more power supplies, and a computer system, the control system configured to control the automated fastener system and the automated washer installation. The automated washer installation is performed at one or more of, before inspection of the selected fastener by the automated inspection system, after inspection of the selected fastener by the automated inspection system, or after delivery of the selected fastener and the selected conductive washer by the automated delivery system to the automated installation system.

In another version of the disclosure, there is provided an automated fastener system having automated washer installation. The automated fastener system comprises an automated washer feed system holding and dispensing one or more conductive washers, and providing a selected conductive washer for the automated washer installation. The automated washer feed system comprises a washer orientation system, a washer type determination system, and a washer material verification system.

The automated fastener system further comprises an automated fastener holder assembly holding and dispensing one or more fasteners, and providing a selected fastener for the automated washer installation, wherein with the automated washer installation, the selected fastener is inserted in the selected conductive washer, so that the selected conductive washer is in contact with, and positioned under, a fastener head of the selected fastener, to obtain an aircraft fastener and conductive washer assembly.

The automated fastener system further comprises an automated shuttle assembly having one or more shuttle cups. A selected shuttle cup receives and transports one of, the selected conductive washer from the automated washer feed system, the selected fastener from the automated fastener holder assembly, or the aircraft fastener and conductive washer assembly.

The automated fastener system further comprises an automated inspection system having two or more inspection gripper fingers configured to pick up, to inspect, and to release one of, the selected fastener, or the aircraft fastener and conductive washer assembly. The automated fastener system further comprises an automated delivery system having a delivery device configured to transport one or more of, the selected fastener, the selected conductive washer, or the aircraft fastener and conductive washer assembly.

The automated fastener system further comprises an automated installation system having an end effector with two or more end effector gripper fingers configured to pick up from the delivery device, one or more of, the selected fastener, the selected conductive washer, or the aircraft fastener and conductive washer assembly, and further configured to install the aircraft fastener and conductive washer assembly in an aircraft structure. The automated installation system further has an alignment assembly, to align the aircraft fastener and conductive washer assembly with a hole in the aircraft structure, and to maintain an alignment position of the aircraft fastener and conductive washer assembly, until the selected fastener is partially inserted through the hole in the aircraft structure and partially installed in the aircraft structure.

The automated fastener system further comprises a control system comprising at least a controller, one or more power supplies, and a computer system, the control system configured to control the automated fastener system and the automated washer installation. The automated washer installation is performed at one or more of, before inspection of the selected fastener by the automated inspection system, after inspection of the selected fastener by the automated inspection system, or after delivery of the selected fastener and the selected conductive washer by the automated delivery system to the automated installation system.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or claims.

Figure 1:
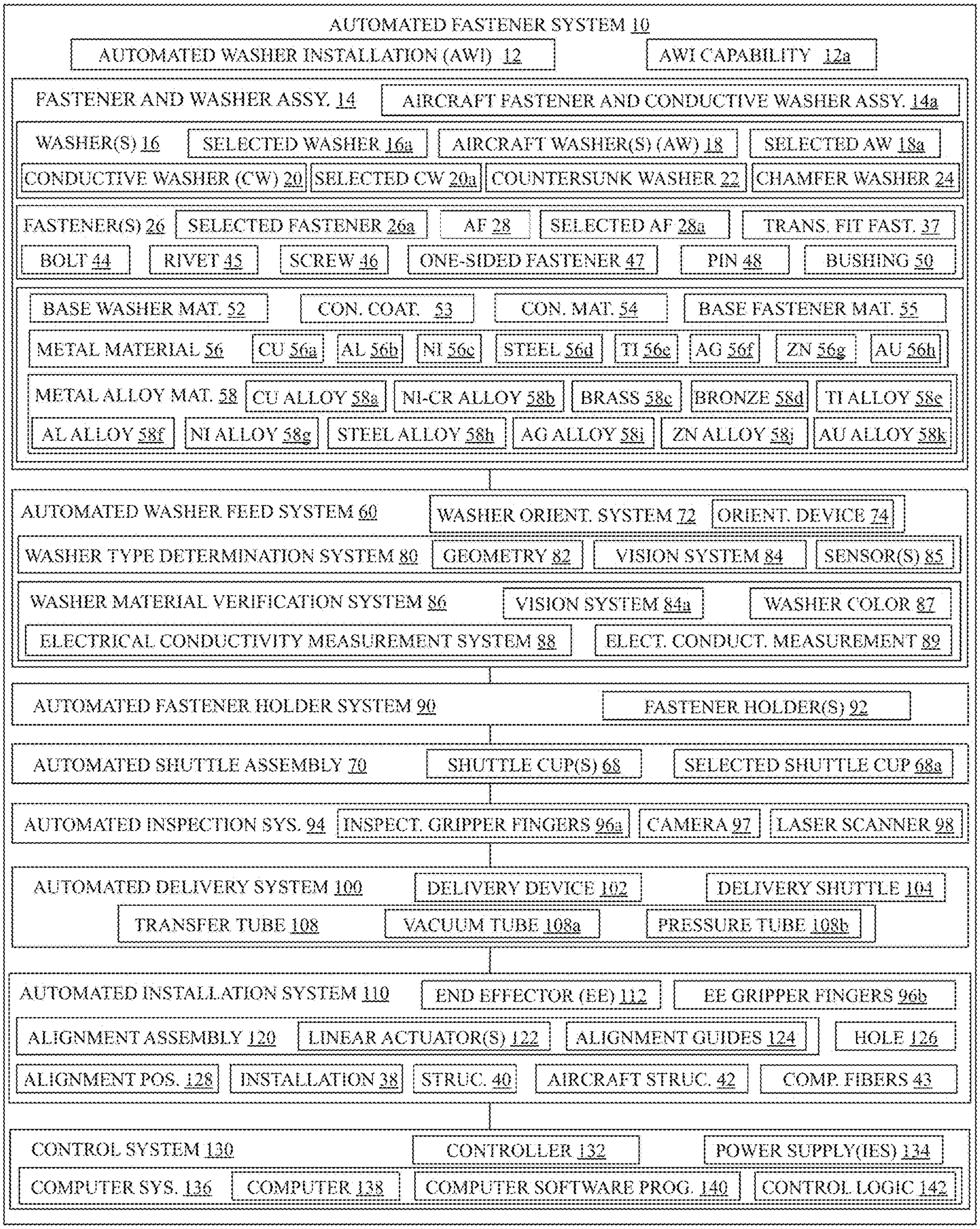
FIG. 1 is an illustration of a block diagram of an exemplary automated fastener system of the disclosure.

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one version" or "a version". The instances of the phrases "one version" or "a version" do not necessarily refer to the same version. Particular features, structures, or characteristics may be combined in any suitable manner consistent with this disclosure. All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, the terms "first", "second", etc., are used as labels for nouns that they precede, and do not imply any type of ordering (e.g., spatial, temporal, logical, etc.).

As used herein, an element or step recited in the singular and preceded by the word "a" or "an" should be understood as not necessarily excluding the plural of the elements or steps. As used herein, the term "and/or" includes any and all combinations of one or more of the associated listed items. As also used herein, the term "combinations thereof" includes combinations having at least one of the associated listed items, wherein the combination can further include additional, like non-listed items.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Now referring to FIG. 1, FIG. 1 is an illustration of a block diagram of an exemplary automated fastener system 10 having automated washer installation (AWI) 12, such as automated washer installation (AWI) capability 12*a*, to obtain a fastener and washer assembly (ASSY.) 14, for example, an aircraft fastener and conductive washer assembly (ASSY.) 14*a*. The blocks in FIG. 1 represent elements, and lines connecting the various blocks do not imply any particular dependency of the elements. Furthermore, the connecting lines shown in the various Figures contained herein are intended to represent example functional relationships and/or physical couplings between the various elements, but it is noted that other alternative or additional functional relationships or physical connections may be present in versions disclosed herein. One or more of these blocks may be combined, divided, or combined and divided into different blocks when implemented in an illustrative example. Further, the illustrations of the automated fastener system 10 in FIG. 1 are not meant to imply physical or architectural limitations to the manner in which an illustrative example may be implemented. Other components in addition to, or in place of, the ones illustrated may be used. Some components may be unnecessary.

As shown in FIG. 1, the fastener and washer assembly 14 obtained from the automated washer installation 12 of the automated fastener system 10 comprises a washer 16, such as a selected washer 16*a*, for example, an aircraft washer (AW) 18, such as a selected aircraft washer (AW) 18*a*. The washer 16 is a fastener washer configured to be coupled to, and coupled to, a fastener 26 (see FIG. 1), to obtain the fastener and washer assembly 14 (see FIG. 1). Preferably, the washer 16, such as the aircraft washer 18, is a conductive washer (CW) 20 (see FIG. 1), such as a selected conductive washer (CW) 20*a* (see FIG. 1), made of a conductive (CON.) material (MAT.) 54 (see FIG. 1), or having a conductive (CON.) coating (COAT.) 53 (see FIG. 1), or made of a conductive material 54 and having a conductive coating 53. The washer 16, such as the aircraft washer 18, may comprise a countersunk washer 22 (see FIGS. 2A-2B), a clearance fit washer 23 (see FIG. 2C), an interference fit washer 24 (see FIG. 2D), a chamfer washer 25 (see FIGS. 4A-4B, 5A-5B), or another suitable type of washer. The chamfer washer 25 may comprise a symmetrical chamfer washer 25*a* (see FIG. 5A), or a nonsymmetrical chamfer washer 25*b* (see FIG. 5B). The washers 16 are discussed in further detail below with regard to FIGS. 2A-6C.

As further shown in FIG. 1, the fastener and washer assembly 14 obtained from the automated washer installation 12 of the automated fastener system 10 comprises a fastener 26, such as a selected fastener 26*a*, for example, an aircraft fastener (AF) 28, such as a selected aircraft fastener (AF) 28*a*. The fastener 26, such as the aircraft fastener 28, may comprise a countersunk fastener 30 (see FIGS. 2A-2D), a protruding head fastener 32 (see FIGS. 4A-4B), a clearance fit fastener 34 (see FIGS. 3B, 6B), an interference fit fastener 36 (see FIGS. 3C, 6C), a transition (TRANS.) fit fastener (FAST.) 37 (see FIG. 1), or another suitable type of fastener.

With the automated washer installation 12, the fastener 26, such as the selected fastener 26*a*, is inserted in the washer 16, such as the selected washer 16*a*, so that the washer 16, such as the selected washer 16*a*, is in contact with, and positioned under, a fastener head 160 of the fastener 26, such as the selected fastener 26*a*, to obtain the fastener and washer assembly 14. The fastener 26 is inserted through the washer 16 and coupled to, or attached to, the selected to form the fastener and washer assembly 14, prior to installation 38 (see FIG. 1) in a structure (STRUC.) 40 (see FIGS. 1, 17), such as an aircraft structure (STRUC.) 42 (see FIGS. 1, 17). A nut, a collar, or another suitable device may be added to the fastener 26 or against the washer 16 to tighten the washer 16 against the fastener 26. The fastener 26 may also comprise another suitable fastener, and the washer 16 may also comprise another suitable washer, for installation 38 in another suitable structure, for example, a spacecraft structure, a rotorcraft structure, an unmanned aircraft structure, a watercraft structure, an automobile structure, a truck structure, a train structure, an architectural structure, or other suitable structures.

The structure 40 (see FIGS. 1, 3A, 17), such as the aircraft structure 42 (see FIGS. 1, 17), may be made of composite material, such as carbon fiber reinforced plastic (CFRP) material, having composite (COMP.) fibers 43 (see FIG. 1). The composite structures, such as CFRP structures, are typically made of a composite material comprising a matrix material, such as a resin, reinforced with fiber material, such as composite fibers 43, for example, carbon fibers. The resin is not generally electrically conductive, in contrast to the fiber material, such as the composite fibers 43. The fastener and washer assembly 14 disclosed herein provides a simple and effective system and method to enable transfer of current 144 (see FIG. 17), or energy, through the metal material 56 and/or metal alloy material 58 of the fastener 26, such as the metal fastener, through the metal material 56 and/or metal alloy material 58 of the washer 16, such as the conductive washer 20, for example, a copper washer, to the composite fibers 43 of the composite material of the structure 40, such as the aircraft structure 42, for example, a composite aircraft structure 42*a* (see FIG. 17), and into the structure 40 itself, such as the aircraft structure 42, regardless of the fastener 26 to hole 126 (see FIG. 3A) fit in the structure 40, such as the aircraft structure 42, for example, the composite aircraft structure 42*a*.

The one or more fasteners 26, such as the one or more aircraft fasteners 28, are used to join multiple pieces of the structure 40, such as the aircraft structure 42, together. As shown in FIG. 1, one of the one or more washers 16 selected for use in the automated fastener system 10, including for the automated washer installation 12, comprises the selected washer 16*a*, and one of the one or more fasteners 26 selected for use in the automated fastener system 10, including for the automated washer installation 12, comprises the selected fastener 26*a*.

As shown in FIG. 1, each of the one or more fasteners 26, such as the one or more aircraft fasteners 28, comprises one of, a bolt 44, for example, a countersunk bolt 44*a* (see FIGS. 2A-2D), or a protruding head bolt 44*b* (see FIGS. 4A-4B), a rivet 45, a screw 46, a blind fastener 47, a pin 48, a bushing 50, or another suitable fastener.

As further shown in FIG. 1, each of the one or more washers 16, such as the one or more aircraft washers 18, is made of a base washer material (MAT.) 52, for example, a conductive material 54. As further shown in FIG. 1, each of the one or more fasteners 26, such as the one or more aircraft fasteners 28, is made of a base fastener material (MAT.) 55. As shown in FIG. 1, the base washer material 52 and the base fastener material 55 may comprise a metal material 56, including copper (CU) 56*a*, aluminum (AL) 56*b*, nickel (NI) 56*c*, steel 56*d*, titanium (TI) 56*c*, silver (AG) 56*f*, zinc (ZN) 56*g*, gold (AU) 56*h*, or another suitable metal material. The base washer material 52 and the base fastener material 55 may further comprise a metal alloy material (MAT.) 58, including a copper alloy 58*a*, a nickel-chromium alloy 58*b*, brass 58*c*, bronze 58*d*, a titanium (TI) alloy 58*c*, an aluminum (AL) alloy 58*f*, a nickel (NI) alloy 58*g*, a steel alloy 58*h*, a silver (AG) alloy 58*i*, a zinc (ZN) alloy 58*j*, a gold (AU) alloy 58*k*, or another suitable metal alloy. In other versions of the washer 16 and the fastener 26, the base washer material 52 and the base fastener material 55 may comprise another suitable material.

In one version, each of the one or more washers 16, such as the one or more aircraft washers 18, may be coated with a conductive coating 53 (see FIG. 1), an applied coating, or another suitable coating. Preferably, the coating is the conductive coating 53 made of the conductive material 54 that is able to conduct electricity and distribute current 144 (see FIG. 17), or energy, such as from a lightning strike 294 (see FIG. 17) or other electromagnetic effects (EME) and electrical events. In another version, each of the one or more washers 16, such as the one or more aircraft washers 18, is uncoated or has one or more uncoated portions.

In one version, each of the one or more fasteners 26, such as the one or more aircraft fasteners 28, is coated with a coating, such as a dry film lubricant coating, an applied coating, or another suitable coating. Preferably, the coating is a conductive coating that is able to conduct electricity. In another version, each of the one or more fasteners 26, such as the one or more aircraft fasteners 28, is uncoated or one or more has uncoated portions.

As shown in FIG. 1, the automated fastener system 10 comprises an automated washer feed system 60 configured to hold and dispense, and holding and dispensing, one or more washers 16, such as one or more aircraft washers 18, and providing a selected washer 16*a*, such as a selected aircraft washer 18*a*, for the automated washer installation 12. The automated washer feed system 60 comprises a feed device 62 (see FIG. 7), such as a tube feeder 64 (see FIG. 7), a channel feeder, a conveyor belt, or another suitable feed device, for moving or conveying the one or more washers 16 out of the tube feeder 64 or other feed device one at a time. Preferably, the automated washer feed system 60 further comprises a trigger gate 65 (see FIGS. 7-9) to only allow one (1) washer 16 at a time to dispense, drop, or transfer from the feed device 62.

Figure 7:
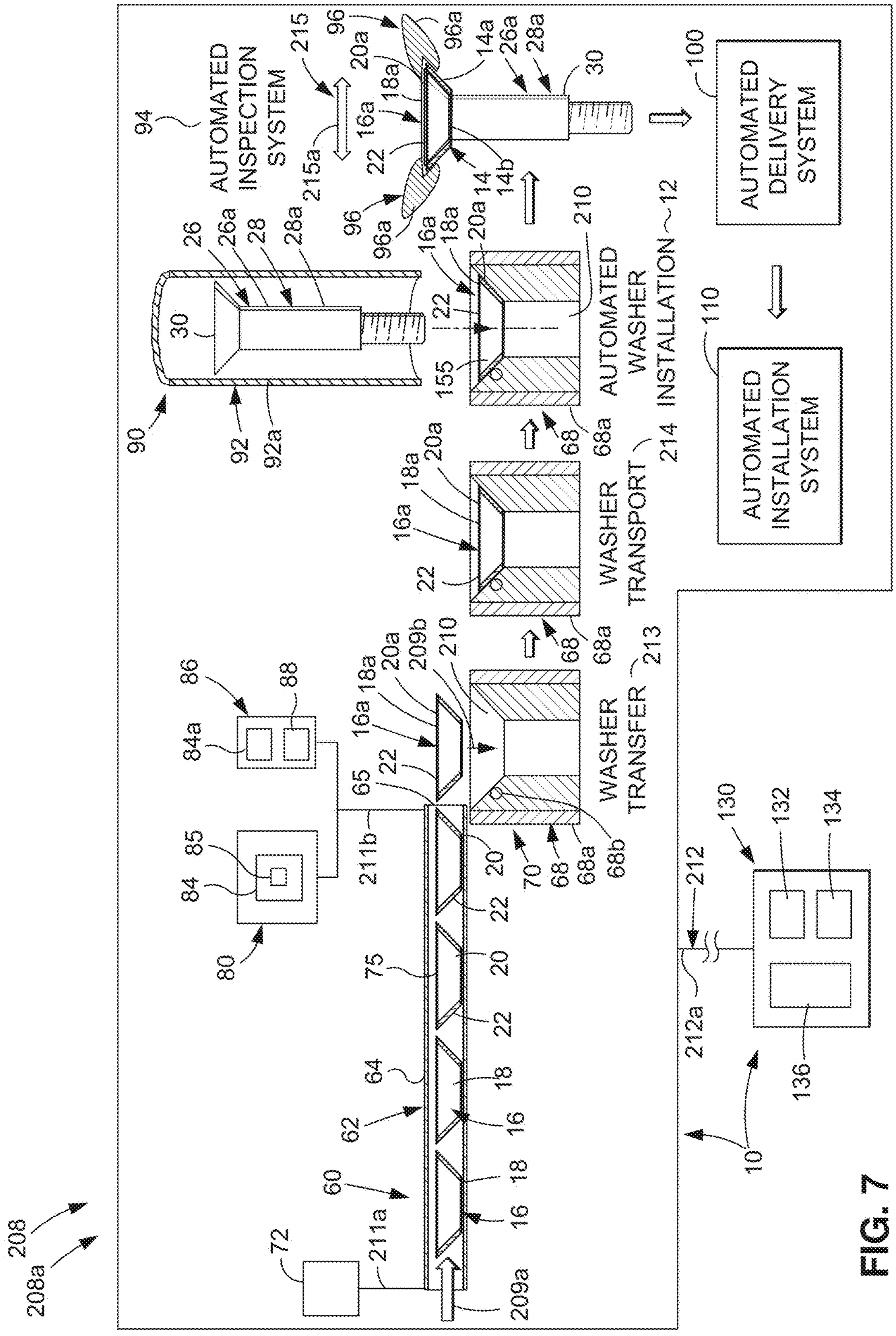
FIG. 7 is an illustration of a schematic diagram of a process flow using a version of an exemplary automated fastener system of the disclosure, showing an automated washer installation before inspection of a fastener.
Figure 9:
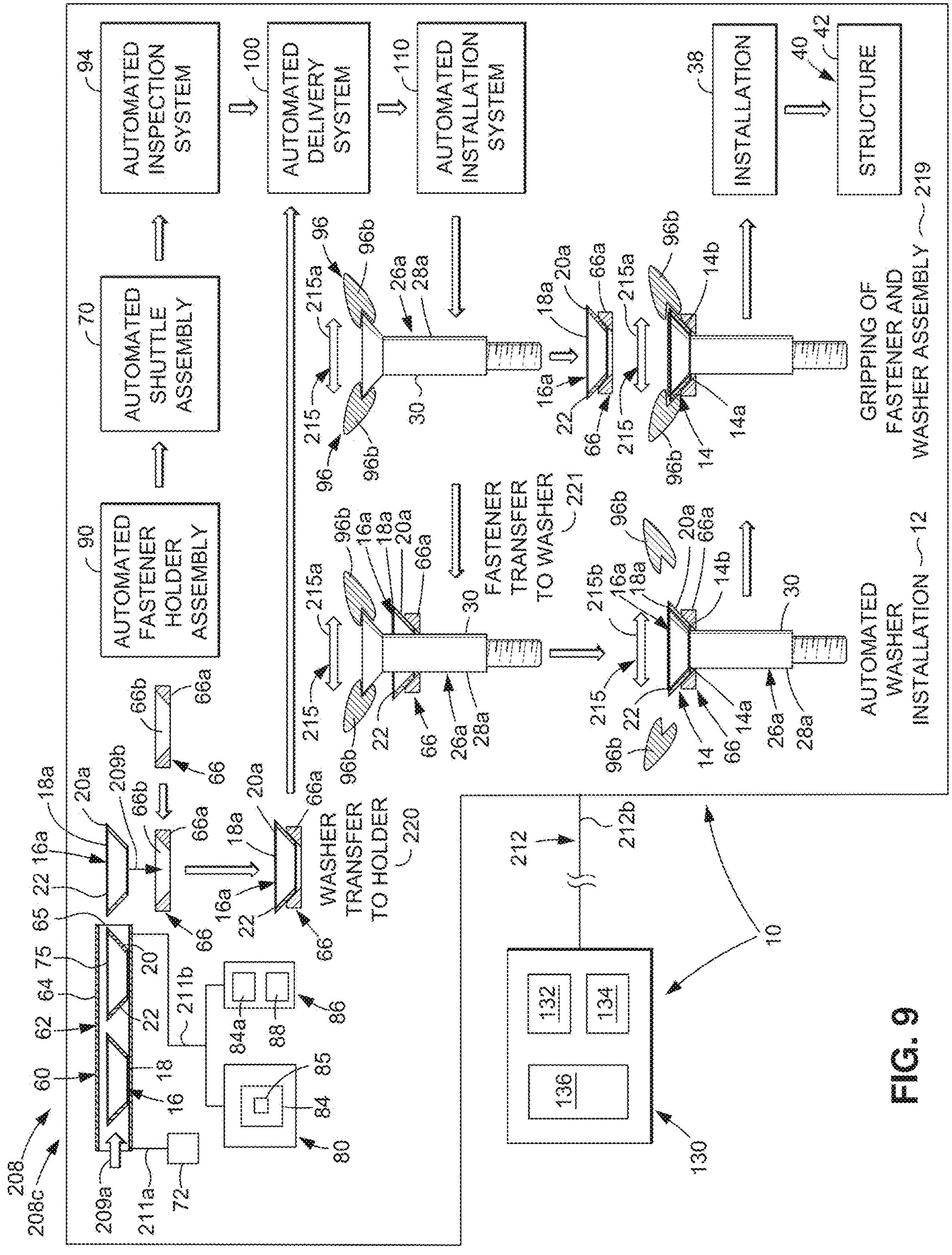
FIG. 9 is an illustration of a schematic diagram of a process flow using another version of an exemplary automated fastener system of the disclosure, showing an automated washer installation at an automated installation system.

In one version, as shown in FIG. 9, the automated washer feed system 60 comprises a holder 66, such as a selected holder 66*a*, for example, a cup holder 66*b*, in which the selected washer 16*a*, such as the selected aircraft washer 18*a*, is dispensed, dropped, or transferred from the feed device 62, such as the tube feeder 64, into the holder 66, such as the selected holder 66*a*, for example, the cup holder 66*b*. In another version, as shown in FIG. 7, the selected washer 16*a*, such as the selected aircraft washer 18*a*, is dispensed, dropped, or transferred from the feed device 62, such as the tube feeder 64, into a shuttle cup 68, such as a selected shuttle cup 68*a*, of an automated shuttle assembly 70.

As further shown in FIG. 1, the automated washer feed system 60 may comprise a washer orientation (ORIENT.) system (SYS.) 72 (see also FIG. 7), configured to orient and position, and orienting and positioning, one of, the countersunk washer 22 (see FIG. 7), or the nonsymmetrical chamfer washer 25*b* (see FIG. 5B), for dispensing, dropping, transfer, and insertion into the holder 66, such as the selected holder 66*a*, for example, the cup holder 66*b*, or into the shuttle cup 68, such as the selected shuttle cup 68*a*.

In one version, the washer orientation system 72 comprises an orientation (ORIENT.) device 74 (see FIGS. 1, 7) to orient and hold each washer 16, for example, each countersunk washer 22 (see FIG. 7), in a right side up position 75 (see FIG. 7), so that a top end 76 (see FIGS. 2A, 7) of the countersunk washer 22 is right side up and facing upward, and a bottom end 78 (see FIGS. 2A, 7) of the countersunk washer 22 is facing downward. In one version, the orientation device 74 may comprise a tube-shaped carrier that holds the washer 16 in a correct orientation or position and drops or pushes the washer 16 out of the tube-shaped carrier. In another version, the orientation device 74 may comprise a bowl feeder that separates the washers 16, rotates the washers 16 to the right side up position 75, if needed, and correctly orients the washers 16. The washer orientation system 72 may further comprise one or more sensors or other components to ensure that the countersunk washer 22 or the nonsymmetrical chamfer washer 25*b* is transferred and inserted in a correct orientation and position within the holder 66, such as the selected holder 66*a*, for example, the cup holder 66*b*, or within the shuttle cup 68, such as the selected shuttle cup 68*a*. The automated washer feed system 60, including the washer orientation system 72, is controlled with the control system 130 (see FIGS. 1, 7-9).

As further shown in FIG. 1, the automated washer feed system 60 may comprise a washer type determination system 80 (see also FIGS. 7-9), to view a geometry 82 of the washer 16 and to determine the type of washer 16 based on the geometry 82, for example, to determine whether the washer 16 is a countersunk washer 22 type or a chamfer washer 25 type. The washer type determination system 80 may comprise a vision system 84 (see FIGS. 1, 7-9) to view the geometry 82 of the washer 16 to determine whether the washer 16 is a countersunk washer 22 type or a chamfer washer 25 type. The vision system 84 comprises a camera, a camera and a laser line scanner, a multi-laser line scanner, a radio-frequency identification (RFID) scanner, or another optical or camera-based system to view the geometry 82 (see FIG. 1) of the washer 16 passing through the automated washer feed system 60, to determine the type of washer 16. The washer type determination system 80 (see also FIGS. 7-9) may further comprise one or more sensors 85 (see FIGS. 1, 7-9), connectors, or other components known in the art of vision systems such as those listed above. In another version, the washer type determination system 80 may be integrated in a vision system 84 that may be used to inspect or view the fastener and washer assembly 14 after the automated washer installation 12. The automated washer feed system 60, including the washer type determination system 80, is controlled with the control system 130 (see FIGS. 1, 7-9).

As further shown in FIG. 1, the automated washer feed system 60 may comprise a washer material verification system 86 (see also FIGS. 7-9), such as an inspection module, to determine and verify a washer color 87, and/or to determine and verify what the base washer material 52 of the washer 16, such as the selected washer 16*a*, is made of. For example, the washer material verification system 86 may verify the washer color 87 by using a vision system 84*a* (see FIG. 1), such as a camera, a camera and a laser line scanner, a multi-laser line scanner, a radio-frequency identification (RFID) scanner, or another optical or camera-based system to view the washer color 87 of the washer 16 passing through the automated washer feed system 60, to determine and verify what the base washer material 52 of the washer 16, based on the washer color 87. If the base washer material 52 cannot be determined based on the washer color 87, as an alternative to the vision system 84, the washer material verification system 86 may comprise an electrical conductivity measurement system 88 (see FIGS. 1, 7-9), to take an electrical (ELECT.) conductivity (CONDUCT.) measurement 89 of the washer 16, such as the selected washer 16*a*, and to compare it against a predetermined electrical conductivity value range of a predetermined base washer material to determine the base washer material 52, based on the electrical conductivity measurement 89 obtained by the electrical conductivity measurement system 88. The washer material verification system 86 can be used to detect different base washer materials 52 of the washers 16, such as the selected washer 16*a*, in order to prevent an incorrect washer 16, such as an incorrect selected washer 16*a*, from being used in the automated fastener system 10 and installed in the structure 40, such as the aircraft structure 42.

In one version, the electrical conductivity measurement system 88 may comprise one or more eddy current conductivity probe assemblies with one or more eddy current conductivity probes having one or more coils coupled to electrical wires, and may comprise one or more sensors coupled to the one or more eddy current conductivity probes, via the electrical wires. The eddy current conductivity probe may comprise a contact probe to contact the surface of the washer 16, such as an eddy current conductivity surface probe, an eddy current conductivity pencil probe, an eddy current conductivity encircling probe, or another suitable type of eddy current conductivity probe known in the art. In general, the eddy current conductivity probe comprises a coil of conductive wire and an alternating current flows through the coil and generates an oscillating magnetic field. If the eddy current conductivity probe and its magnetic field are brought close to a conductive material, such as a metal material 56 (see FIG. 1) of the washer 16 (see FIG. 1), a circular flow of electrons known as an eddy current begins to move through the metal material 56, and the eddy current flowing through the metal material 56, in turn, generates its own magnetic field, which interacts with the coil and its field through mutual inductance. The eddy current conductivity probes are used to measure the electrical conductivity of the washer 16, such as the aircraft washer 18. In one version, the eddy current conductivity probe assembly is coupled to the automated washer feed system 60. In other versions, eddy current conductivity probe assembly is coupled to, or integrated in one of, the one or more shuttle cups 68, the inspection center shaft 95*a* (see FIG. 11), the two or more inspection gripper fingers 96*a* (see FIG. 11), the end effector center shaft 95*b* (see FIGS. 14A-14B), or the two or more end effector gripper fingers 96*b* (see FIGS. 14A-14B). Each eddy current conductivity probe assembly contacts the selected washer 16*a* to obtain the electrical conductivity measurement 89 of the selected washer 16*a*. In another version, the electrical conductivity measurement 89 of the washer 16, such as the selected washer 16*a*, is taken using another suitable conductivity measuring device. The automated washer feed system 60, including the washer material verification system 86, is controlled with the control system 130 (see FIGS. 1, 7-9).

As shown in FIG. 1, the automated fastener system 10 further comprises an automated fastener holder assembly 90 configured to hold and to dispense, and holding and dispensing, the one or more fasteners 26, such as the one or more aircraft fasteners 28, and providing a selected fastener 26*a*, such as a selected aircraft fastener 28*a*, for the automated washer installation 12. In one version, the automated fastener holder assembly 90 comprises one or more fastener holders 92 (see FIGS. 1, 7, 8, 10), such as in the form of one or more vertical tube holders 92*a*. In other versions, the one or more fastener holders 92 may comprise cassettes, chutes, hangers, or other suitable fastener holder structures. The fastener holders 92 may accommodate fasteners 26 of different size diameters, for example, one fastener holder 92 may hold fasteners 26 of one diameter size, and another fastener holder 92 may hold fasteners 26 of another diameter size. The fastener holders 92 may receive the fasteners 26, such as the aircraft fasteners 28, from a fastener feeder device (not shown), such as a bowl feeder or another suitable fastener feeder device, located upstream of the automated fastener holder assembly 90 of the automated fastener system 10. The automated fastener holder assembly 90 is controlled with the control system 130 (see FIGS. 1, 7-9).

As further shown in FIG. 1, the automated fastener system 10 further comprises the automated shuttle assembly 70 having the one or more shuttle cups 68. A selected shuttle cup 68*a* of the one or more shuttle cups 68 receives a selected fastener 26*a* of the one or more fasteners 26 from the automated fastener holder assembly 90, and the selected shuttle cup 68*a* transports the selected fastener 26*a* in the selected shuttle cup 68*a*. The selected shuttle cup 68*a* is configured to receive, and receives, the selected fastener 26*a* from the fastener holder 92 of the automated fastener holder assembly 90, for example, the selected fastener 26*a* may drop out of the fastener holder 92 into the selected shuttle cup 68*a* positioned below the fastener holder 92. The selected fastener 26*a* is selected based on its kind or type, its diameter, and its length. The selected shuttle cup 68*a* supports and holds the selected fastener 26*a*, partially, or wholly, in the selected shuttle cup 68*a* and in one version, the selected shuttle cup 68*a* does not have retention features, such as clamps or other types of retention features, to retain the selected fastener 26*a* in the selected shuttle cup 68*a*. The shuttle cup 68 is discussed in further detail below with regard to FIGS. 7-9 and 12A-12B.

The automated shuttle assembly 70 has the one or more shuttle cups 68. The selected shuttle cup 68*a* receives and transports one of, the selected washer 16*a* from the automated washer feed system 60, the selected fastener 26*a* from the automated fastener holder assembly 90, or the fastener and washer assembly 14. The automated shuttle assembly 70 is controlled with the control system 130 (see FIGS. 1, 7-9).

As further shown in FIG. 1, the automated fastener system 10 comprises an automated inspection system (SYS.) 94. The selected shuttle cup 68*a* transports the selected fastener 26*a* from the automated fastener holder assembly 90 to the automated inspection system 94, via an automatic transport mechanism (not shown) of the automated shuttle assembly 70, for example, the automatic transport mechanism may comprise a rail or a track system, or a hanging rail or track system, along which the selected shuttle cup 68*a* automatically moves back and forth between the automated fastener holder assembly 90 to the automated inspection system 94. The automatic transport mechanism may also comprise another suitable transport system to automatically move the shuttle cups 68 between the automated fastener holder assembly 90 and the automated inspection system 94.

Figure 11:
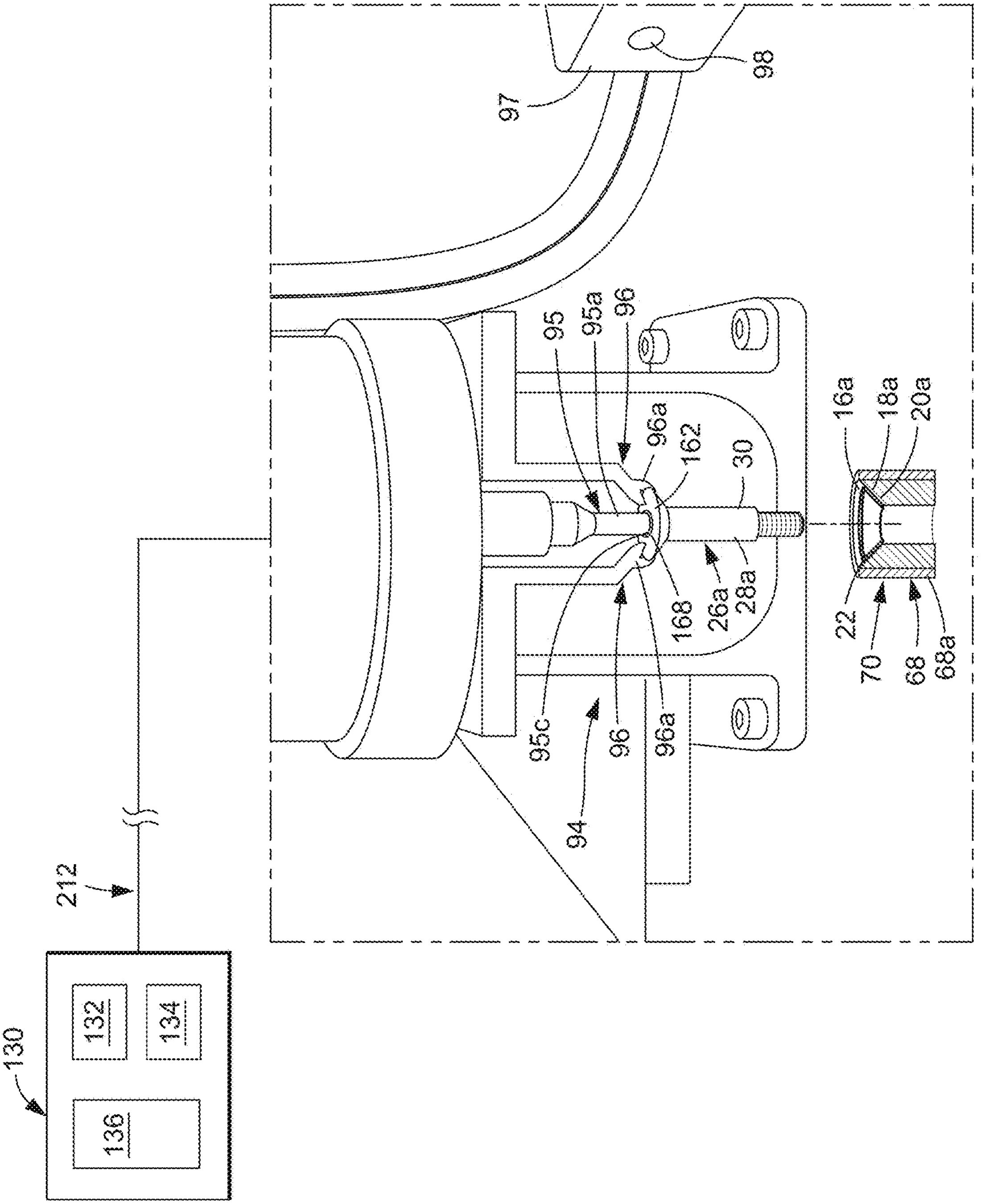
FIG. 11 is an illustration of a front perspective view of an exemplary version of an automated inspection system that may be used in a version of an automated fastener system and an automated method of the disclosure, showing inspection gripper fingers holding a selected fastener above a partial sectional view of an automated shuttle assembly holding a selected washer.

The automated inspection system 94 has a center shaft 95 (see FIG. 11), such as an inspection center shaft 95*a* (see FIG. 11), and has two or more gripper fingers 96 (see FIG. 11), such as two or more inspection (INSPECT.) gripper fingers 96*a* (see FIGS. 1, 11). The two or more inspection gripper fingers 96*a* are configured to pick up, to inspect, and to release one of, the selected fastener 26*a*, or the fastener and washer assembly 14. The inspection gripper fingers 96*a*, such as in the form of a claw, are configured to automatically pick up the selected fastener 26*a*, or the fastener and washer assembly 14, to automatically grip and to automatically inspect the selected fastener 26*a*, or the fastener and washer assembly 14, and to automatically release the selected fastener 26*a*, or the fastener and washer assembly 14.

In one version, as shown in FIG. 1, the automated inspection system 94 comprises a vision system 84*b* (see FIG. 11) with a camera 97 (see also FIG. 11) and a laser scanner 98 (see also FIG. 11) to inspect the selected fastener 26*a*, or the fastener and washer assembly 14. The vision system 84*b* may further comprise one or more of a camera and a laser line scanner, a multi-laser line scanner, a radio-frequency identification (RFID) scanner, or another optical or camera-based system to inspect the selected fastener 26*a*, or the fastener and washer assembly 14. The automated inspection system 94 may also comprise further suitable components for inspection of the selected fastener 26*a*. The automated inspection system 94 (see FIG. 11) is controlled with the control system 130 (see FIGS. 1, 7-9, 11).

As further shown in FIG. 1, the automated fastener system 10 comprises an automated delivery system 100 having a delivery device 102 configured to transport and deliver, and transporting and delivering, one or more of, the selected fastener 26*a*, the selected washer 16*a*, or the fastener and washer assembly 14, away from the automated inspection system 94. In one version, the delivery device 102 comprises a delivery shuttle 104 (see FIGS. 1, 13), such as a receptacle cup 106 (see FIG. 13), or another suitable delivery container device. The delivery shuttle 104 is designed to encapsulate one or more of, the selected fastener 26*a*, the selected washer 16*a*, or the fastener and washer assembly 14. As shown in FIG. 1, the automated delivery system 100 further comprises a transfer tube 108, such as a vacuum tube 108*a*, a pressure tube 108*b*, or another suitable transfer tube, to transfer or transport the delivery device 102, such as the delivery shuttle 104, carrying one or more of, the selected fastener 26*a*, the selected washer 16*a*, or the fastener and washer assembly 14. The delivery device 102, such as the delivery shuttle 104, is discussed in further detail below with respect to FIG. 13. The automated delivery system 100 (see FIGS. 1, 7-9, 13) is controlled with the control system 130 (see FIGS. 1, 7-9).

Figure 14A:
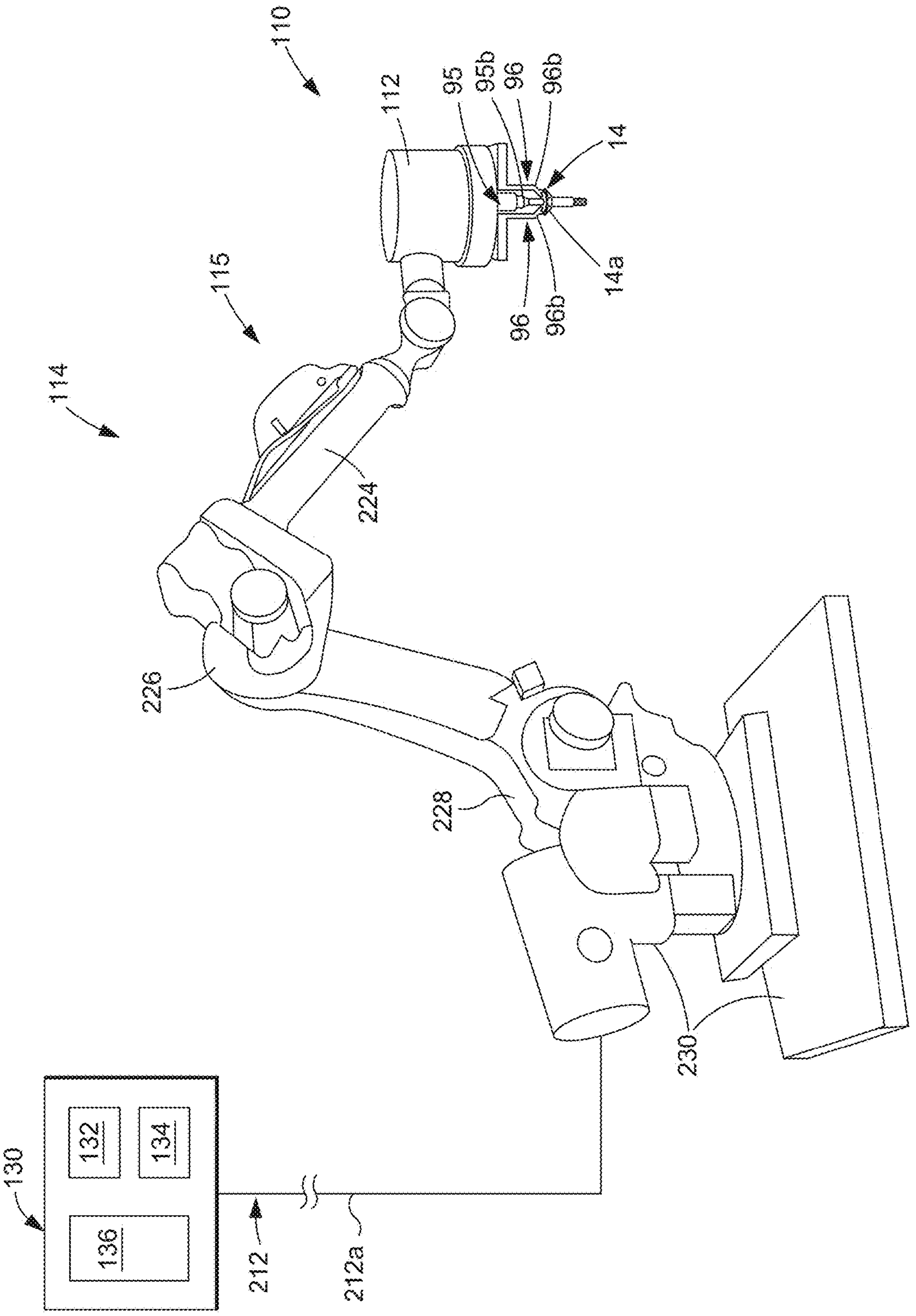
FIG. 14A is an illustration of a side perspective view of a version of an automated installation system that may be used in a version of an automated fastener system and an automated method of the disclosure, showing a robotic system having an end effector coupled to end effector gripper fingers holding a fastener and washer assembly.
Figure 14B:
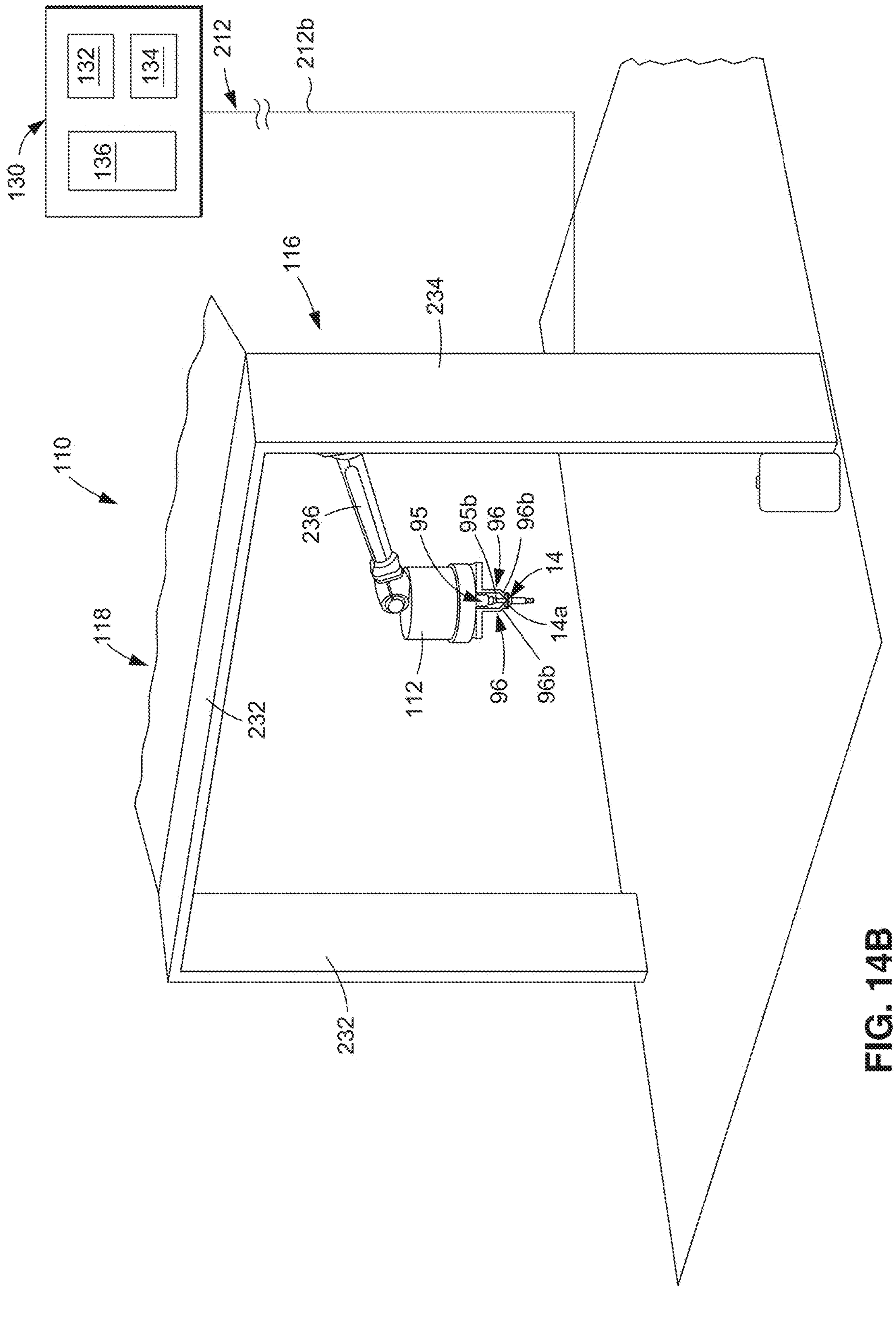
FIG. 14B is an illustration of a side perspective view of another version of an automated installation system that may be used in a version of an automated fastener system and an automated method of the disclosure, showing a gantry system having an end effector coupled to end effector gripper fingers holding a fastener and washer assembly.

As further shown in FIG. 1, the automated fastener system 10 comprises an automated installation system 110. The automated installation system 110 has an end effector 112 with two or more gripper fingers 96 (see FIGS. 14A-14B), such as two or more end effector gripper fingers 96*b* (see FIGS. 1, 14A-14B), configured to pick up from the delivery device 102 (see FIGS. 1, 7-9), one or more of, the selected fastener 26*a*, the selected washer 16*a*, or the fastener and washer assembly 14, and further configured to install the fastener and washer assembly 14 in a structure 40 (see FIGS. 1, 17), such as an aircraft structure 42 (see FIGS. 1, 17), for example, a composite aircraft structure 42*a* (see FIG. 17), or another suitable structure. As shown in FIGS. 14A-14B, the end effector 112 is also coupled to a center shaft 95, such as an end effector center shaft 95*b*.

In one version, as show in FIG. 14A, the automated installation system 110 further comprises the end effector 112 coupled to a robotic system 114 with a robot 115. The robotic system 114 is discussed in further detail below with regard to FIG. 14A. In another version, as show in FIG. 14B, the automated installation system 110 further comprises the end effector 112 coupled to a gantry system 116 with a gantry 118. The gantry system 116 is discussed in further detail below with regard to FIG. 14B.

As shown in FIG. 1, in one version, the automated installation system 110 may further comprise an alignment assembly 120 coupled to the end effector 112 of the automated installation system 110. The positioning of the alignment assembly 120 depends on the type of end effector 112 used in the automated installation system 110. As shown in FIG. 1, the alignment assembly 120 comprises one or more linear actuators 122 and alignment guides 124, to move one or more of, the fastener and washer assembly 14, the selected fastener 26*a*, or the selected washer 16*a*, to and from different positions in the automated installation system 110, such as home, pick-up, and installation 38. The end effector gripper fingers 96*b* of the end effector 112 grip one of, the fastener and washer assembly 14, the selected fastener 26*a*, or the selected washer 16*a*, from the delivery device 102, such as the delivery shuttle 104. If the automated washer installation 12 takes place at the automated installation system 110, as shown in FIG. 9, the selected washer 16*a* and the selected fastener 26*a* are assembled, via the automated washer installation 12, and the end effector gripper fingers 96*b* install the fastener and washer assembly 14 partially or fully in a hole 126 (see FIGS. 3B, 6B), such as a hole bore, in the structure 40 (see FIGS. 3B, 6B). If the automated washer installation 12 takes place prior to delivery of the fastener and washer assembly 14 to the automated installation system 110, the end effector gripper fingers 96*b* grip the fastener and washer assembly 14 out of the delivery shuttle 104 and install the fastener and washer assembly 14 partially or fully in the hole 126 (see FIGS. 3B, 6B) in the structure 40 (see FIGS. 3B, 6B).

The method of installation 38 depends on the type of fastener 26, such as the selected fastener 26*a*, and a fit of the fastener 26, such as the selected fastener 26*a*, in the hole 126, such as the hole bore. The alignment assembly 120 is configured to align, and aligns, the fastener and washer assembly 14 with the hole 126 in the structure 40 (see FIG. 1), such as the aircraft structure 42 (see FIG. 1), and maintains an alignment position (POS.) 128 (see FIG. 1) of the fastener and washer assembly 14, until the selected fastener 26*a* is partially inserted through the hole 126 in the structure 40 and partially installed in the structure 40. The alignment assembly 120 (see FIG. 1) is controlled with the control system 130 (see FIGS. 1, 7-9).

As further shown in FIG. 1, the automated fastener system 10 comprises a control system 130 comprising at least a controller 132, one or more power supplies 134, and a computer system 136. The control system 130 is configured to control the automated fastener system 10, including the automated washer installation 12. As shown in FIG. 1, the computer system 136 comprises at least a computer 138 and a computer software program 140 implementing a control logic 142. For example, with the washer material verification system 86, the control logic 142 implemented by the computer software program 140 uses the electrical conductivity measurement 89 of the selected washer 16*a*, such as the selected aircraft washer 18*a*, to compare against a predetermined electrical conductivity value range of a predetermined base washer material, to obtain a base washer material determination of the selected washer 16*a*, such as the selected aircraft washer 18*a*. The control logic 142 compares the electrical conductivity measurement 89 to the predetermined electrical conductivity value range of the predetermined base washer material to obtain the base washer material determination, which is based on the difference in value between the electrical conductivity measurement 89 that is actually measured and the predetermined electrical conductivity value range. As used here, "predetermined electrical conductivity value range" means a standard or known electrical conductivity value range of a known base washer material measured by an eddy current conductivity probe or another suitable conductivity measuring device. The computer system 136 is discussed in further detail below with regard to FIG. 15.

In the automated fastener system 10, the automated washer installation 12 is performed at one or more of, before inspection of the selected fastener 26*a* by the automated inspection system 94, after inspection of the selected fastener 26*a* by the automated inspection system 94 such as before transfer to the automated delivery system 100 and to the automated installation system 110, or after delivery of the selected fastener 26*a* and the selected washer 16*a* by the automated delivery system 100 to the automated installation system 110. When the aircraft structure 42 (see FIGS. 1, 17) is installed in a wing 284 (see FIG. 17), or a fuselage 282 (see (FIG. 17), or a tail 288 (see FIG. 17), of an aircraft 280*a* (see FIG. 17), the fastener and washer assembly 14 (see FIG. 1), such as the aircraft fastener and conductive washer assembly 14*a* (see FIG. 1), is configured to distribute current 144 (see FIG. 17), or energy, in a current path 144*a* (see FIG. 17), from a lightning strike 294 (see FIG. 17) made to the aircraft structure 42 through the fastener and washer assembly 14, such as the aircraft fastener and conductive washer assembly 14*a*, to the aircraft structure 42.

In another version of the disclosure, there is provided an automated fastener system 10 (see FIG. 1) having automated washer installation 12 (see FIG. 1). The automated fastener system 10 comprises the automated washer feed system 60 (see FIGS. 1, 7-9) holding and dispensing one or more conductive washers 20 (see FIGS. 1, 7-9), and providing a selected conductive washer 20*a* (see FIGS. 1, 7-9) for the automated washer installation 12. Each of the one or more conductive washers 20 is preferably one of, a countersunk washer 22 (see FIGS. 1, 2A), or a chamfer washer 25 (see FIGS. 1, 4A).

The automated fastener system 10 further comprises the automated fastener holder assembly 90 (see FIGS. 1, 10) holding and dispensing one or more aircraft fasteners 28 (see FIGS. 1, 10), and providing a selected aircraft fastener 28*a* (see FIGS. 1, 10) for the automated washer installation 12. Each of the one or more aircraft fasteners 28 may comprise one or more of, a countersunk fastener 30 (see FIG. 2A), a protruding head fastener 32 (see FIG. 4A), a clearance fit fastener 34 (see FIG. 3B), an interference fit fastener 36 (see FIG. 3C), a transition fit fastener 37 (see FIG. 1), or another suitable fastener.

With the automated washer installation 12, the selected aircraft fastener 28*a* is inserted in the selected conductive washer 20*a*, so that the selected conductive washer 20*a* is in contact with, and positioned under, a fastener head 160 (see FIG. 2B) of the selected aircraft fastener 28*a*, to obtain an aircraft fastener and conductive washer assembly 14*a* (see FIG. 1).

The automated fastener system 10 further comprises the automated shuttle assembly 70 (see FIGS. 1, 7-9, 10A-10B) having one or more shuttle cups 68 (see FIGS. 1, 7-9, 10A-10B), wherein a selected shuttle cup 68*a* (see FIGS. 1, 7-9) receives and transports one of, the selected conductive washer 20*a* from the automated washer feed system 60, the selected aircraft fastener 28*a* from the automated fastener holder assembly 90, or the aircraft fastener and conductive washer assembly 14*a*.

The automated fastener system 10 further comprises the automated inspection system 94 (see FIGS. 1, 7-9, 11) having two or more inspection gripper fingers 96*a* (see FIGS. 1, 11) configured to pick up, to inspect, and to release one of, the selected aircraft fastener 28*a*, or the aircraft fastener and conductive washer assembly 14*a*.

The automated fastener system 10 further comprises the automated delivery system 100 (see FIGS. 1, 13) having a delivery device 102 (see FIG. 1, 13) configured to transport one or more of, the selected aircraft fastener 28*a*, the selected conductive washer 20*a*, or the aircraft fastener and conductive washer assembly 14*a*.

Figure 17:
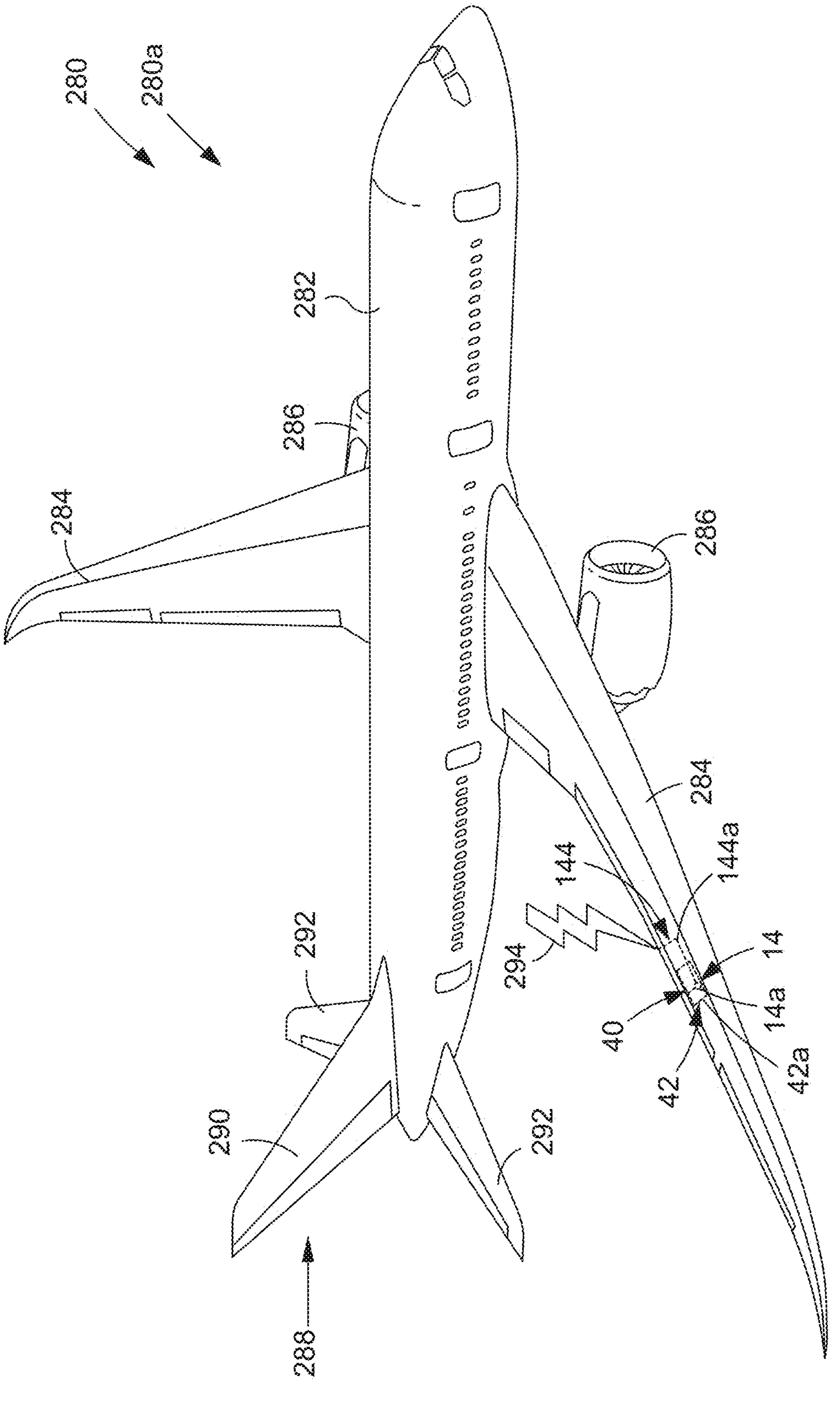
FIG. 17 is an illustration of a perspective view of an aircraft that incorporates aircraft structures having fastener and washer assemblies of a type that can undergo installation with versions of an automated fastener system and an automated method of the disclosure.

The automated fastener system 10 further comprises the automated installation system 110 (see FIGS. 1, 7-9, 14A-14B) having an end effector 112 (see FIGS. 1, 14A-14B) with two or more end effector gripper fingers 96*b* (see FIGS. 1, 14A-14B) configured to pick up from the delivery device 102, one or more of, the selected aircraft fastener 28*a*, the selected conductive washer 20*a*, or the aircraft fastener and conductive washer assembly 14*a*, and further configured to install the aircraft fastener and conductive washer assembly 14*a* in an aircraft structure 42 (see FIGS. 1, 17).

The automated fastener system 10 further comprises the control system 130 (see FIGS. 1, 7-9) comprising at least a controller 132 (see FIGS. 1, 7-9), one or more power supplies 134 (see FIGS. 1, 7-9, 15), and a computer system 136 (see FIGS. 1, 7-9, 15). The control system 130 is configured to control the automated fastener system 10 and the automated washer installation 12.

The automated washer installation 12 is performed at one or more of, before inspection of the selected aircraft fastener 28*a* by the automated inspection system 94, after inspection of the selected aircraft fastener 28*a* by the automated inspection system 94 such as before transfer to the automated delivery system 100 and to the automated installation system 110, or after delivery of the selected aircraft fastener 28*a* and the selected conductive washer 20*a* by the automated delivery system 100 to the automated installation system 110.

When the aircraft structure 42 (see FIGS. 1, 17) is installed in a wing 284 (see FIG. 17), or a fuselage 282 (see (FIG. 17), or a tail 288 (see FIG. 17), of an aircraft 280*a* (see FIG. 17), the fastener and washer assembly 14 (see FIG. 1), such as the aircraft fastener and conductive washer assembly 14*a* (see FIG. 1), is configured to distribute current 144 (see FIG. 17), or energy, in a current path 144*a* (see FIG. 17), from a lightning strike 294 (see FIG. 17) made to the aircraft structure 42 through the fastener and washer assembly 14, such as the aircraft fastener and conductive washer assembly 14*a*, to the aircraft structure 42.

Figure 2B:
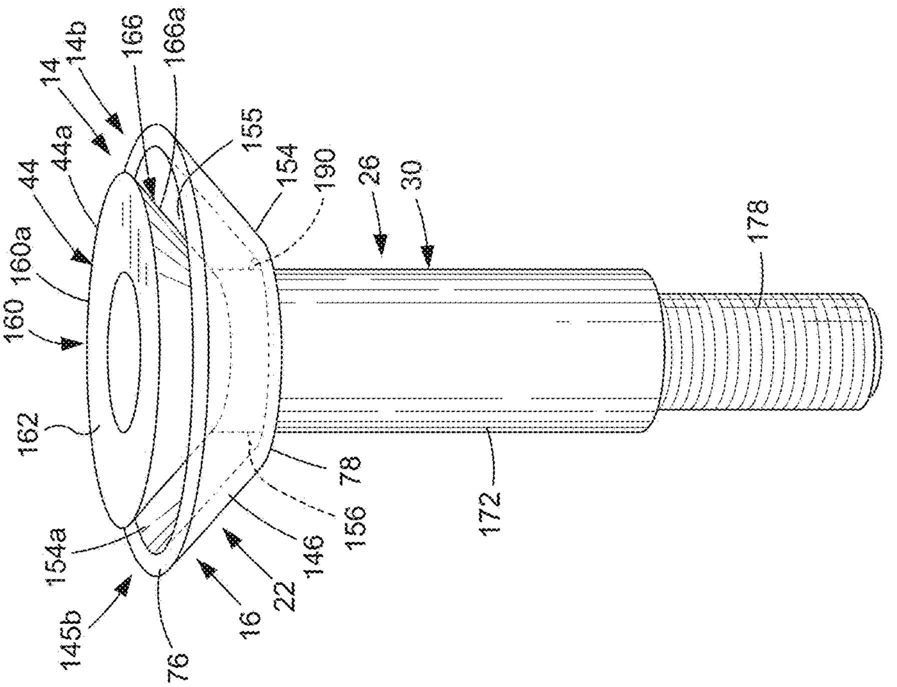
FIG. 2B is an illustration of a front perspective view of the fastener and washer assembly of FIG. 2A, where the fastener and washer assembly is in a partially assembled position.
Figure 2A:
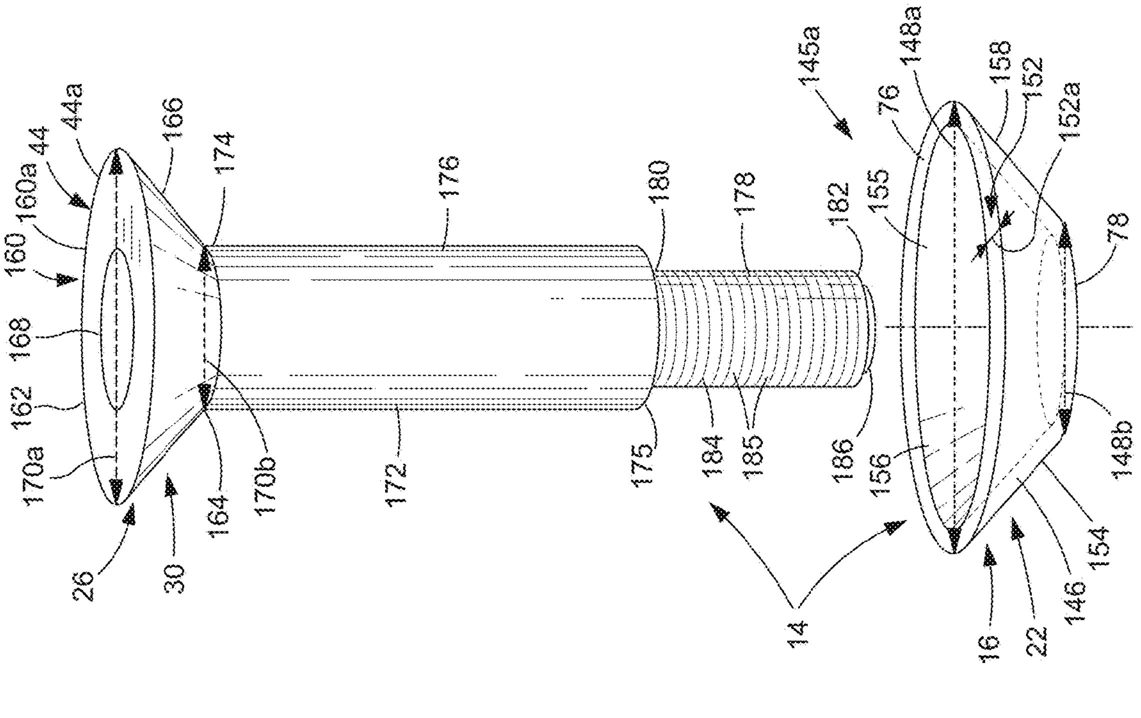
FIG. 2A is an illustration of a front perspective view of an exemplary fastener and washer assembly that may be used in versions of the automated fastener system of the disclosure, where the fastener and washer assembly is in a disassembled position.

Now referring to FIG. 2A, FIG. 2A is an illustration of a front perspective view of an exemplary fastener and washer assembly 14 that may be used in versions of the automated fastener system 10 (see FIG. 1) and the automated method 270 (see FIG. 16B) of the disclosure, where the fastener and washer assembly 14 is in a disassembled position 145*a*.

The washer 16 shown in FIG. 2A is a countersunk washer 22. The washer 16, such as the countersunk washer 22, may comprise a conductive washer 20 (see FIG. 1), or may not comprise a conductive washer 20.

As shown in FIG. 2A, the washer 16 has the top end 76, the bottom end 78, and a washer body 146 formed between the top end 76 and the bottom end 78. As shown in FIG. 2A, the top end 76 has a top end outer diameter 148*a*, and the bottom end 78 has a bottom end outer diameter 148*b*, where the top end outer diameter 148*a* has a length that is greater than a length of the bottom end outer diameter 148*b*. The washer body 146 has a truncated cone shape 150 (see FIG. 2A) and a thickness 152 (see FIG. 2A) that is preferably a uniform thickness 152*a*.

As further shown in FIG. 2A, the washer body 146 has washer sides 154 that are angled or sloped inwardly and downwardly from the top end 76 to the bottom end 78. The washer sides 154 are underneath portions positioned underneath the top end 76. The washer sides 154 have one or more washer side portions that, in one version, may be contacted by one or more eddy current conductivity probes or another conductivity measuring device of the washer material verification system 86 (see FIG. 1), to obtain an electrical conductivity measurement 89 (see FIG. 1) of the washer 16, such as the countersunk fastener 30. As further shown in FIG. 2A, the washer 16 has a through opening 155 formed through the washer body 146 from the top end 76 to the bottom end 78. The top end 76 of the through opening 155 is larger in size than the bottom end 78 of the through opening 155. As shown in FIG. 2A, the washer 16 has an interior 156 and an exterior 158.

The fastener 26 shown in FIG. 2A is a countersunk fastener 30 in the form of a bolt 44, such as a countersunk bolt 44*a*. As shown in FIG. 2A, the fastener 26 has a fastener head 160, such as a countersunk fastener head 160*a*, having a top end 162, a bottom end 164, and sides 166 that are angled or sloped inwardly and downwardly from the top end 162 to the bottom end 164. The sides 166 are underneath portions positioned underneath the top end 162 of the fastener head 160.

As further shown in FIG. 2A, the top end 162 of the fastener head 160 has an alignment portion 168, or alignment mark or point, formed on the surface of the top end 162. The alignment portion 168 is configured to align with a center shaft end 95*c* (see FIG. 11) of the center shaft 95 (see FIG. 11), such as an end of the inspection center shaft 95*a* (see FIG. 11), of the automated inspection system 94 (see FIG. 11), and is also configured to align with the center shaft end 95*c* of the center shaft 95 (see FIG. 14A), such as the end of the end effector center shaft 95*b* (see FIG. 14A), of the automated installation system 110 (see FIG. 14A).

As further shown in FIG. 2A, the top end 162 of the fastener head 160 has a fastener head top end outer diameter 170*a*, and the bottom end 164 of the fastener head 160 has a fastener head bottom end outer diameter 170*b*. As shown in FIG. 2A, the top end outer diameter 148*a* of the top end 76 of the washer 16 has a length that is greater than a length of the fastener head top end outer diameter 170*a*, and the bottom end outer diameter 148*b* of the bottom end 78 of the washer 16 has a length that is greater than a length of the fastener head bottom end outer diameter 170*b*, so that the fastener head 160 can be seated and fitted within the interior 156 (see FIGS. 2A-2B) of the washer 16.

As further shown in FIG. 2A, the fastener 26 has a fastener shank 172 with a first end 174, a second end 175, and a shank body 176 disposed between the first end 174 and the second end 175. As shown in FIG. 2A, the first end 174 of the fastener shank 172 is integral with the bottom end 164 of the fastener head 160.

As further shown in FIG. 2A, the fastener 26 has a tail end 178 having a first end 180, a second end 182, and a threaded body 184 disposed between the first end 180 and the second end 182. As shown in FIG. 2A, the first end 180 of the tail end 178 is integral with the second end 175 of the fastener shank 172. The threaded body 184 has a plurality of threads 185 (see FIG. 2A). The tail end 178 further has a pintail 186 (see FIG. 2A) at the second end 182.

Now referring to FIG. 2B, FIG. 2B is an illustration of a front perspective view of the fastener and washer assembly 14 of FIG. 2A, where the fastener and washer assembly 14 is in a partially assembled position 145*b* with the fastener shank 172 and tail end 178 of the fastener, such as the countersunk fastener 30, in the form of the bolt 44, such as the countersunk bolt 44*a*, is inserted through the through opening 155 of the washer 16, such as the countersunk washer 22, so that the fastener head 160 is partially within the interior 156 of the washer 16. In one version, as shown in FIG. 2B, the fastener and washer assembly 14 comprises a countersunk fastener and countersunk washer assembly 14*b*.

FIG. 2B shows the washer 16, such as the countersunk washer 22, having the top end 76, the bottom end 78, and the washer body 146 formed between the top end 76 and the bottom end 78 and having the washer sides 154. Interior washer sides 154*a* (see FIG. 2B) of the interior 156 (see FIG. 2B) of the washer 16 are adjacent, or in proximity, to exterior sides 166*a* of the fastener head 160.

Figure 3B:
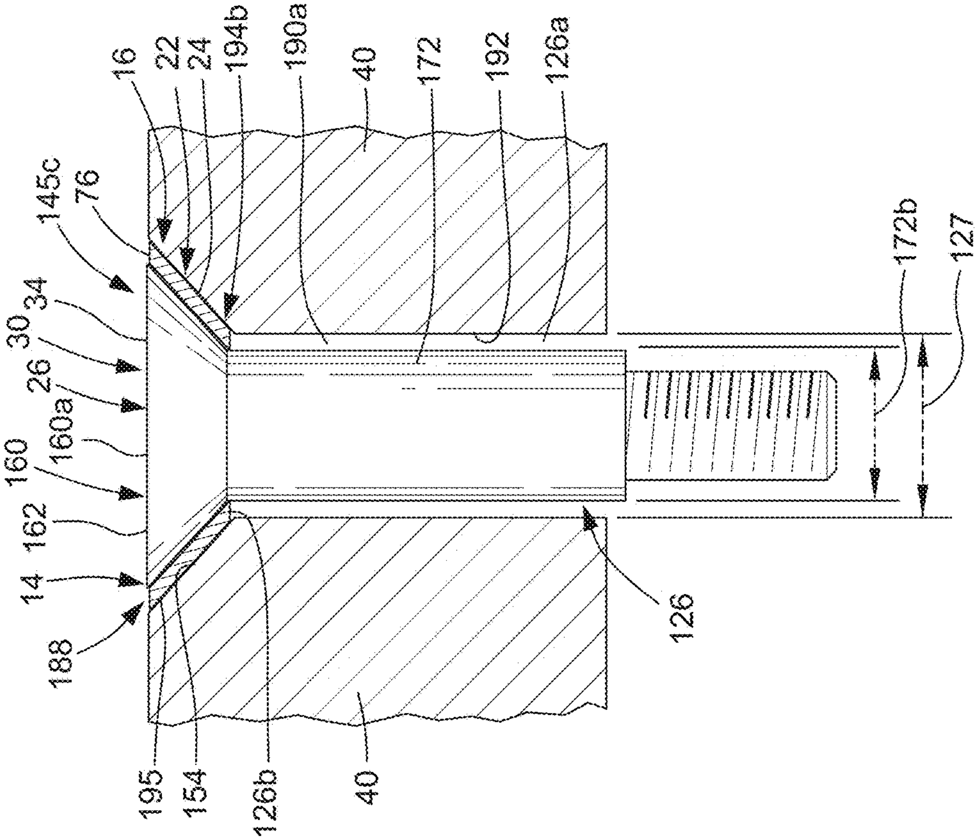
FIG. 3B is a front partial sectional view of the fastener and washer assembly of FIG. 3A, where the fastener and washer assembly is in an assembled position and in an installed position in the structure.

As shown in FIG. 2B, the top end 162 of the fastener head 160, such as the countersunk fastener head 160*a*, is positioned slightly above the top end 76 of the washer 16, and the bottom end 164 of the fastener head 160 is positioned slightly above the bottom end 78 of the washer 16, such as the countersunk washer 22. As shown in FIG. 3B, when the fastener and washer assembly 14 is in an assembled position 145*c*, the top end 162 of the fastener head 160, such as the countersunk fastener head 160*a*, is preferably positioned in a flush position 188 with the top end 76 of the washer 16, such as the countersunk washer 22.

With the automated washer installation 12 (see FIGS. 1, 7-9), the selected fastener 26*a* (see FIGS. 1, 7-9) is inserted in the selected washer 16*a* (see FIGS. 1, 7-9), so that the selected washer 16*a* is in contact with, and positioned under, the fastener head 160 of the selected fastener 26*a*, under the top end 162 and under the bottom end 164 of the fastener head 160, such as the countersunk fastener head 160*a*, to obtain the fastener and washer assembly 14 (see FIG. 1).

As shown in FIG. 2B, when the washer 16, such as the countersunk washer 22, comprises a clearance fit washer 23 there is a gap 190 between the fastener shank 172 and the bottom end 78 of the clearance fit washer 23 in the interior 156 of the clearance fit washer 23.

Figure 2D:
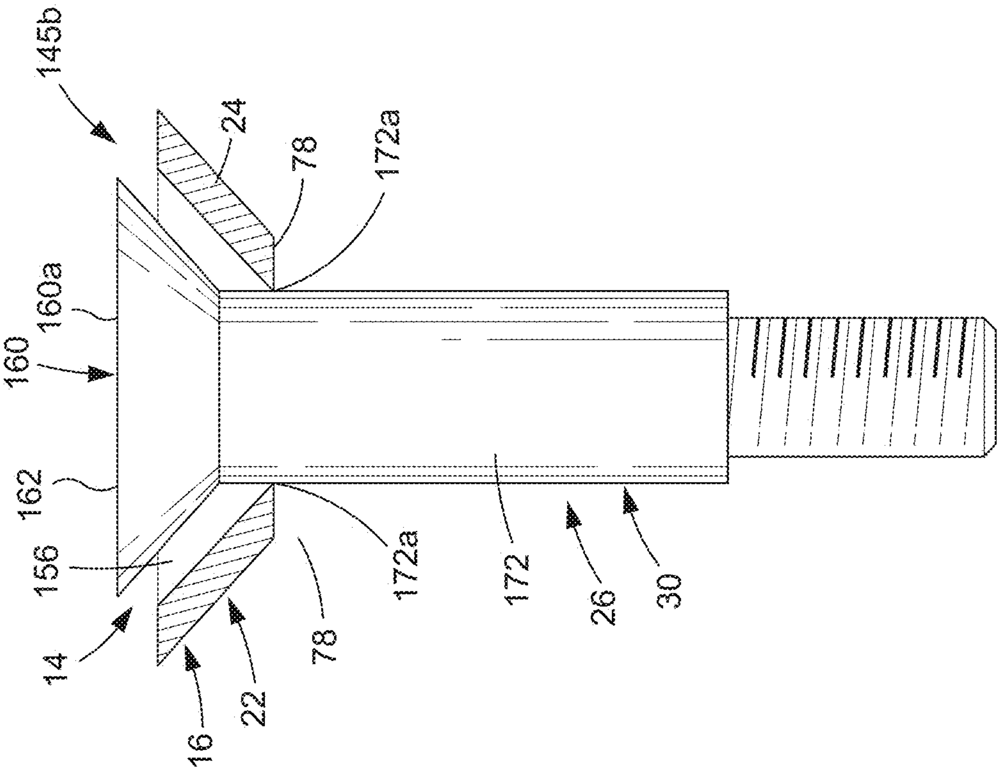
FIG. 2D is an illustration of a front partial sectional view of another version of a fastener and washer assembly, showing an interference fit washer positioned under a fastener head of a fastener.
Figure 2C:
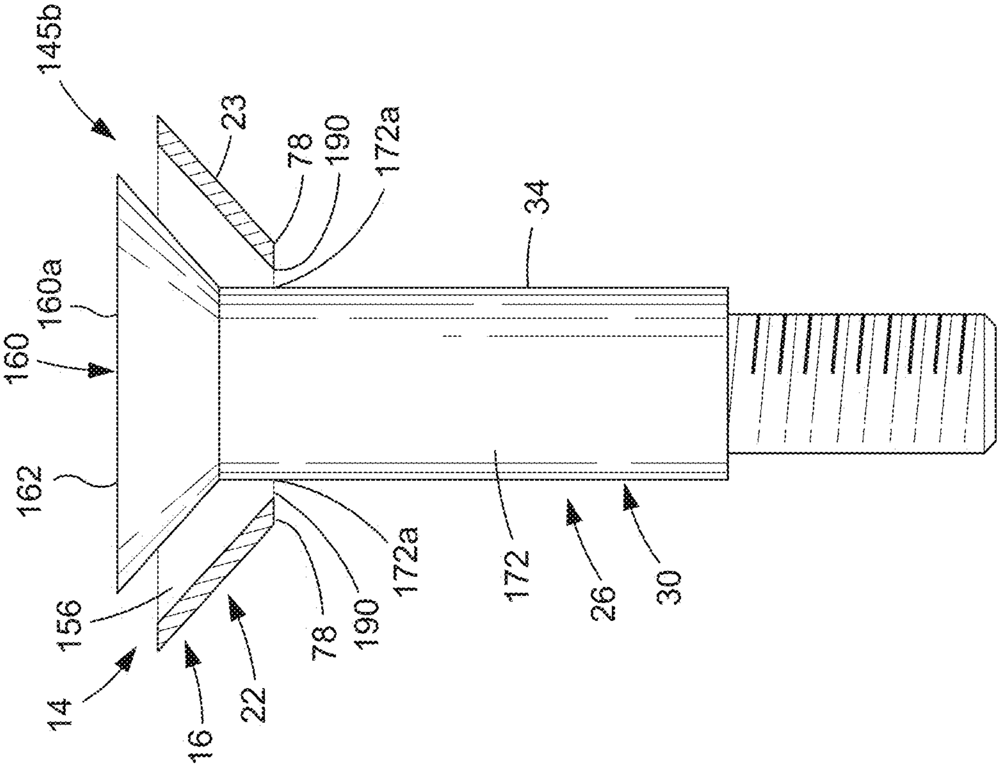
FIG. 2C is an illustration of a front partial sectional view of the fastener and washer assembly of FIG. 2B, showing a clearance fit washer positioned under a fastener head of the fastener.

Now referring to FIG. 2C, FIG. 2C is an illustration of a front partial sectional view of the fastener and washer assembly 14 of FIG. 2B, in the partially assembled position 145*b*, showing the washer 16, such as the countersunk washer 22, in the form of the clearance fit washer 23, positioned under the fastener head 160, such as the countersunk fastener head 160*a*, of the fastener 26, such as the countersunk fastener 30. As shown in FIG. 2C, the fastener 26 may comprise a clearance fit fastener 34 (see also FIG.

3B). As shown in FIG. 2C, in one version, with the clearance fit washer 23 there is the gap 190 between fastener shank portions 172*a* of the fastener shank 172 and the bottom end 78 of the clearance fit washer 23 in the interior 156 of the clearance fit washer 23. The clearance fit washer 23 may be used with the clearance fit fastener 34 (see FIGS. 2C, 3B), with the interference fit fastener 36 (see FIG. 3C), with the transition fit fastener 37 (see FIG. 1), or with another suitable fastener.

Now referring to FIG. 2D, FIG. 2D is an illustration of a front partial sectional view of another version of a fastener and washer assembly 14, in the partially assembled position 145*b*, showing the washer 16, such as the countersunk washer 22, in the form of the interference fit washer 24, positioned under the fastener head 160, such as the countersunk fastener head 160*a*, of the fastener 26, such as the countersunk fastener 30.

Figure 3A:
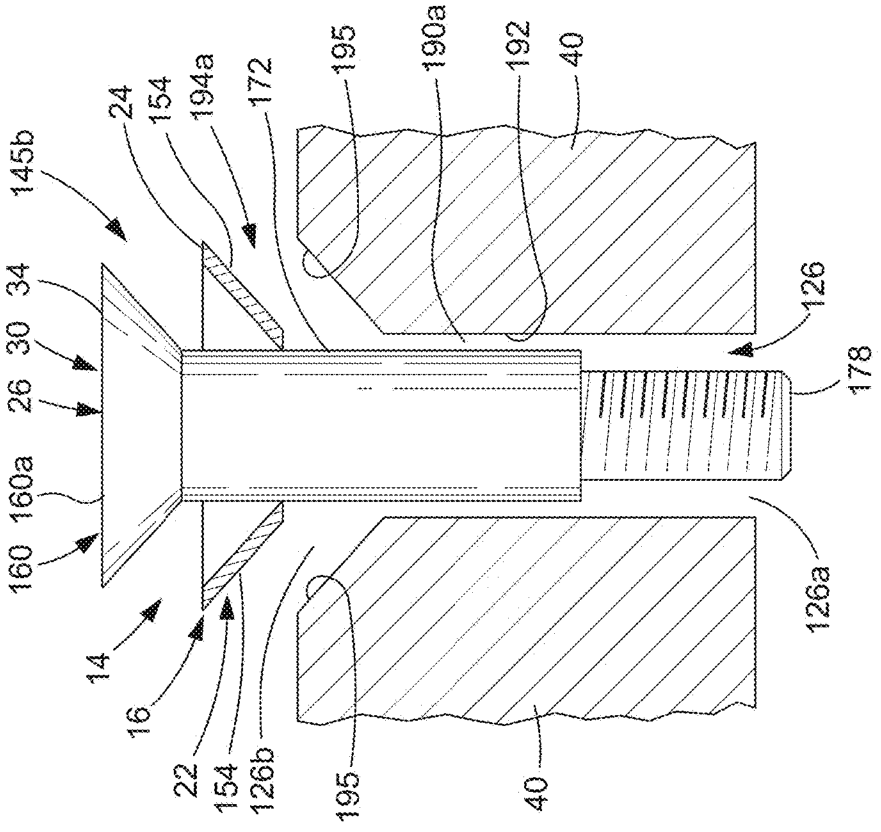
FIG. 3A is a front partial sectional view of the fastener and washer assembly of FIG. 2C, in a partially assembled position and in a partially installed position in a structure, and where the fastener is a clearance fit fastener.
Figure 3C:
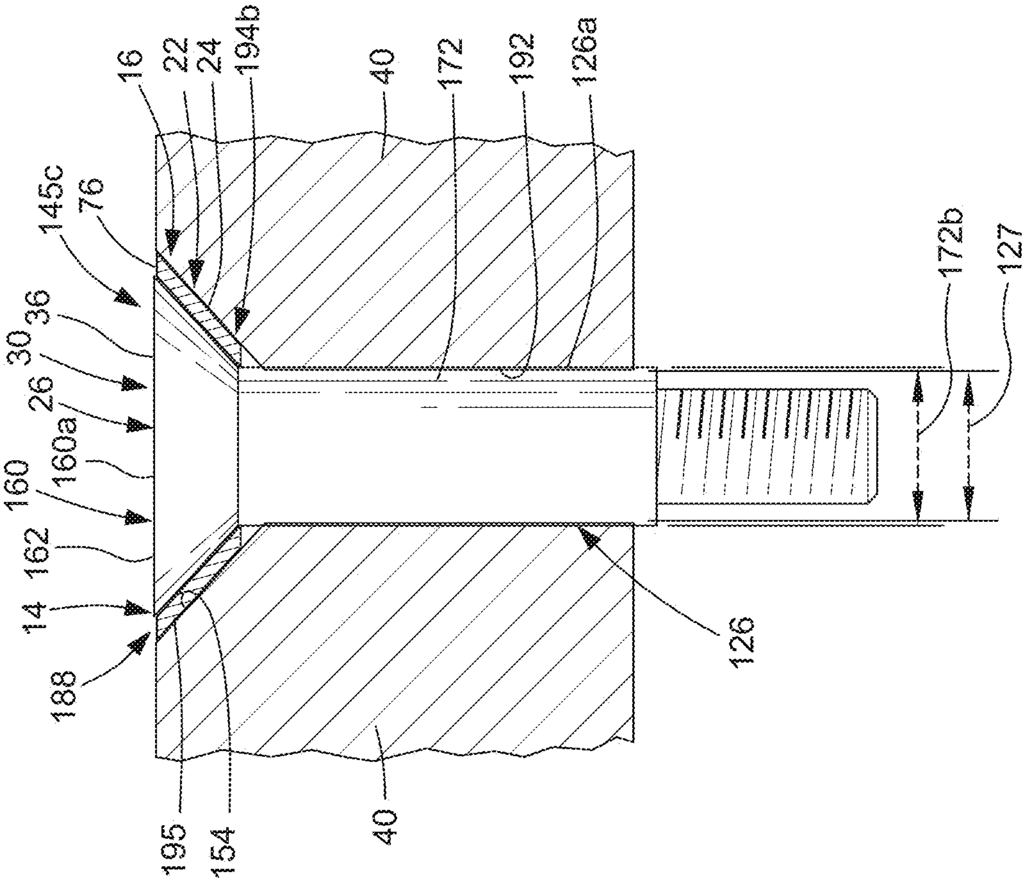
FIG. 3C is a front partial sectional view of another version of a fastener and washer assembly in an assembled position and in an installed position in a structure, where the fastener is an interference fit fastener.

As shown in FIG. 2D, the fastener 26 may comprise the interference fit fastener 36 (see also FIG. 3C). As shown in FIG. 2D, in one version, with the interference fit washer 24 there is no gap between fastener shank portions 172*a* of the fastener shank 172 and the bottom end 78 of the interference fit washer 24 in the interior 156 of the interference fit washer 24. The interference fit washer 24 may be used with the clearance fit fastener 34, with the interference fit fastener 36, with the transition fit fastener 37 (see FIG. 1), or with another suitable fastener. The interference fit of the interference fit washer 24 and the interference fit fastener 36 is also referred to as press fit or friction fit.

Now referring to FIG. 3A, FIG. 3A is a front partial sectional view of the fastener and washer assembly 14 of FIG. 2C, in the partially assembled position 145*b* and in a partially installed position 194*a* in a hole 126 in a structure 40, and where the fastener 26, such as the countersunk fastener 30, is the clearance fit fastener 34. In this version, as shown in FIG. 3A, the hole 126 comprises a shank hole portion 126*a* in which the fastener shank 172 is positioned within a fastener head hole portion 126*b* in which the fastener head 160 is positioned within. FIG. 3A shows the fastener and washer assembly 14 in the partially installed position 194*a* with the fastener shank 172 and the tail end 178 of the fastener 26 inserted through the hole 126 such as the bore hole formed through the structure 40.

FIG. 3A further shows the gap 190*a* between the fastener shank 172 and the interior wall 192 of the structure 40, when the fastener shank 172 is inserted into the hole 126 of the structure 40. FIG. 3A further shows countersunk angled portions 195 configured to align with and against the washer sides 154 of the washer 16, such as the countersunk washer 22, for example, the interference fit washer 24. FIG. 3A shows the fastener head 160, such as the countersunk fastener head 160*a*, positioned above the washer 16.

Now referring to FIG. 3B, FIG. 3B is a front partial sectional view of the fastener and washer assembly 14 of FIG. 3A, where the fastener and washer assembly 14 is in an assembled position 145*c*, and in an installed position 194*b* in the structure 40, and where the fastener 26, such as the countersunk fastener 30, is the clearance fit fastener 34. As shown in FIG. 3B, when the fastener and washer assembly 14 is in the assembled position 145*c* and in the installed position 194*b*, the top end 162 of the fastener head 160, such as the countersunk fastener head 160*a*, is positioned in the flush position 188 with the top end 76 of the washer 16, such as the countersunk washer 22, for example, the interference fit washer 24. FIG. 3B further shows the washer side 154 of the washer 16 in contact with, and seated against, the countersunk angled portion 195 of the structure 40 and inserted in the fastener head hole portion 126*b*.

FIG. 3B further shows the gap 190*a* between the fastener shank 172 and an interior wall 192 of the structure 40, when the fastener and washer assembly 14 is inserted into the hole 126 of the structure 40 in the installed position 194*b*. As shown in FIG. 3B, a hole diameter 127 of the hole 126, such as the shank hole portion 126*a*, has a greater length than a length of a fastener shank diameter 172*b* of the fastener shank 172. Thus, with the clearance fit fastener 34, the hole 126, such as the shank hole portion 126*a*, is larger in size than the size of the fastener shank 172, and the fastener shank 172 is smaller in size than the size of the hole 126, such as the shank hole portion 126*a*.

Now referring to FIG. 3C, FIG. 3C is a front partial sectional view of another version of a fastener and washer assembly 14 in an assembled position 145*c*, and in the installed position 194*b* in the structure 40, and where the fastener 26, such as the countersunk fastener 30, is an interference fit fastener 36.

As shown in FIG. 3C, when the fastener and washer assembly 14 is in the assembled position 145*c* and in the installed position 194*b*, the top end 162 of the fastener head 160, such as the countersunk fastener head 160*a*, is positioned in the flush position 188 with the top end 76 of the washer 16, such as the countersunk washer 22, for example, the interference fit washer 24. FIG. 3C further shows the washer side 154 of the washer 16 in contact with, and seated against, the countersunk angled portion 195 of the structure 40 and inserted in the fastener head hole portion 126*b*.

As shown in FIG. 3C, there is no gap between the fastener shank 172 and the interior wall 192 of the structure 40, when the fastener and washer assembly 14 is inserted into the hole 126 of the structure 40 in the installed position 194*b*. With the interference fit fastener 36 installed in the hole 126, the fastener shank diameter 172*b* (see FIG. 3C) of the fastener shank 172 has a slightly greater length and size than the hole diameter 127 (see FIG. 3C) of the hole 126, such as the shank hole portion 126*a*, since the fastener shank 172 of the interference fit fastener 36 is press fit or friction fit into the hole 126, such as the shank hole portion 126*a*. Thus, with the interference fit fastener 36, the hole 126, such as the shank hole portion 126*a*, is smaller in size than the size of the fastener shank 172, and the fastener shank 172 is larger in size than the size of the hole 126, such as the shank hole portion 126*a*, and the interference fit fastener 36 is press fit or friction fit into the hole 126. The transition fit fastener 37 (see FIG. 1) may provide either clearance fit or interference fit, depending on individual tolerances, with the tolerance zones of the hole 126 and the fastener shank overlapping between clearance fit and interference fit.

Figure 4A:
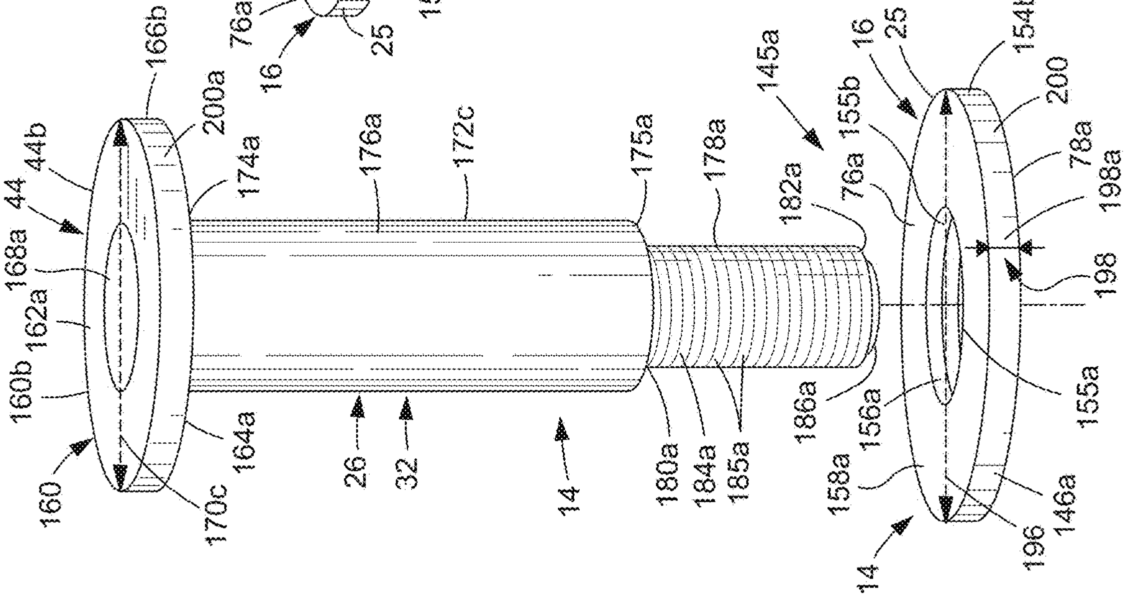
FIG. 4A is an illustration of a front perspective view of another exemplary fastener and washer assembly that may be used in versions of the automated fastener system of the disclosure, where the fastener and washer assembly is in a disassembled position, and the fastener is a protruding head fastener and the washer is a chamfer washer.

Now referring to FIG. 4A, FIG. 4A is an illustration of a front perspective view of another exemplary fastener and washer assembly 14 that may be used in versions of the automated fastener system 10 (see FIG. 1) and the automated method 270 (see FIG. 16B) of the disclosure, where the fastener and washer assembly 14 is in the disassembled position 145*a*, and the fastener 26 is a protruding head fastener 32.

The washer 16 shown in FIG. 4A is a chamfer washer 25. The washer 16, such as the chamfer washer 25, may comprise a conductive washer 20 (see FIG. 1), or may not comprise a conductive washer 20.

Figure 5A:
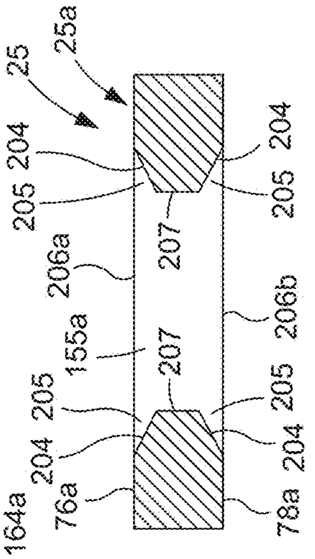
FIG. 5A is a front cross-sectional view of a symmetrical chamfer washer.
Figure 5B:
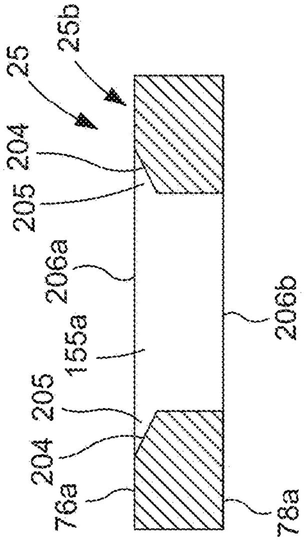
FIG. 5B is a front cross-sectional view of a nonsymmetrical chamfer washer.

As shown in FIG. 4A, the washer 16 has a top end 76*a*, a bottom end 78*a*, and a washer body 146*a* formed between the top end 76*a* and the bottom end 78*a*. As shown in FIG. 4A, the washer 16, such as the chamfer washer 25, has an outer diameter 196 and a thickness 198, such as a uniform thickness 198*a*, around the circumference of the chamfer washer 25. As shown in FIG. 4A, the washer body 146*a* has a through opening 155*a* formed through an interior 156*a* of the washer body 146*a*, and the washer body 146*a* has an exterior 158*a*. As shown in FIG. 5A, with a symmetrical chamfer washer 25*a*, the through opening 155*a* at the top end 76*a* is the same size as the through opening 155*a* at the bottom end 78*a*. As shown in FIG. 5B, with a nonsymmetrical chamfer washer 25*b* the through opening 155*a* at the top end 76*a* is larger in size than the through opening 155*a* at the bottom end 78*a*. The washer body 146*a*, as shown in FIG. 4A, has a disc shape 200.

As further shown in FIG. 4A, the washer body 146*a* has washer sides 154*b* that are straight, or substantially straight, and extend between the top end 76*a* and the bottom end 78*a*. The washer sides 154 have one or more washer side portions that, in one version, may be contacted by one or more eddy current conductivity probes or another conductivity measuring device of the washer material verification system 86 (see FIG. 1), to obtain an electrical conductivity measurement 89 (see FIG. 1) of the washer 16, such as the chamfer washer 25.

The fastener 26 shown in FIG. 4A is a protruding head fastener 32 in the form of a bolt 44, such as a protruding head bolt 44*b*. As shown in FIG. 4A, the fastener 26 has a fastener head 160, such as a protruding fastener head 160*b*, having a top end 162*a*, a bottom end 164*a*, and sides 166*b* that are straight, or substantially straight, and extend between the top end 162*a* and the bottom end 164*a*. The protruding fastener head 160*b* has a disc shape 200*a*. As further shown in FIG. 4A, the top end 162*a* of the protruding fastener head 160*b* has a protruding fastener head outer diameter 170*c*. As shown in FIG. 4A, the outer diameter 196 of the chamfer washer 25 has a length that is greater than a length of the protruding fastener head outer diameter 170*c*.

As further shown in FIG. 4A, the top end 162*a* of the protruding fastener head 160*b* has an alignment portion 168*a*, or alignment mark or point, formed on the surface of the top end 162*a*. The alignment portion 168*a* is configured to align with the center shaft end 95*c* (see FIG. 11) of the center shaft 95 (see FIG. 11), such as the end of the inspection center shaft 95*a* (see FIG. 11), of the automated inspection system 94 (see FIG. 11), and is also configured to align with the center shaft end 95*c* of the center shaft 95 (see FIG. 14A), such as the end of the end effector center shaft 95*b* (see FIG. 14A), of the automated installation system 110 (see FIG. 14A).

As further shown in FIG. 4A, the protruding head fastener 32 has a fastener shank 172*c* with a first end 174*a*, a second end 175*a*, and a shank body 176*a* disposed between the first end 174*a* and the second end 175*a*. As shown in FIG. 4A, the first end 174*a* of the fastener shank 172*c* is integral with a portion of the bottom end 164*a* of the protruding fastener head 160*b*. The protruding head fastener 32 may have a fillet (not shown) comprising a rounded corner at the joint between the first end 174*a* of the fastener shank 172*c* and a portion of the bottom end 164*a* of the protruding fastener head 160*b*, where the first end 174*a* of the fastener shank 172*c* and the bottom end 164*a* of the protruding fastener head 160*b* are integrated.

As further shown in FIG. 4A, the protruding head fastener 32 has a tail end 178*a* having a first end 180*a*, a second end 182, and a threaded body 184 disposed between the first end 180 and the second end 182. As shown in FIG. 2A, the first end 180 of the tail end 178 is integral with the second end 175*a* of the fastener shank 172. The threaded body 184*a* has a plurality of threads 185*a* (see FIG. 4A). The tail end 178 further has a pintail 186*a* (see FIG. 4A) at the second end 182*a*.

Figure 4B:
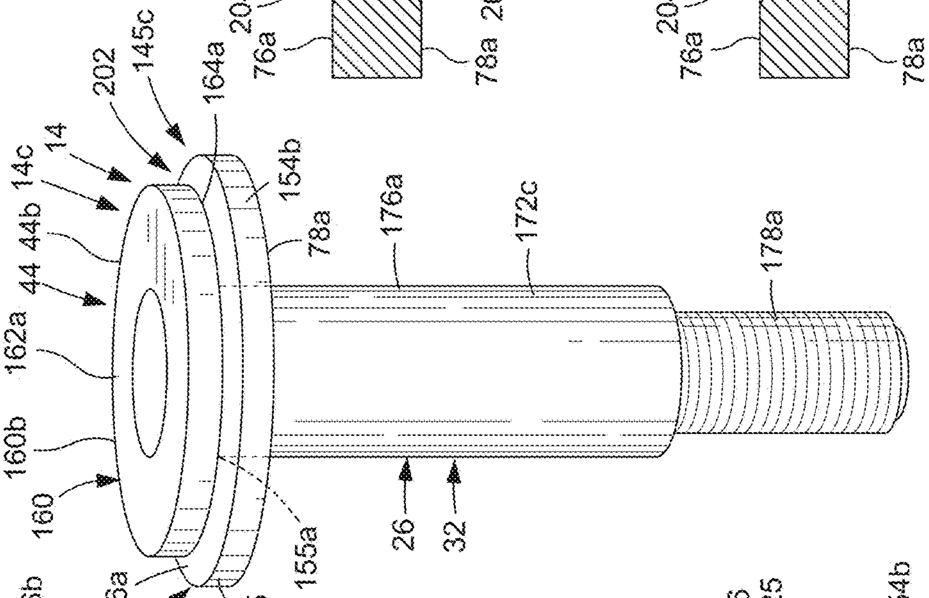
FIG. 4B is an illustration of a front perspective view of the fastener and washer assembly of FIG. 4A, where the fastener and washer assembly is in an assembled position.

Now referring to FIG. 4B, FIG. 4B is an illustration of a front perspective view of the fastener and washer assembly 14 of FIG. 4A, where the fastener and washer assembly 14 is in the assembled position 145*c*, with the fastener shank 172*c* and the tail end 178*a* of the fastener 26, such as the protruding head fastener 32, in the form of the bolt 44, such as the protruding head bolt 44*b*, inserted through the through opening 155*a* of the washer 16, such as the chamfer washer 25, so that the bottom end 164*a* of the fastener head 160, such as the protruding fastener head 160*b*, is adjacent a portion of the top end 76*a* of the chamfer washer 25. In one version, as shown in FIG. 4B, the fastener and washer assembly 14 comprises a protruding head fastener and chamfer washer assembly 14*c*.

A portion of the fastener shank 172*c* is adjacent to the through opening walls 155*b* (see FIG. 4A), when the fastener and washer assembly 14 is in the assembled position 145*c*. FIG. 4B shows the washer 16, such as the chamfer washer 25, having the top end 76*a*, the bottom end 78*a*, and the washer body 146*a* formed between the top end 76*a* and the bottom end 78*a* and having the washer sides 154*b*.

As shown in FIG. 4B, the protruding fastener head 160*b* is positioned above the chamfer washer 25 in a stacked configuration 202. With the automated washer installation 12 (see FIGS. 1, 7-9), the selected fastener 26*a* (see FIGS. 1, 7-9), such as the protruding head fastener 32, is inserted in the selected washer 16*a* (see FIGS. 1, 7-9), such as the chamfer washer 25, so that the selected washer 16*a*, such as the chamfer washer 25, is in contact with, and positioned under, the fastener head 160, such as the protruding fastener head 160*b*, of the selected fastener 26*a*, under the top end 162*a* and the bottom end 164*a* of the protruding fastener head 160*b*, to obtain the fastener and washer assembly 14 (see FIG. 1).

Now referring to FIG. 5A, FIG. 5A is a front cross-sectional view of a chamfer washer 25, such as a symmetrical chamfer washer 25*a*. As shown in FIG. 5A, the symmetrical chamfer washer 25*a*, has chamfers 204 near the top end 76*a* and near the bottom end 78*a*. As further shown in FIG. 5A, the symmetrical chamfer washer 25*a* has fillet relief portions 205 that are configured to provide space for a fillet that may be formed at the joint between the first end 174*a* of the fastener shank 172*c* and a portion of the bottom end 164*a* of the protruding fastener head 160*b* of the protruding head fastener 32. The fillet is a rounded corner or radius formed under the protruding fastener head 160*b* at the joint with the first end 174*a* of the fastener shank 172*c*. The fillet relief portions 205 may be formed at the top end 76*a* and at the bottom end 78*a* of the symmetrical chamfer washer 25*a*, so the symmetrical chamfer washer 25*a* does not need to be oriented with the washer orientation system 72 (see FIG. 1) of the automated washer feed system 60 (see FIG. 1).

As further shown in FIG. 5A, a size 206*a* of the through opening 155*a* at the top end 76*a* is the same as a size 206*b* of the through opening 155*a* at the bottom end 78*a*. As further shown in FIG. 5A, the through opening 155*a* of the symmetrical chamfer washer 25*a* has center projection portions 207, where the through opening 155*a* is narrower in size than the size 206*a* of the through opening 155*a* at the top end 76*a* and the size 206*b* of the through opening 155*a* at the bottom end 78*a*.

Now referring to FIG. 5B, FIG. 5B is a front cross-sectional view of a chamfer washer 25, such as a nonsymmetrical chamfer washer 25*b*. As shown in FIG. 5B, the nonsymmetrical chamfer washer 25*b*, only has chamfers 204 near the top end 76*a*. As further shown in FIG. 5B, the nonsymmetrical chamfer washer 25*b* only has fillet relief portions 205 at the top end 76*a* that are configured to provide space for a fillet that may be formed at the joint between the first end 174*a* of the fastener shank 172*c* and a portion of the bottom end 164*a* of the protruding fastener head 160*b* of the protruding head fastener 32. The nonsymmetrical chamfer washer 25*b* needs to be oriented with the washer orientation system 72 (see FIG. 1) of the automated washer feed system 60 (see FIG. 1) so that it is in the correct orientation and position before undergoing the automated washer installation 12.

As further shown in FIG. 5B, the nonsymmetrical chamfer washer 25*b* does not have the center projection portions 207 (see FIG. 5A) and the through opening 155*a* is of a uniform interior size below the chamfers 204. As further shown in FIG. 5B, the size 206*a* of the through opening 155*a* at the top end 76*a* is greater than the size 206*b* of the through opening 155*a* at the bottom end 78*a*.

Figure 6B:
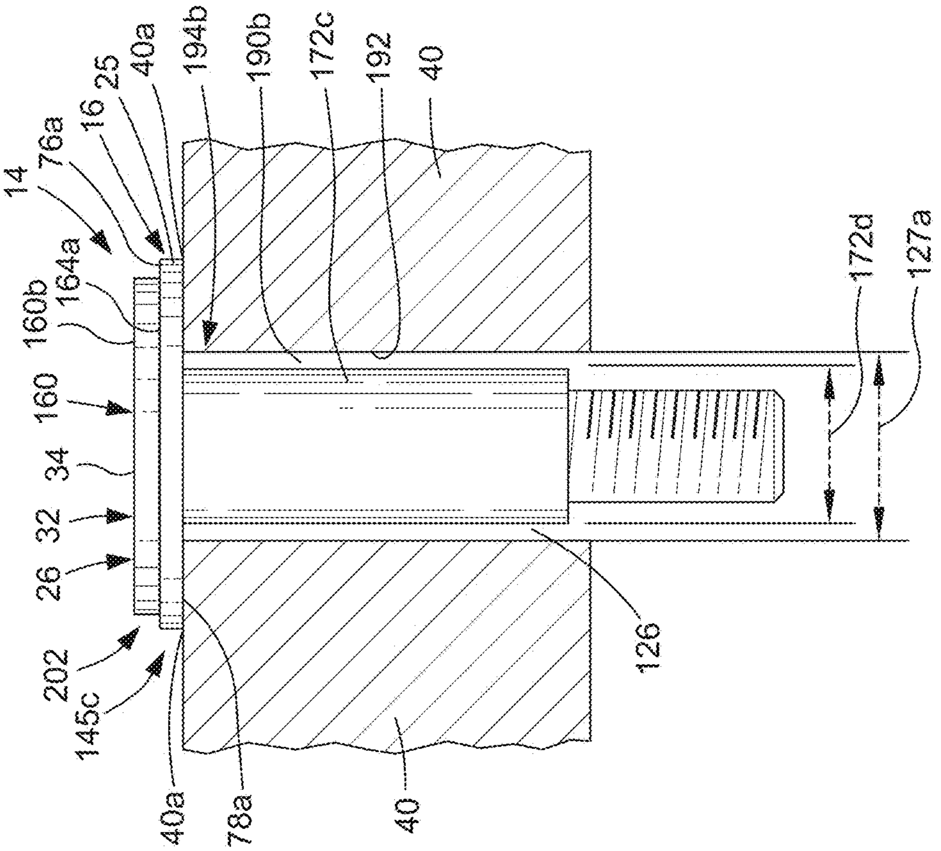
FIG. 6B is a front partial sectional view of the fastener and washer assembly of FIG. 6A, where the fastener and washer assembly is in an assembled position and installed in the structure.
Figure 6A:
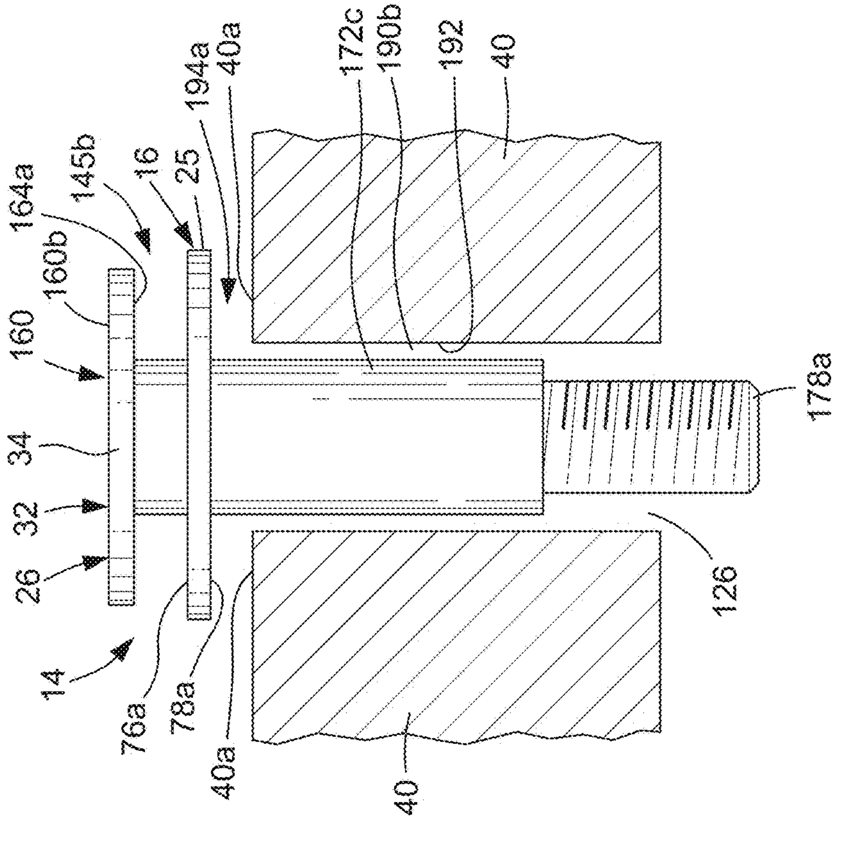
FIG. 6A is a front partial sectional view of the fastener and washer assembly of FIG. 4A, in a disassembled position prior to installation in a structure, and where the fastener is a clearance fit fastener and the washer is a chamfer washer.

Now referring to FIG. 6A, FIG. 6A is a front partial sectional view of the fastener and washer assembly 14 of FIG. 4A, in a partially assembled position 145*b* and in the partially installed position 194*a* in the hole 126 in the structure 40, and where the fastener 26, such as the protruding head fastener 32, is a clearance fit fastener 34, and the washer 16 is a chamfer washer 25. FIG. 6A shows the fastener and washer assembly 14 in the partially installed position 194*a* with the fastener shank 172*c* and the tail end 178*a* of the protruding head fastener 32 inserted through the hole 126 formed through the structure 40.

FIG. 6A further shows a gap 190*b* between the fastener shank 172*c* and the interior wall 192 of the structure 40, when the fastener shank 172*c* is inserted into the hole 126 of the structure 40. FIG. 6A further shows structure top portions 40*a* configured to be contacted with the bottom end 78*a* of the chamfer washer 25. FIG. 6A shows the fastener head 160, such as the protruding fastener head 160*b*, positioned above the chamfer washer 25, and the chamfer washer 25 positioned under the protruding fastener head 160*b*. FIG. 6A further shows the top end 76*a* of the washer 16, such as the chamfer washer 25, and shows the bottom end 164*a* of the fastener head 160, such as the protruding fastener head 160*b*.

Now referring to FIG. 6B, FIG. 6B is a front partial sectional view of the fastener and washer assembly 14 of FIG. 6A, where the fastener and washer assembly 14 is in the assembled position 145*c*, and in the installed position 194*b*, in and protruding atop the structure 40, and where the fastener 26, such as the protruding head fastener 32, is the clearance fit fastener 34, and the washer 16 is the chamfer washer 25.

As shown in FIG. 6B, when the fastener and washer assembly 14 is in the assembled position 145*c* and in the installed position 194*b*, the fastener head 160, such as the protruding fastener head 160*b*, is positioned above the chamfer washer 25 in the stacked configuration 202. FIG. 6B further shows the bottom end 164*a* (see also FIG. 6A) of the fastener head 160, such as the protruding fastener head 160*b*, in contact with, and against, the top end 76*a* (see also FIG. 6A) of the washer 16, such as the chamfer washer 25, and shows the bottom end 78*a* (see also FIG. 6A) of the chamfer washer 25 in contact with, and against, the structure top portions 40*a* (see also FIG. 6A) of the structure 40. With the protruding head fastener 32 installed in the installed position 194*b* in the structure 40, the protruding fastener head 160*b* and the chamfer washer 25 of the fastener and washer assembly 14 protrude above the top end of the structure 40 with the bottom end 78*a* of the chamfer washer 25 contacting the structure top portions 40*a* of the top end of the structure 40.

FIG. 6B further shows the gap 190*b* between the fastener shank 172*c* and the interior wall 192 of the structure 40, when the fastener and washer assembly 14 is inserted into the hole 126 of the structure 40 in the installed position 194*b*. As shown in FIG. 6B, the hole 126 through the structure 40 is of a constant or uniform width and has a hole diameter 127*a* that is constant or uniform through the hole 126. As shown in FIG. 6B, the hole diameter 127*a* of the hole 126 has a greater length than a length of a fastener shank diameter 172*d* of the fastener shank 172*c*. Thus, with the clearance fit fastener 34, the hole 126 is larger in size than the size of the fastener shank 172*c*, and the fastener shank 172*c* is smaller in size than the size of the hole 126.

Figure 6C:
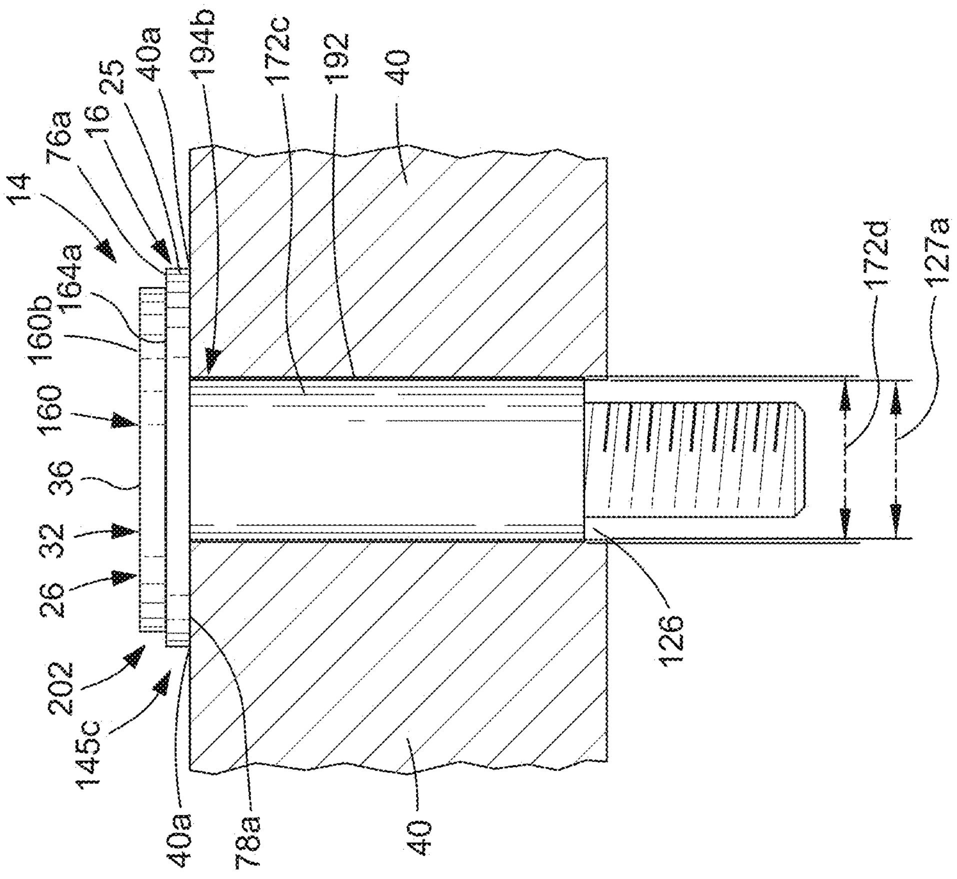
FIG. 6C is a front partial sectional view of another version of a fastener and washer assembly in an assembled position and installed in a structure, where the fastener is an interference fit fastener and the washer is a chamfer washer.

Now referring to FIG. 6C, FIG. 6C is a front partial sectional view of another version of a fastener and washer assembly 14 in the assembled position 145*c*, and in the installed position 194*b* in the structure 40, and where the fastener 26, such as the protruding head fastener 32, is an interference fit fastener 36, and the washer 16 is a chamfer washer 25.

As shown in FIG. 6C, when the fastener and washer assembly 14 is in the assembled position 145*c* and in the installed position 194*b*, the fastener head 160, such as the protruding fastener head 160*b*, is positioned above the chamfer washer 25 in the stacked configuration 202. FIG. 6C further shows the bottom end 164*a* of the fastener head 160, such as the protruding fastener head 160*b*, in contact with, and against, the top end 76*a* of the washer 16, such as the chamfer washer 25, and shows the bottom end 78*a* of the chamfer washer 25 in contact with, and against, the structure top portions 40*a* of the structure 40. With the protruding head fastener 32 installed in the installed position 194*b* in the structure 40, the protruding fastener head 160*b* and the chamfer washer 25 of the fastener and washer assembly 14 protrude above the top end of the structure 40 with the bottom end 78*a* of the chamfer washer 25 contacting the structure top portions 40*a* of the top end of the structure 40.

As shown in FIG. 6C, there is no gap between the fastener shank 172*c* and the interior wall 192 of the structure 40, when the fastener and washer assembly 14 is inserted into the hole 126 of the structure 40 in the installed position 194*b*. With the interference fit fastener 36 installed in the hole 126, the fastener shank diameter 172*d* (see FIG. 6C) of the fastener shank 172*c* has a slightly greater length than the hole diameter 127*a* (see FIG. 6C) of the hole 126, since the fastener shank 172*c* of the interference fit fastener 36 is press fit or friction fit into the hole 126. Thus, with the interference fit fastener 36, the hole 126 is smaller in size than the size of the fastener shank 172*c*, and the fastener shank 172 is larger in size than the size of the hole 126, and the interference fit fastener 36 is press fit or friction fit into the hole 126.

Now referring to FIG. 7, FIG. 7 is an illustration of a schematic diagram of a process flow 208, such as a first process flow 208*a*, using an exemplary version of the automated fastener system 10 of the disclosure, showing automated washer installation 12 before inspection of a fastener 26, such as an aircraft fastener 28, with the automated inspection system 94.

FIG. 7 shows the automated washer feed system 60 of the automated fastener system 10 holding and dispensing washers 16, such as aircraft washers 18. In one version, each washer 16, such as each aircraft washer 18, shown in FIG. 7 is a countersunk washer 22 and is a conductive washer 20. In other versions, the washer 16 may comprise a chamfer washer 25 (see FIG. 4A) and/or may not be conductive. As shown in FIG. 7, a selected washer 16*a*, such as a selected aircraft washer 18*a*, for example, a selected conductive washer 20*a*, is pushed through the feed device 62, such as the tube feeder 64, via a washer push action 209*a*, and is dropped out of, or released from, the automated washer feed system 60, via a washer release action 209*b*, into an interior through opening 210 of the shuttle cup 68, such as the selected shuttle cup 68*a*, of the automated shuttle assembly 70. Alternatively, the tube feeder 64 may be vertical and gravity is used to dispense the washer 16, such as the selected washer 16*a*, and retention fingers may be used to retain and release each washer 16, such as each selected washer 16*a*. The automated washer feed system 60 comprises the trigger gate 65 to only allow one (1) selected washer 16*a* at a time to dispense, drop, or transfer from the feed device 62 to the shuttle cup 68, such as the selected shuttle cup 68*a*.

As further shown in FIG. 7, the automated washer feed system 60 comprises the washer orientation system 72, to orient and position the countersunk washers 22 in the right side up position 75, as they are conveyed along the feed device 62, such as the tube feeder 64, for dispensing, dropping, transfer, and insertion into the shuttle cup 68, such as the selected shuttle cup 68*a*. As discussed above, in one version, the orientation device 74 (see FIG. 1) may comprise a tube-shaped carrier that holds the washer 16 in a correct orientation or position and drops or pushes the washer 16 out of the tube-shaped carrier. In another version, the orientation device 74 (see FIG. 1) may comprise a bowl feeder that separates the washers 16, rotates the washers 16 to the right side up position 75, if needed, and correctly orients the washers 16. The washer orientation system 72 may further comprise one or more sensors or other components to ensure that the countersunk washer 22 or the nonsymmetrical chamfer washer 25*b* (see FIG. 5B) is transferred and inserted in a correct orientation and position within the shuttle cup 68, such as the selected shuttle cup 68*a*. As shown in FIG. 7, the washer orientation system 72 is coupled to the automated washer feed system 60 by a connector 211*a*.

As further shown in FIG. 7, the automated washer feed system 60 comprises the washer type determination system 80, to view a geometry 82 (see FIG. 1) of the washer 16 and to determine the type of washer 16 based on the geometry 82, for example, to determine whether the washer 16 is a countersunk washer 22 type or a chamfer washer 25 type. As shown in FIG. 7, the washer type determination system 80 comprises a vision system 84, to view the geometry 82 of the washer 16. The vision system 84 comprises a camera, a camera and a laser line scanner, a multi-laser line scanner, a radio-frequency identification (RFID) scanner, or another optical or camera-based system to view the geometry 82 (see FIG. 1) of the washer 16 passing through the automated washer feed system 60, to determine the type of washer 16. As shown in FIG. 7, the washer type determination system 80 comprises a sensor 85. The washer type determination system 80 may further comprise connectors, or other components known in the art of vision systems.

As further shown in FIG. 7, the automated washer feed system 60 comprises the washer material verification system 86, such as an inspection module, to determine and verify the washer color 87 (see FIG. 1), and/or to determine and verify what the base washer material 52 (see FIG. 1) of the washer 16, such as the selected washer 16*a*, is made of. As shown in FIG. 7, the washer material verification system 86 comprises a vision system 84*a*, such as a camera, a camera and a laser line scanner, a multi-laser line scanner, a radio-frequency identification (RFID) scanner, or another optical or camera-based system to view the washer color 87 of the washer 16 passing through the automated washer feed system 60, and to determine and verify what the base washer material 52 of the washer 16, based on the washer color 87. As shown in FIG. 7, the washer material verification system 86 further comprises the electrical conductivity measurement system 88 for use if the base washer material 52 cannot be determined based on the washer color 87. As discussed above, the electrical conductivity measurement system 88 measures the electrical conductivity measurement 89 (see FIG. 1) of the washer 16, such as the selected washer 16*a*, and compares it against a predetermined electrical conductivity value range of a predetermined base washer material to determine the base washer material 52 (see FIG. 1), based on the electrical conductivity measurement 89 obtained by the electrical conductivity measurement system 88. In one version, as discussed above, the electrical conductivity measurement system 88 comprises one or more eddy current conductivity probe assemblies with one or more eddy current conductivity probes having one or more coils coupled to electrical wires, and one or more sensors coupled to the one or more eddy current conductivity probes, via the electrical wires. As shown in FIG. 7, the washer type determination system 80 and the washer material verification system 86 are coupled to the automated washer feed system 60 via one or more connectors 211*b*. The automated washer feed system 60, including the washer orientation system 72, the washer type determination system 80, and the washer material verification system 86, is controlled with the control system 130 (see FIG. 7).

As shown in FIG. 7, the selected washer 16*a*, such as the selected aircraft washer 18*a*, for example, the selected conductive washer 20*a*, is released and transferred into the shuttle cup 68, such as the selected shuttle cup 68*a*, via a washer transfer 213. The shuttle cup 68 is part of the automated shuttle assembly 70 of the automated fastener system 10. As further shown in FIG. 7, the selected washer 16*a*, such as the selected aircraft washer 18*a*, for example, the selected conductive washer 20*a*, is transferred and carried within the shuttle cup 68, such as the selected shuttle cup 68*a*, via a washer transport 214, to the automated fastener holder assembly 90 for the automated washer installation 12. As shown in FIG. 7, the shuttle cup 68, such as the selected shuttle cup 68*a*, incorporates a shuttle cup sensor 68*b* within the shuttle cup 68, to sense or detect the presence of the selected washer 16*a*, such as the selected aircraft washer 18*a*, for example, the selected conductive washer 20*a*, within the shuttle cup 68. The shuttle cup 68, such as the selected shuttle cup 68*a*, may be moved via an automatic transport mechanism (not shown) of the automated shuttle assembly 70, for example, the automatic transport mechanism may comprise a rail or a track system along which the selected shuttle cup 68*a* automatically moves back and forth between the automated washer feed system 60 and the automated fastener holder assembly 90. The automatic transport mechanism may also comprise another suitable transport system to automatically move the selected shuttle cup 68*a* between the automated washer feed system 60 and the automated fastener holder assembly 90.

As shown in FIG. 7, the automated fastener holder assembly 90 of the automated fastener system 10 holds and dispenses one or more fasteners 26, such as the one or more aircraft fasteners 28, and provides a selected fastener 26*a*, such as a selected aircraft fastener 28*a*, for the automated washer installation 12. As shown in FIG. 7, the fastener 26, such as the aircraft fastener 28, comprises a countersunk fastener 30. However, the fastener 26, such as the aircraft fastener 28, may comprise a protruding head fastener 32, or another suitable type of fastener. As shown in FIG. 7, the automated fastener holder assembly 90 comprises the fastener holder 92, such as the vertical tube holder 92*a*.

In the automated washer installation 12, the selected fastener 26*a*, such as the selected aircraft fastener 28*a*, for example, the countersunk fastener 30, is dispensed or transferred into the interior through opening 210 of the shuttle cup 68, such as the selected shuttle cup 68*a*, and into the through opening 155 of the selected washer 16*a*, such as the selected aircraft washer 18*a*, for example, the countersunk washer 22, seated within the selected shuttle cup 68*a*. With the automated washer installation 12, the selected fastener 26*a*, such as the selected aircraft fastener 28*a*, for example, the countersunk fastener 30, is assembled with the selected washer 16*a*, such as the selected aircraft washer 18*a*, for example, the countersunk washer 22, to form the fastener and washer assembly 14 (see FIG. 7), such as the aircraft fastener and conductive washer assembly 14*a* (see FIG. 7), and in this version, the countersunk fastener and countersunk washer assembly 14*b* (see FIG. 7).

As shown in FIG. 7, in this version, after the automated washer installation 12 and the fastener and washer assembly 14 is obtained, the fastener and washer assembly 14 may, in one version, both be picked up and gripped with the gripper fingers 96, such as the inspection gripper fingers 96*a*, of the automated inspection system 94 of the automated fastener system 10, and the selected fastener 26*a*, such as the selected aircraft fastener 28*a*, for example, the countersunk fastener 30, undergoes inspection with the automated inspection system 94. The inspection gripper fingers 96*a* open and close to grip and to release the fastener and washer assembly 14, or just the selected fastener 26*a*, with an open and close action 215 (see FIG. 7), including a close action 215*a* (see FIG. 7).

As further shown in FIG. 7, after the selected fastener 26*a*, such as the selected aircraft fastener 28*a*, for example, the countersunk fastener 30, undergoes inspection with the automated inspection system 94, the fastener and washer assembly 14 is transferred from the automated inspection system 94 to the automated delivery system 100 of the automated fastener system 10. The automated delivery system 100 includes the delivery device 102 (see FIG. 13), such as the delivery shuttle 104 (see FIG. 13), to transport the fastener and washer assembly 14.

As further shown in FIG. 7, the fastener and washer assembly 14 is transported, via the automated delivery system 100, to the automated installation system 110 of the automated fastener system 10. The automated installation system 110 may comprise, in one version, the robotic system 114 (see FIG. 14A), and may comprise, in another version, the gantry system 116 (see FIG. 14B).

As further shown in FIG. 7, the automated washer feed system 60, the automated shuttle assembly 70, the automated fastener holder assembly 90, the automated inspection system 94, the automated delivery system 100, and the automated installation system 110, are controlled and operated via the control system 130 connected with the control system connection 212. The control system connection 212 may comprise a wired connection 212*a* (see FIGS. 7, 8) or a wireless connection 212*b* (see FIG. 9). As shown in FIG. 7, the control system 130 comprises the controller 132, one or more power supplies 134, and the computer system 136.

Figure 8:
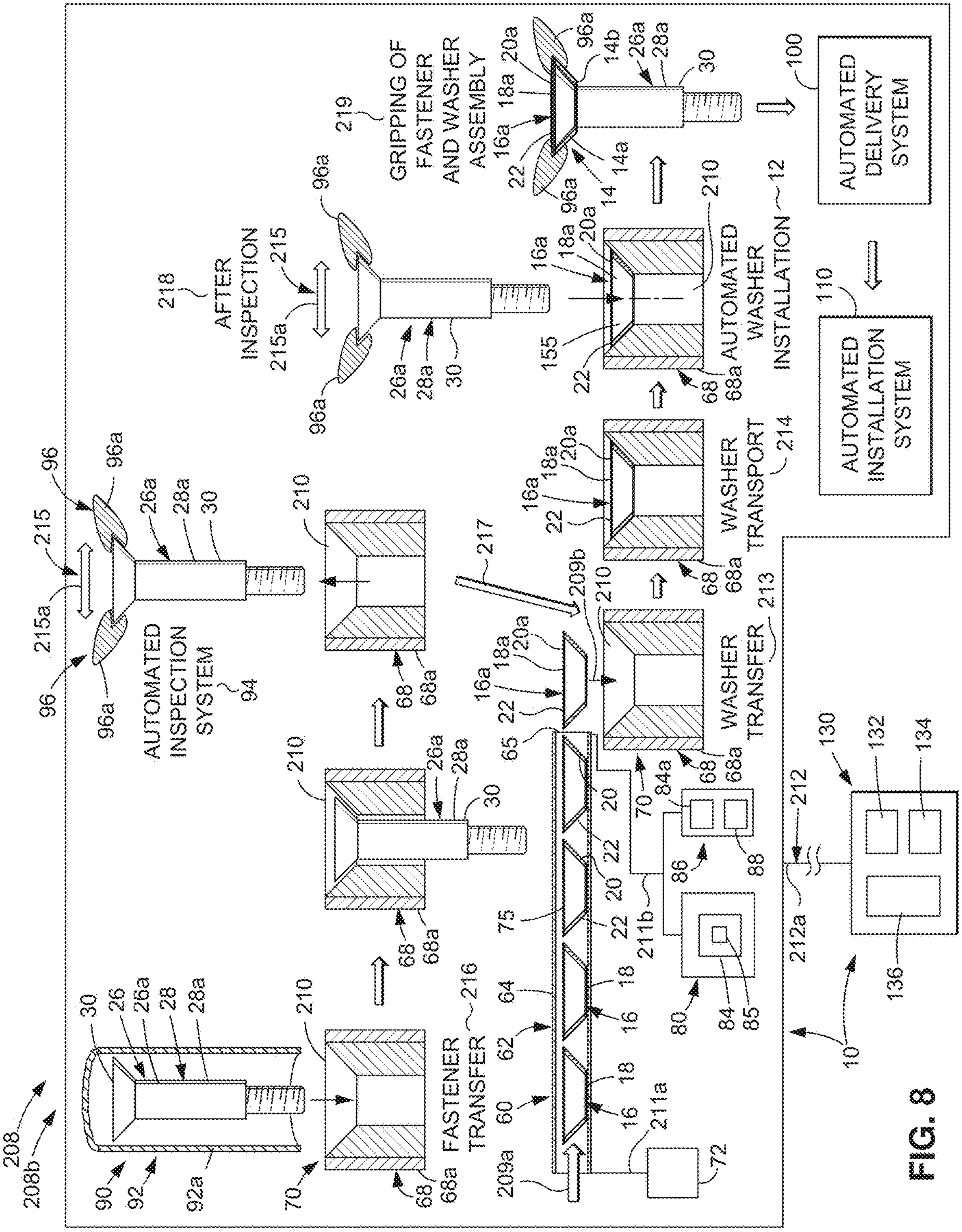
FIG. 8 is an illustration of a schematic diagram of a process flow using another version of an exemplary automated fastener system of the disclosure, showing an automated washer installation after inspection of a fastener.

Now referring to FIG. 8, FIG. 8 is an illustration of a schematic diagram of a process flow 208, such as a second process flow 208*b*, using another exemplary version of the automated fastener system 10 of the disclosure, showing automated washer installation 12 after inspection of a fastener 26, such as an aircraft fastener 28, with the automated inspection system 94 such as before transfer to the automated delivery system 100 and to the automated installation system 110.

As shown in FIG. 8, in this version, the selected fastener 26*a*, such as the selected aircraft fastener 28*a*, for example, the countersunk fastener 30, is transferred from the automated fastener holder assembly 90 of the automated fastener system 10 to the automated shuttle assembly 70 of the automated fastener system 10. As shown in FIG. 8, the automated fastener holder assembly 90 holds and dispenses one or more fasteners 26, such as the one or more aircraft fasteners 28, and provides the selected fastener 26*a*, such as the selected aircraft fastener 28*a*, for example, the countersunk fastener 30, into the shuttle cup 68, such as the selected shuttle cup 68*a*, of the automated shuttle assembly 70. As shown in FIG. 8, the fastener 26, such as the aircraft fastener 28, comprises a countersunk fastener 30. However, the fastener 26, such as the aircraft fastener 28, may comprise a protruding head fastener 32, or another suitable type of fastener. As shown in FIG. 8, the automated fastener holder assembly 90 comprises the fastener holder 92, such as the vertical tube holder 92*a*.

As shown in FIG. 8, the selected fastener 26*a*, such as the selected aircraft fastener 28*a*, for example, the countersunk fastener 30, is automatically dispensed or transferred from the automated fastener holder assembly 90 into the interior through opening 210 of the shuttle cup 68, such as the selected shuttle cup 68*a*, via a fastener transfer 216 action. Although the shuttle cup 68 does not show the shuttle cup sensor 68*b* (see FIG. 7), in one version, the shuttle cup 68 may include the shuttle cup sensor 68*b*. The shuttle cup 68, such as the selected shuttle cup 68*a*, may be moved via an automatic transport mechanism (not shown) of the automated shuttle assembly 70, for example, the automatic transport mechanism may comprise a rail or a track system along which the selected shuttle cup 68*a* automatically moves back and forth between the automated fastener holder assembly 90 and the automated inspection system 94. The automatic transport mechanism may also comprise another suitable transport system to automatically move the selected shuttle cup 68*a* between the automated washer feed system 60 and the automated fastener holder assembly 90.

As further shown in FIG. 8, after the selected fastener 26*a*, such as the selected aircraft fastener 28*a*, for example, the countersunk fastener 30, is transferred into the interior through opening 210 of the shuttle cup 68, such as the selected shuttle cup 68*a*, and seated within the shuttle cup 68, the selected fastener 26*a*, such as the selected aircraft fastener 28*a*, for example, the countersunk fastener 30, is transported from the automated fastener holder assembly 90 to the automated inspection system 94.

As further shown in FIG. 8, at the automated inspection system, 94, the selected fastener 26*a*, such as the selected aircraft fastener 28*a*, for example, the countersunk fastener 30, is picked up out of the interior through opening 210 of the shuttle cup 68, such as the selected shuttle cup 68*a*, and gripped with the gripper fingers 96, such as the inspection gripper fingers 96*a*, of the automated inspection system 94 of the automated fastener system 10, and the selected fastener 26*a*, such as the selected aircraft fastener 28*a*, for example, the countersunk fastener 30, undergoes inspection with the automated inspection system 94. The inspection gripper fingers 96*a* open and close to grip and to release the fastener and washer assembly 14, or just the selected fastener 26*a*, with the open and close action 215 (see FIG. 8), including the close action 215*a* (see FIG. 8).

As further shown in FIG. 8, during the inspection of the selected fastener 26*a*, such as the selected aircraft fastener 28*a*, for example, the countersunk fastener 30, with the automated inspection system 94, the shuttle cup 68, such as the selected shuttle cup 68*a*, transports or moves to the automated washer feed system 60 to pick up a washer 16, such as a selected washer 16*a*, via a shuttle cup transport 217 action. FIG. 8 shows the automated washer feed system 60 of the automated fastener system 10 holding and dispensing washers 16, such as aircraft washers 18. In one version, each washer 16, such as each aircraft washer 18, shown in FIG. 8 is a countersunk washer 22 and is a conductive washer 20. In other versions, the washer 16 may comprise a chamfer washer 25 (see FIG. 4A) and/or may not be conductive. As shown in FIG. 8, the selected washer 16*a*, such as the selected aircraft washer 18*a*, for example, the selected conductive washer 20*a*, is pushed through the feed device 62, such as the tube feeder 64, via the washer push action 209*a*, and is dropped out of, or released from, the automated washer feed system 60, via the washer release action 209*b*, into the interior through opening 210 of the shuttle cup 68, such as the selected shuttle cup 68*a*, of the automated shuttle assembly 70. Alternatively, the tube feeder 64 may be vertical and gravity is used to dispense the washer 16, such as the selected washer 16*a*, and retention fingers may be used to retain and release each washer 16, such as each selected washer 16*a*. The automated washer feed system 60 comprises the trigger gate 65 to only allow one (1) selected washer 16*a* at a time to dispense, drop, or transfer from the feed device 62 to the shuttle cup 68, such as the selected shuttle cup 68*a*.

As further shown in FIG. 8, the automated washer feed system 60 comprises the washer orientation system 72, to orient and position the countersunk washers 22 in the right side up position 75, as they are conveyed along the feed device 62, such as the tube feeder 64, for dispensing, dropping, transfer, and insertion into the shuttle cup 68, such as the selected shuttle cup 68*a*. As shown in FIG. 8, the washer orientation system 72 is coupled to the automated washer feed system 60 by connector 211*a*.

As further shown in FIG. 8, the automated washer feed system 60 comprises the washer type determination system 80, to view the geometry 82 (see FIG. 1) of the washer 16 and to determine the type of washer 16 based on the geometry 82, for example, to determine whether the washer 16 is a countersunk washer 22 type or a chamfer washer 25 type. As shown in FIG. 8, the washer type determination system 80 comprises the vision system 84, to view the geometry 82 of the washer 16. The vision system 84 comprises a camera, a camera and a laser line scanner, a multi-laser line scanner, a radio-frequency identification (RFID) scanner, or another optical or camera-based system to view the geometry 82 (see FIG. 1) of the washer 16 passing through the automated washer feed system 60, to determine the type of washer 16. As shown in FIG. 8, the washer type determination system 80 comprises the sensor 85. The washer type determination system 80 may further comprise connectors, or other components known in the art of vision systems.

As further shown in FIG. 8, the automated washer feed system 60 comprises the washer material verification system 86, such as an inspection module, to determine and verify the washer color 87 (see FIG. 1), and/or to determine and verify what the base washer material 52 (see FIG. 1) of the washer 16, such as the selected washer 16*a*, is made of. As shown in FIG. 8, the washer material verification system 86 comprises the vision system 84*a*, such as a camera, a camera and a laser line scanner, a multi-laser line scanner, a radio-frequency identification (RFID) scanner, or another optical or camera-based system to view the washer color 87 of the washer 16 passing through the automated washer feed system 60, and to determine and verify what the base washer material 52 of the washer 16, based on the washer color 87. As shown in FIG. 8, the washer material verification system 86 further comprises the electrical conductivity measurement system 88 for use if the base washer material 52 cannot be determined based on the washer color 87. As discussed above, the electrical conductivity measurement system 88 measures the electrical conductivity measurement 89 (see FIG. 1) of the washer 16, such as the selected washer 16*a*, and compares it against a predetermined electrical conductivity value range of a predetermined base washer material to determine the base washer material 52 (see FIG. 1), based on the electrical conductivity measurement 89 obtained by the electrical conductivity measurement system 88. In one version, as discussed above, the electrical conductivity measurement system 88 comprises one or more eddy current conductivity probe assemblies with one or more eddy current conductivity probes having one or more coils coupled to electrical wires, and one or more sensors coupled to the one or more eddy current conductivity probes, via the electrical wires. As shown in FIG. 8, the washer type determination system 80 and the washer material verification system 86 are coupled to the automated washer feed system 60 via one or more connectors 211*b*. The automated washer feed system 60, including the washer orientation system 72, the washer type determination system 80, and the washer material verification system 86, is controlled with the control system 130 (see FIG. 8).

As shown in FIG. 8, the selected washer 16*a*, such as the selected aircraft washer 18*a*, for example, the selected conductive washer 20*a*, is released and transferred into the interior through opening 210 of the shuttle cup 68, such as the selected shuttle cup 68*a*, via the washer transfer 213. As further shown in FIG. 8, the selected washer 16*a*, such as the selected aircraft washer 18*a*, for example, the selected conductive washer 20*a*, is transferred within the shuttle cup 68, such as the selected shuttle cup 68*a*, via the washer transport 214, to the automated inspection system 94 to pick up the selected fastener 26*a*, such as the selected aircraft fastener 28*a*, for example, the countersunk fastener 30, after inspection with the automated inspection system 94.

As shown in FIG. 8, once the shuttle cup 68, such as the selected shuttle cup 68*a*, transports the selected washer 16*a*, such as the selected aircraft washer 18*a*, for example, the selected conductive washer 20*a*, to the automated inspection system 94, after inspection 218, the selected fastener 26*a*, such as the selected aircraft fastener 28*a*, for example, the countersunk fastener 30, is released by the inspection gripper fingers 96*a* into the interior through opening 210 of the shuttle cup 68, such as the selected shuttle cup 68*a*, and into the through opening 155 of the selected washer 16*a*, such as the selected aircraft washer 18*a*, for example, the countersunk washer 22, seated within the selected shuttle cup 68*a*. With the automated washer installation 12, the selected fastener 26*a*, such as the selected aircraft fastener 28*a*, for example, the countersunk fastener 30, is assembled with the selected washer 16*a*, such as the selected aircraft washer 18*a*, for example, the countersunk washer 22, to form the fastener and washer assembly 14 (see FIG. 8), such as the aircraft fastener and conductive washer assembly 14*a* (see FIG. 8), and in this version, the countersunk fastener and countersunk washer assembly 14*b* (see FIG. 8).

As further shown in FIG. 8, after the selected fastener 26*a*, such as the selected aircraft fastener 28*a*, for example, the countersunk fastener 30, is assembled with the selected washer 16*a*, such as the selected aircraft washer 18*a*, for example, the countersunk washer 22, to form the fastener and washer assembly 14, using the automated washer installation 12, the fastener and washer assembly 14 is picked up and gripped with the inspection gripper fingers 96*a* in a gripping fastener and washer assembly 219 action. The inspection gripper fingers 96*a* then release the fastener and washer assembly 14 into the automated delivery system 100 (see FIG. 8) of the automated fastener system 10. The automated delivery system 100 includes the delivery device 102 (see FIG. 13), such as the delivery shuttle 104 (see FIG. 13), to transport the fastener and washer assembly 14.

As further shown in FIG. 8, the fastener and washer assembly 14 is transported, via the automated delivery system 100, to the automated installation system 110 of the automated fastener system 10. The automated installation system 110 may comprise, in one version, the robotic system 114 (see FIG. 14A), and may comprise, in another version, the gantry system 116 (see FIG. 14B).

As further shown in FIG. 8, the automated washer feed system 60, the automated shuttle assembly 70, the automated fastener holder assembly 90, the automated inspection system 94, the automated delivery system 100, and the automated installation system 110, are controlled and operated via the control system 130 connected with the control system connection 212. The control system connection 212 may comprise the wired connection 212*a* (see FIGS. 7, 8) or the wireless connection 212*b* (see FIG. 9). As shown in FIG. 8, the control system 130 comprises the controller 132, one or more power supplies 134, and the computer system 136.

Now referring to FIG. 9, FIG. 9 is an illustration of a schematic diagram of a process flow 208, such as a third process flow 208*c*, using another exemplary version of the automated fastener system 10 of the disclosure, showing automated washer installation 12 at the automated installation system 110.

As shown in FIG. 9, the automated fastener system 10 comprises the automated fastener holder assembly 90, such as shown and described with regard to FIGS. 7 and 8, the automated shuttle assembly 70, such as shown and described with regard to FIGS. 7 and 8, the automated inspection system 94, such as shown and described with regard to FIGS. 7 and 8, the automated delivery system 100, and the automated installation system 110.

As further shown in FIG. 9, in one version, the automated washer feed system 60 comprises a holder 66, such as a selected holder 66*a*, for example, a cup holder 66*b*, in which the selected washer 16*a*, such as the selected aircraft washer 18*a*, for example, the selected conductive washer 20*a*, is dispensed, dropped, or transferred from the feed device 62, such as the tube feeder 64, into the holder 66, such as the selected holder 66*a*, for example, the cup holder 66*b*, as an alternative to being dispensed, dropped, or transferred into the shuttle cup 68 (see FIGS. 7, 8), such as the selected shuttle cup 68*a* (see FIGS. 7, 8), of the automated shuttle assembly 70.

FIG. 9 shows the automated washer feed system 60 of the automated fastener system 10 holding and dispensing washers 16, such as aircraft washers 18. In one version, each washer 16, such as each aircraft washer 18, shown in FIG. 9, is a countersunk washer 22 and is a conductive washer 20. In other versions, the washer 16 may comprise a chamfer washer 25 (see FIG. 4A) and/or may not be conductive. As shown in FIG. 9, the selected washer 16*a*, such as the selected aircraft washer 18*a*, for example, the selected conductive washer 20*a*, is pushed through the feed device 62, such as the tube feeder 64, via the washer push action 209*a*, and is dropped out of, or released from, the automated washer feed system 60, via the washer release action 209*b*, into the holder 66, such as the selected holder 66*a*, for example, the cup holder 66*b*, of the automated washer feed system 60. Alternatively, the tube feeder 64 may be vertical and gravity is used to dispense the washer 16, such as the selected washer 16*a*, and retention fingers may be used to retain and release each washer 16, such as each selected washer 16*a*. The automated washer feed system 60 comprises the trigger gate 65 to only allow one (1) selected washer 16*a* at a time to dispense, drop, or transfer from the feed device 62 to the holder 66, such as the selected holder 66*a*.

As further shown in FIG. 9, the automated washer feed system 60 comprises the washer orientation system 72, to orient and position the countersunk washers 22 in the right side up position 75, as they are conveyed along the feed device 62, such as the tube feeder 64, for dispensing, dropping, transfer, and insertion into the holder 66, such as the selected holder 66*a*. The orientation device 74 is discussed above in further detail with regard to FIGS. 1, 7, 8. As shown in FIG. 9, the washer orientation system 72 is coupled to the automated washer feed system 60 by connector 211*a*.

As further shown in FIG. 9, the automated washer feed system 60 comprises the washer type determination system 80, to view a geometry 82 (see FIG. 1) of the washer 16 and to determine the type of washer 16 based on the geometry 82, for example, to determine whether the washer 16 is a countersunk washer 22 type or a chamfer washer 25 type. As shown in FIG. 9, the washer type determination system 80 comprises the vision system 84, to view the geometry 82 of the washer 16. The vision system 84 comprises a camera, a camera and a laser line scanner, a multi-laser line scanner, a radio-frequency identification (RFID) scanner, or another optical or camera-based system to view the geometry 82 (see FIG. 1) of the washer 16 passing through the automated washer feed system 60, to determine the type of washer 16. As shown in FIG. 9, the washer type determination system 80 comprises a sensor 85. The washer type determination system 80 may further comprise connectors, or other components known in the art of vision systems.

As further shown in FIG. 9, the automated washer feed system 60 comprises the washer material verification system 86, such as an inspection module, to determine and verify the washer color 87 (see FIG. 1), and/or to determine and verify what the base washer material 52 (see FIG. 1) of the washer 16, such as the selected washer 16*a*, is made of. As shown in FIG. 9, the washer material verification system 86 comprises the vision system 84*a*, such as a camera, a camera and a laser line scanner, a multi-laser line scanner, a radio-frequency identification (RFID) scanner, or another optical or camera-based system to view the washer color 87 of the washer 16 passing through the automated washer feed system 60, and to determine and verify what the base washer material 52 of the washer 16, based on the washer color 87. As shown in FIG. 9, the washer material verification system 86 further comprises the electrical conductivity measurement system 88 for use if the base washer material 52 cannot be determined based on the washer color 87. As discussed above, the electrical conductivity measurement system 88 measures the electrical conductivity measurement 89 (see FIG. 1) of the washer 16, such as the selected washer 16*a*, and compares it against a predetermined electrical conductivity value range of a predetermined base washer material to determine the base washer material 52 (see FIG. 1), based on the electrical conductivity measurement 89 obtained by the electrical conductivity measurement system 88. In one version, as discussed above, the electrical conductivity measurement system 88 comprises one or more eddy current conductivity probe assemblies with one or more eddy current conductivity probes having one or more coils coupled to electrical wires, and one or more sensors coupled to the one or more eddy current conductivity probes, via the electrical wires. As shown in FIG. 9, the washer type determination system 80 and the washer material verification system 86 are coupled to the automated washer feed system 60 via one or more connectors 211*b*. The automated washer feed system 60, including the washer orientation system 72, the washer type determination system 80, and the washer material verification system 86, is controlled with the control system 130 (see FIG. 9).

As shown in FIG. 9, the selected washer 16*a*, such as the selected aircraft washer 18*a*, for example, the selected conductive washer 20*a*, is released and transferred into the holder 66, such as the selected holder 66*a*, via a washer transfer to holder 220 action. As further shown in FIG. 9, in this version, the selected washer 16*a*, such as the selected aircraft washer 18*a*, for example, the selected conductive washer 20*a*, seated in the holder 66, such as the selected holder 66*a*, is transferred to the automated delivery system 100. The holder 66, such as the selected holder 66*a*, may be moved via an automatic transport mechanism (not shown), for example, the automatic transport mechanism may comprise a rail system or a track system, or a hanging rail system or a hanging track system, along which the holder 66 automatically moves between the automated washer feed system 60 and the automated delivery system 100. The automatic transport mechanism may also comprise another suitable transport system.

As shown in FIG. 9, at the automated installation system 110, the selected fastener 26*a*, such as the selected aircraft fastener 28*a*, for example, the countersunk fastener 30, the gripper fingers 96, such as the end effector gripper fingers 96*b*, pick up and grip the the selected fastener 26*a*, such as the selected aircraft fastener 28*a*, for example, the countersunk fastener 30, from the delivery device 102 (see FIG. 13), such as the delivery shuttle 104 (see FIG. 13), and position the selected fastener 26*a*, such as the selected aircraft fastener 28*a*, for example, the countersunk fastener 30, over the selected washer 16*a*, such as the selected aircraft washer 18*a*, for example, the selected conductive washer 20*a*, in the holder 66, such as the selected holder 66*a*. The end effector gripper fingers 96*b* open and close to grip and to release the selected fastener 26*a*, and later the fastener and washer assembly 14, with the open and close action 215 (see FIG. 9), including the close action 215*a* and an open action 215*b* (see FIG. 9).

As further shown in FIG. 9, the selected fastener 26*a*, such as the selected aircraft fastener 28*a*, for example, the countersunk fastener 30, is transferred to the selected washer 16*a*, such as the selected aircraft washer 18*a*, for example, the selected conductive washer 20*a*, in the holder 66, such as the selected holder 66*a*, via a fastener transfer to washer 221 action. The end effector gripper fingers 96*b* perform the open and close action 215, such as the open action 215*b*, and release the selected fastener 26*a*, such as the selected aircraft fastener 28*a*, for example, the countersunk fastener 30, into the selected washer 16*a*, such as the selected aircraft washer 18*a*, for example, the selected conductive washer 20*a*, in the holder 66, such as the selected holder 66*a*, to undergo the automated washer installation 12. With the automated washer installation 12, the selected fastener 26*a*, such as the selected aircraft fastener 28*a*, for example, the countersunk fastener 30, is assembled with the selected washer 16*a*, such as the selected aircraft washer 18*a*, for example, the countersunk washer 22, to form the fastener and washer assembly 14 (see FIG. 9), such as the aircraft fastener and conductive washer assembly 14*a* (see FIG. 9), and in this version, the countersunk fastener and countersunk washer assembly 14*b* (see FIG. 9).

As further shown in FIG. 9, after the selected fastener 26*a*, such as the selected aircraft fastener 28*a*, for example, the countersunk fastener 30, is assembled with the selected washer 16*a*, such as the selected aircraft washer 18*a*, for example, the countersunk washer 22, to form the fastener and washer assembly 14, such as the aircraft fastener and conductive washer assembly 14*a*, for example, the countersunk fastener and countersunk washer assembly 14*b*, using the automated washer installation 12, the fastener and washer assembly 14 is picked up and gripped with the end effector gripper fingers 96*b* in a gripping fastener and washer assembly 219 action with the open and close action 215, including the close action 215*a*. The end effector gripper fingers 96*b* of the automated installation system 110 then installs the fastener and washer assembly 14, such as the aircraft fastener and conductive washer assembly 14*a*, for example, the countersunk fastener and countersunk washer assembly 14*b*, via installation 38 (see FIG. 9), into a structure 40 (see FIG. 9), such as an aircraft structure 42 (see FIG. 9).

As further shown in FIG. 9, the automated washer feed system 60, the automated shuttle assembly 70, the automated fastener holder assembly 90, the automated inspection system 94, the automated delivery system 100, and the automated installation system 110, are controlled and operated via the control system 130 connected with the control system connection 212. The control system connection 212 may comprise the wired connection 212*a* (see FIGS. 7, 8) or the wireless connection 212*b* (see FIG. 9). As shown in FIG. 9, the control system 130 comprises the controller 132, one or more power supplies 134, and the computer system 136.

Figure 10:
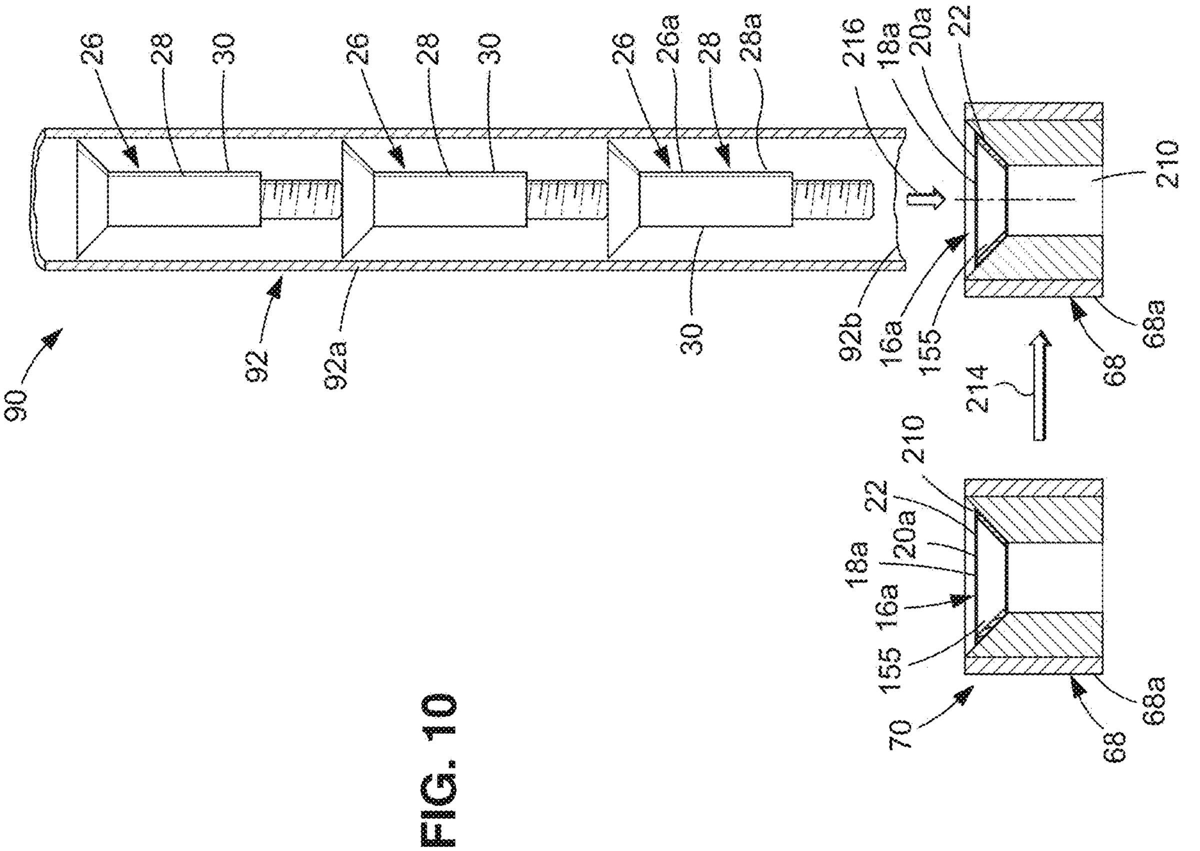
FIG. 10 is an illustration of a front perspective view of an exemplary version of an automated fastener holder assembly holding fasteners and showing an exemplary version of an automated shuttle assembly positioned below the automated fastener holder assembly.

Now referring to FIG. 10, FIG. 10 is an illustration of a front perspective view of an exemplary automated fastener holder assembly 90 holding fasteners 26, such as aircraft fasteners 28, for example, countersunk fasteners 30, and showing an exemplary version of the automated shuttle assembly 70 positioned below the automated fastener holder assembly 90. As shown in FIG. 10, the automated fastener holder assembly 90 holds and dispenses the fasteners 26, such as the aircraft fasteners 28, for example, countersunk fasteners 30, and provides a selected fastener 26*a*, such as a selected aircraft fastener 28*a*, for the automated washer installation 12. In one version, as shown in FIG. 10, the automated fastener holder assembly 90 comprises the fastener holder 92, such as the vertical tube holder 92*a*. In other versions, the one or more fastener holders 92 may comprise cassettes, chutes, hangers, or other suitable fastener holder structures. The fastener holders 92 may accommodate fasteners 26 of different size diameters, for example, one fastener holder 92 may hold fasteners 26 of one diameter size, and another fastener holder 92 may hold fasteners 26 of another diameter size. The fastener holders 92 may receive the fasteners 26, such as the aircraft fasteners 28, from a fastener feeder device (not shown), such as a bowl feeder or other suitable fastener feeder device, located upstream of the automated fastener holder assembly 90 of the automated fastener system 10. The automated fastener holder assembly 90 is controlled with the control system 130 (see FIGS. 1, 7-9).

FIG. 10 shows the automated shuttle assembly 70 with the shuttle cup 68, such as the selected shuttle cup 68*a*, holding the selected washer 16*a*, such as the selected aircraft washer 18*a*, for example, the selected conductive washer 20*a*, in the form of the countersunk washer 22, in the interior through opening 210 of the shuttle cup 68. FIG. 10 further shows the through opening 155 of the selected washer 16*a*, such as the selected aircraft washer 18*a*, for example, the selected conductive washer 20*a*, in the form of the countersunk washer 22. FIG. 10 further shows the washer transport 214 action of the selected washer 16*a*, such as the selected aircraft washer 18*a*, for example, the selected conductive washer 20*a*, in the form of the countersunk washer 22, in the shuttle cup 68, such as the selected shuttle cup 68*a*, to move underneath the automated fastener holder assembly 90. As shown in FIG. 10, the selected fastener 26*a*, such as the selected aircraft fastener 28*a*, is configured to be released or dropped through a fastener holder opening 92*b*, via the fastener transfer 216 action, and into the through opening 155 of the selected washer 16*a*, such as the selected aircraft washer 18*a*, for example, the selected conductive washer 20*a*, in the form of the countersunk washer 22, within the interior through opening 210 in the shuttle cup 68, such as the selected shuttle cup 68*a*.

Now referring to FIG. 11, FIG. 11 is an illustration of a front perspective view of an exemplary version of the automated inspection system 94 that may be used in a version of the automated fastener system 10 (see FIG. 1) and the automated method 270 (see FIG. 16B) of the disclosure, showing gripper fingers 96, such as inspection gripper fingers 96*a*, holding or gripping a selected fastener 26*a*, such as a selected aircraft fastener 28*a*, for example, a countersunk fastener 30, above a partial sectional view of an automated shuttle assembly 70 holding a selected washer 16*a*, such as a selected aircraft washer 18*a*, for example a selected conductive washer 20*a*, in the form of a countersunk washer 22. As shown in FIG. 11, the automated inspection system 94 has the center shaft 95, such as the inspection center shaft 95*a*, with the center shaft end 95*c* of the center shaft 95, aligned with, and in contact with, the alignment portion 168 on the top end 162 of the fastener head 160.

As further shown in FIG. 11, in one version, the automated inspection system 94 has the camera 97 and the laser scanner 98, which are both configured to perform inspection of the selected fastener 26*a*, such as the selected aircraft fastener 28*a*, held and gripped by the inspection gripper fingers 96*a* and aligned with the inspection center shaft 95*a*. FIG. 11 further shows the automated inspection system 94 coupled, via the control system connection 212, to the control system 130 having the controller 132, the power supply 134, and the computer system 136. The control system 130 is configured to control the movement of the inspection gripper fingers 96*a* and the inspection center shaft 95*a*.

The automated inspection system 94, shown in FIG. 11, is an example of one version of an automated inspection system 94 that may be used in the automated fastener system 10 (see FIG. 1) and the automated method 270 (see FIG. 16B) of the disclosure. However, other versions of an automated inspection system with different components, or added components, to achieve inspection of the selected fastener 26*a* may be used, as long as the automated inspection system 94 has at least the two or more inspection gripper fingers 96*a*.

Figure 12B:
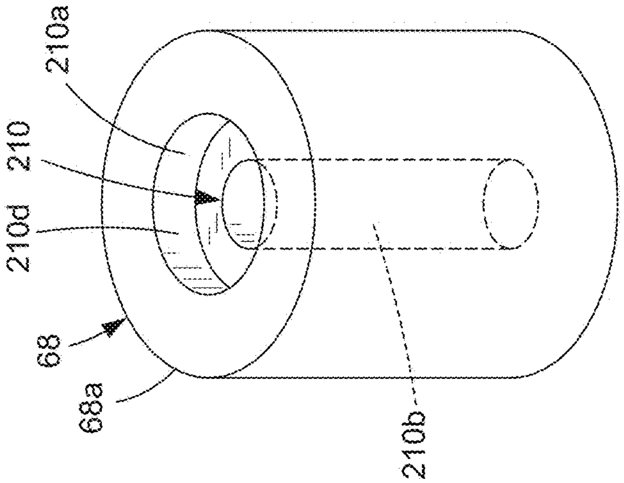
FIG. 12B is an illustration of a top front perspective view of another exemplary version of a shuttle cup of an automated shuttle assembly that may be used in a version of an automated fastener system and an automated method of the disclosure.
Figure 12A:
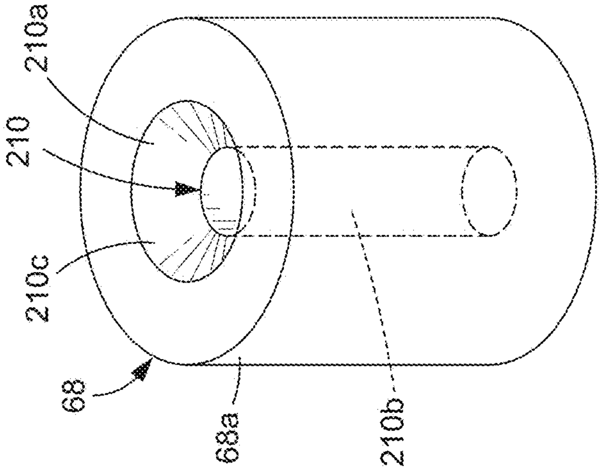
FIG. 12A is an illustration of a top front perspective view of an exemplary version of a shuttle cup of an automated shuttle assembly that may be used in a version of an automated fastener system and an automated method of the disclosure.

Now referring to FIG. 12A, FIG. 12A is an illustration of a top front perspective view of an exemplary version of a shuttle cup 68, such as a selected shuttle cup 68*a*, of the automated shuttle assembly 70 (see FIG. 1) that may be used in a version of the automated fastener system 10 (see FIG. 1) and the automated method 270 (see FIG. 16B) of the disclosure. As shown in FIG. 12A, the shuttle cup 68, such as the selected shuttle cup 68*a*, has the interior through opening 210 formed through the shuttle cup 68. As shown in FIG. 12A, the interior through opening 210 includes the fastener head opening portion 210*a* and the shank opening portion 210*b*. In this version, the fastener head opening portion 210*a*, such as a countersunk fastener head opening portion 210*c*, is configured to support and hold the countersunk fastener head 160*a* (see FIG. 2A) of the countersunk fastener 30 (see FIG. 2A), and/or is configured to support and hold the countersunk washer 22, and/or is configured to hold both the countersunk washer 22 and the countersunk fastener head 160*a*. The shank opening portion 210*b* is configured to support and hold all, or a portion, of the fastener shank 172 (see FIG. 2A) of the countersunk fastener 30. The length of the countersunk fastener 30, including the fastener shank 172, may extend past the interior through opening 210 at the bottom of the shuttle cup 68, or may extend wholly or partially through the interior through opening 210 of the shuttle cup 68, depending on the length of the fastener 26, such as the countersunk fastener 30, and the length of the fastener shank 172. As further shown in FIG. 12A, in one version, the shuttle cup 68, such as the selected shuttle cup 68*a*, has a cylindrical shape. However, the shuttle cup 68, such as the selected shuttle cup 68*a*, may have another suitable shape.

Now referring to FIG. 12B, FIG. 12B is an illustration of a top front perspective view of another exemplary version of a shuttle cup 68, such as a selected shuttle cup 68*a*, of the automated shuttle assembly 70 (see FIG. 1) that may be used in a version of the automated fastener system 10 (see FIG. 1) and the automated method 270 (see FIG. 16B) of the disclosure. As shown in FIG. 12B, the shuttle cup 68, such as the selected shuttle cup 68*a*, has the interior through opening 210 formed through the shuttle cup 68. As shown in FIG. 12B, the interior through opening 210 includes the fastener head opening portion 210*a* and the shank opening portion 210*b*. In this version, the fastener head opening portion 210*a*, such as a protruding fastener head opening portion 210*d*, is configured to support and hold the protruding fastener head 160*b* (see FIG. 4A) of the protruding head fastener 32 (see FIG. 4A), and/or is configured to support and hold the chamfer washer 25, and/or is configured to hold both the chamfer washer 25 and the protruding fastener head 160*b*. The shank opening portion 210*b* is configured to support and hold all, or a portion, of the fastener shank 172*c* (see FIG. 4A) of the protruding head fastener 32. The length of the protruding head fastener 32, including the fastener shank 172*c*, may extend past the interior through opening 210 at the bottom of the shuttle cup 68, or may extend wholly or partially through the interior through opening 210 of the shuttle cup 68, depending on the length of the fastener 26, such as the protruding head fastener 32, and the length of the fastener shank 172*c*. As further shown in FIG. 12B, in one version, the shuttle cup 68, such as the selected shuttle cup 68*a*, has a cylindrical shape. However, the shuttle cup 68, such as the selected shuttle cup 68*a*, may have another suitable shape.

Figure 13:
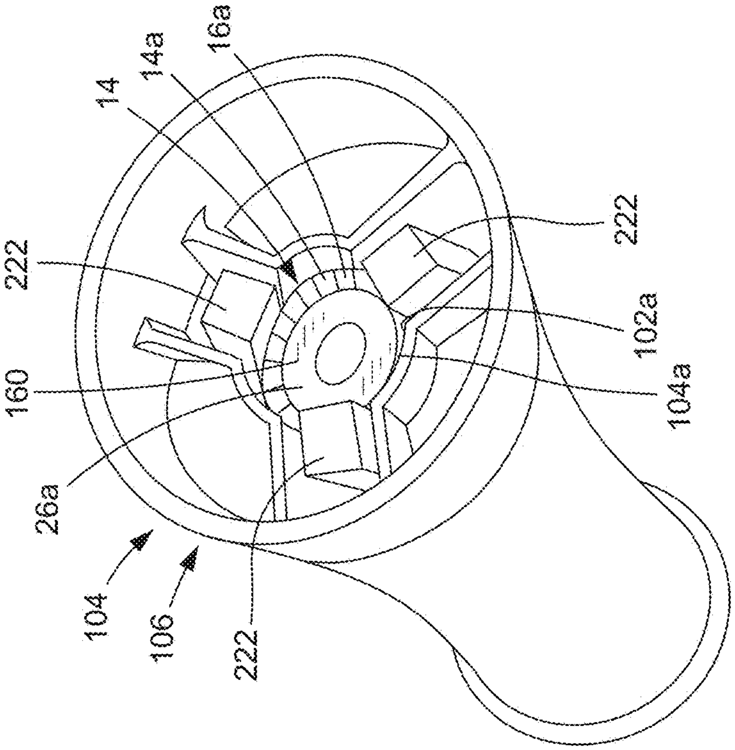
FIG. 13 is an illustration of a top front perspective view of an exemplary version of a delivery device of an automated delivery system used in a version of an automated fastener system and an automated method of the disclosure, showing a fastener and washer assembly retained within the delivery device.

Now referring to FIG. 13, FIG. 13 is an illustration of a top front perspective view of an exemplary version of a delivery device 102, such as a delivery shuttle 104, of the automated delivery system 100 (see FIGS. 1, 7-9) used in a version of the automated fastener system 10 (see FIG. 1) and the automated method 270 (see FIG. 16B) of the disclosure, showing a fastener and washer assembly 14, such as the aircraft fastener and conductive washer assembly 14*a*, retained within the delivery device 102, such as the delivery shuttle 104.

FIG. 13 shows the fastener and washer assembly 14, such as the aircraft fastener and conductive washer assembly 14*a*, retained within a delivery device interior 102*a* of the delivery device 102, for example, a delivery shuttle interior 104*a*, of the delivery shuttle 104. In one version, as shown in FIG. 13, the fastener and washer assembly 14 is shown after the automated washer installation 12 (see FIGS. 7, 8). FIG. 13 shows the selected washer 16*a* and the selected fastener 26*a*. FIG. 13 shows the fastener head 160 of the selected fastener 26*a*.

In another version, the selected fastener 26*a* is delivered in the delivery device 102, such as the delivery shuttle 104, and the selected washer 16*a* is delivered in the delivery device 102, such as the delivery shuttle 104, separate from the selected fastener 26*a*. In this version, once the selected fastener 26*a* and the selected washer 16*a* are both delivered to the automated installation system 110 (see FIG. 9), the selected fastener 26*a* and the selected washer 16*a* are assembled with the automated washer installation 12 (see FIG. 9) to obtain or form the fastener and washer assembly 14 (see FIG. 9), such as the aircraft fastener and conductive washer assembly 14*a* (see FIGS. 1, 9), prior to installation 38 (see FIGS. 1,9) in the structure 40 (see FIGS. 1, 9, 17), such as the aircraft structure 42 (see FIGS. 1, 9, 17)

FIG. 13 further shows retention elements 222 contacting the fastener and washer assembly 14, to retain the fastener and washer assembly 14 in a position within the delivery device interior 102*a*, such as the delivery shuttle interior 104*a*. Alternatively, the retention elements 222 may be located within the delivery device interior 102*a*, and the fastener shank 172 (see FIGS. 2A-2B) and/or the tail end 178 (see FIGS. 2A-2B) of the selected fastener 26*a* may be retained, instead of the selected washer 16*a* and the fastener head 160, or in addition to the selected washer 16*a* and the fastener head 160, by the retention elements 222 disposed in the delivery device interior 102*a*, such as the delivery shuttle interior 104*a*, past the selected washer 16*a* and the fastener head 160. Preferably, the fastener and washer assembly 14 is encapsulated in the delivery device interior 102*a*, such as the delivery shuttle interior 104*a*. Preferably, the full lengths of the selected washer 16*a* and the selected fastener 26*a* are encompassed within the delivery device interior 102*a*, such as the delivery shuttle interior 104*a*.

The retention elements 222 may comprise clamps, clips, clasps, spring-loaded mechanisms, or other suitable fastener retention elements that retain or secure the fastener and washer assembly 14, or the selected fastener 26*a*, or the selected washer 16*a*, within the delivery device interior 102*a*, such as the delivery shuttle interior 104*a*, during transport and delivery of the fastener and washer assembly 14, or the selected fastener 26*a*, or the selected washer 16*a*, in the delivery device 102, such as the delivery shuttle 104, through the transfer tube 108 (see FIG. 1), such as the vacuum tube 108*a* (see FIG. 1), or the pressure tube 108*b* (see FIG. 1), disposed between the automated inspection system 94 (see FIGS. 1, 7-9) and the automated installation system 110 (see FIGS. 1, 7-9). The delivery device 102, such as the delivery shuttle 104, transports and delivers the fastener and washer assembly 14, or the selected fastener 26*a*, or the selected washer 16*a*, away from the automated inspection system 94 and to the automated installation system 110 for installation 38 (see FIGS. 1, 9) in a structure 40 (see FIGS. 1, 9, 17), such as an aircraft structure 42 (see FIGS. 1, 9, 17).

The delivery device 102, such as the delivery shuttle 104, shown in FIG. 13, has a substantially cylindrical shape and has a suitable size and shape to easily and efficiently travel through the transfer tube 108 (see FIG. 1), such as the vacuum tube 108*a* (see FIG. 1), or the pressure tube 108*b* (see FIG. 1). The delivery device 102, such as the delivery shuttle 104, shown in FIG. 13, may be made of a metal material 56 (see FIG. 1), such as steel 56*d* (see FIG. 1), stainless steel, aluminum 56*b*, or another suitable metal material.

The delivery device 102, such as the delivery shuttle 104, shown in FIG. 13, is an example of one version that may be used in the automated delivery system 100 (see FIG. 1) of the automated fastener system 10 (see FIG. 1) and the automated method 270 (see FIG. 16B) of the disclosure. However, other versions of the delivery device 102, such as the delivery shuttle 104, with different parts or added parts, to achieve retention and delivery of the fastener and washer assembly 15, the selected fastener 26*a*, or the selected washer 16*a*, may be used.

Now referring to FIG. 14A, FIG. 14A is an illustration of a side perspective view of an exemplary version of the automated installation system 110 that may be used in a version of the automated fastener system 10 (see FIG. 1) and the automated method 270 (see FIG. 1) of the disclosure, showing a version of the automated installation system 110, in the form of a robotic system 114 having an end effector 112 coupled to gripper fingers 96, such as end effector gripper fingers 96*b*, holding a fastener and washer assembly 14, such as an aircraft fastener and conductive washer assembly 14*a*. As shown in FIG. 14A, the end effector 112 is further coupled to the center shaft 95, such as the end effector center shaft 95*b*.

The automated installation system 110, shown in FIG. 14A, may in one version, as shown and discussed above with regard to FIG. 9, include the automated washer installation 12, where after delivery of the selected fastener 26*a* and the selected washer 16*a* to the automated installation system 110, the selected fastener 26*a* is assembled with the selected washer 16*a* using the automated washer installation 12, to obtain the fastener and washer assembly 14.

As further shown in FIG. 14A, the robotic system 114 comprises the end effector 112 attached to a robot 115. As further shown in FIG. 14A, in one version, the robot 115 comprises a robot arm 224 connected to an elbow joint 226, the elbow joint 226 connected to a shoulder 228, and the shoulder 228 connected to a base assembly 230.

As further shown in FIG. 14A, the robotic system 114 is coupled to the control system 130, via the control system connection 212, comprising the wired connection 212*a*. Alternatively, the control system connection 212 may comprise the wireless connection 212*b*. As shown in FIG. 14A, the control system 130 comprises at least the controller 132, one or more power supplies 134, and the computer system 136.

Now referring to FIG. 14B, FIG. 14B is an illustration of a side perspective view of another version of an automated installation system 110 that may be used in a version of the automated fastener system 10 (see FIG. 1) and the automated method 270 (see FIG. 16B) of the disclosure, showing a version of the automated installation system 110 in the form of a gantry system 116 with a gantry 118 having an end effector 112 coupled to gripper fingers 96, such as end effector gripper fingers 96*b*, holding a fastener and washer assembly 14, such as an aircraft fastener and conductive washer assembly 14*a*. As shown in FIG. 14A, the end effector 112 is further coupled to the center shaft 95, such as the end effector center shaft 95*b*.

The automated installation system 110, shown in FIG. 14B, may in one version, as shown and discussed above with regard to FIG. 9, include the automated washer installation 12, where after delivery of the selected fastener 26*a* and the selected washer 16*a* to the automated installation system 110, the selected fastener 26*a* is assembled with the selected washer 16*a* using the automated washer installation 12, to obtain the fastener and washer assembly 14.

As further shown in FIG. 14B, the gantry system 116 comprises a horizontal beam 232 spanning between two support legs 234. As shown in FIG. 14B, the gantry system 116 further comprises an arm portion 236 attached to the end effector 112 at one end and attached to a support leg 234 at the other end. The gantry system 116 may further comprises one or more other components known to one skilled in the art, including but not limited to, a trolley, a crane, one or more carriages, a controller, and other suitable components.

As further shown in FIG. 14B, the gantry system 116 is coupled to the control system 130, via the control system connection 212, comprising the wireless connection 212*b*. Alternatively, the control system connection 212 may comprise the wired connection 212*a*. As shown in FIG. 14B, the control system 130 comprises at least the controller 132, one or more power supplies 134, and the computer system 136.

Figure 15:
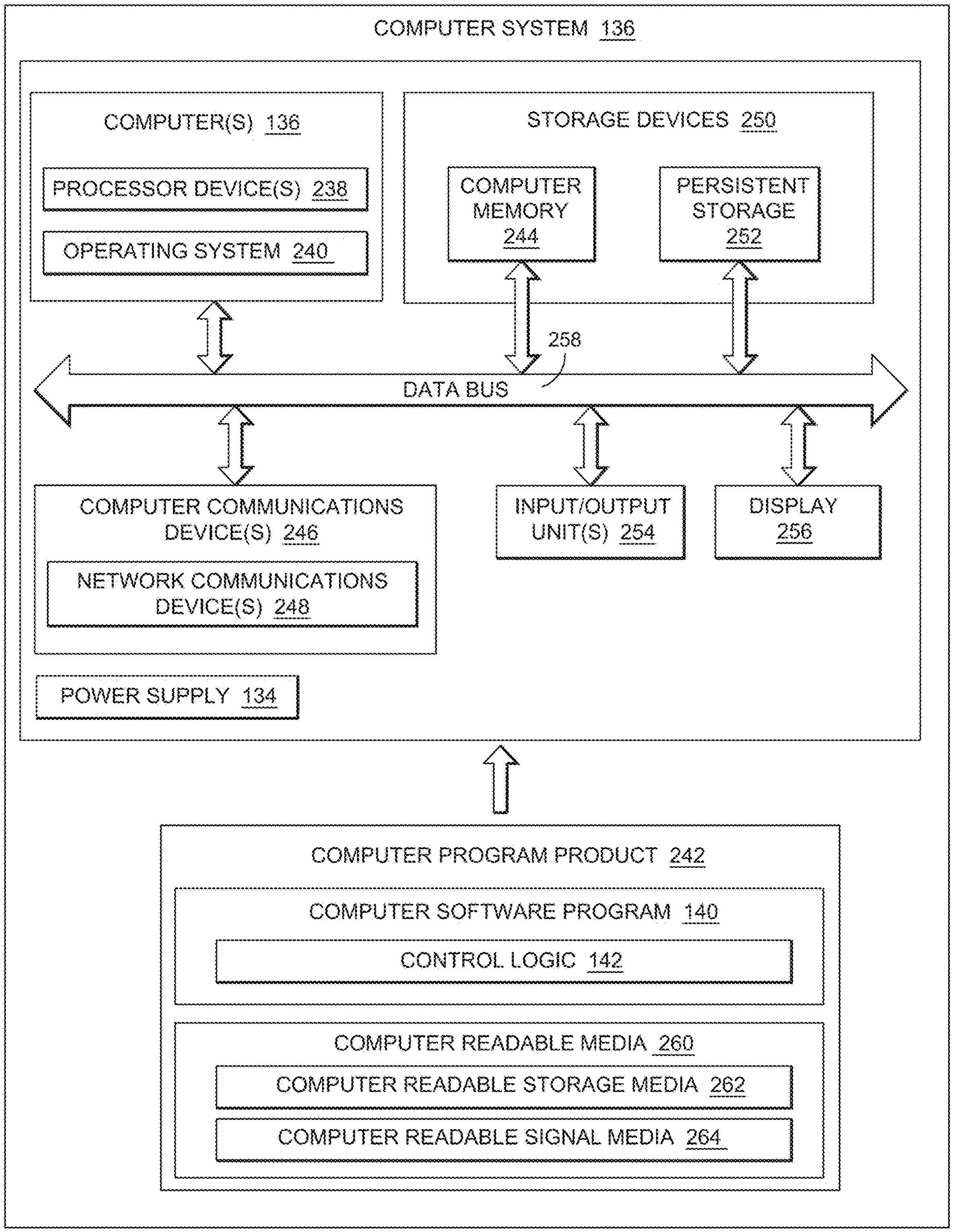
FIG. 15 is an illustration of a block diagram of an exemplary version of a computer system used in a version of an automated fastener system and an automated method of the disclosure.

Now referring to FIG. 15, FIG. 15 is an illustration of a block diagram of an exemplary version of the computer system 136 that may be used with versions of the automated fastener system 10 (see FIG. 1) and the automated method 270 (see FIG. 16B) of the disclosure. As shown in FIG. 15, the computer system 136 comprises one or more computers 138 with one or more processor devices 238, and an operating system 240. The computer system 136 (see FIG. 15) may be used to implement the one or more computers 138 (see FIG. 15).

The one or more computers 138 (see FIG. 15) or one or more processor devices 238 (see FIG. 15) may be configured to control one or more functions of one or more elements of the automated fastener system 10 (see FIG. 1) through computer program instructions, such as a computer program product 242 (see FIG. 15) stored on a computer memory 244 (see FIG. 15), accessible to the one or more computers 138 (see FIG. 15), or one or more processor devices 238 (see FIG. 15).

As shown in FIG. 15, the computer system 136 may further comprise one or more computer communications devices 246, such as networking communications devices 248, for linking the automated fastener system 10 (see FIG. 1), for example, to one or more separate systems. The networking communications devices 248 (see FIG. 15) may comprise network links between various computers and devices connected together within a network data processing system via wire connections, wireless communication links, fiber optic cables, or other suitable network connections, and that may connect to a network, a server, the Internet, or another system or device.

The one or more computer communications devices 246 (see FIG. 15) may be configured to provide for communications in accordance with any of a number of wired or wireless communication standards. The one or more computers 138 (see FIG. 15), or one or more processor devices 238 (see FIG. 15), may also be configured to facilitate communications, via the one or more computer communications devices 246 (see FIG. 15), by, for example, controlling hardware included within the one or more computer communications devices 246 (see FIG. 15). The one or more computer communications devices 246 (see FIG. 15) may include, for example, one or more antennas, a transmitter, a receiver, a transceiver and/or supporting hardware, including, for example, a processor for enabling communications.

As shown in FIG. 15, the computer system 136 further comprises storage devices 250, such as computer memory 244 and persistent storage 252. The computer memory 244 (see FIG. 15) may comprise one or more of a random-access memory (RAM), including dynamic and/or static RAM, on-chip or off-chip cache memory, or other suitable computer memory. The persistent storage 252 (see FIG. 15) may comprise one or more of a flash memory, a hard drive, read-only memory (ROM), magnetic storage devices such as hard disks, floppy disk drives, and rewritable magnetic tape, rewritable optical disk drives and/or media, non-volatile random-access memory (NVRAM), or other suitable persistent storage.

As shown in FIG. 15, the computer system 136 further comprises one or more input/output units 254, a display 256, a data bus 258, and a power supply 134. The one or more input/output units 254 (see FIG. 15) provide for the input and output of data with other devices connected to the computer system 136 (see FIG. 15), such as, the computer interfaces. The one or more input/output units 254 (see FIG. 15) may comprise such devices as a keyboard, a mouse, a joystick, or other input/output devices. For example, the one or more input/output units 254 (see FIG. 15) may provide a connection for user input though a keyboard and mouse, or may send output to a printer or other device.

The display 256 (see FIG. 15) provides the means to display the electrical conductivity measurement 89 (see FIG. 1) of the washer 16 (see FIG. 1), such as the selected washer 16*a* (see FIG. 1), or other data or information to an operator, a user, an analyst, one or more separate automated systems, automated computer programs, automated apparatuses, or automated devices, or another suitable separate system, program, or device. As shown in FIG. 15, the data bus 258 provides communications between the one or more computers 138, the computer memory 244, the persistent storage 252, the computer communications devices 246, the one or more input/output units 254, and the display 256. The power supply 134 (see FIG. 15) of the computer system 136 (see FIG. 15) may comprise batteries, electricity, solar chargers, or other power supply elements.

As shown in FIG. 15, the computer program product 242 is preferably used in the computer system 136. The computer program product 242 (see FIG. 15) comprises the computer software program 140 (see FIG. 15) with the control logic 142 (see FIG. 15). The control logic 142 may comprise an algorithm, program code, computer firmware, or another suitable system logic. As shown in FIG. 15, the computer program product 242 may comprise a computer readable medium 260. The computer readable medium 260 (see FIG. 15) may comprise computer readable storage media 262 (see FIG. 15), computer readable signal media 264 (see FIG. 15), or another suitable computer readable medium.

The control logic 142 (see FIG. 15) may be stored in, and retrieved from, the computer readable storage media 262 (see FIG. 15) and loaded into the one or more computers 138 (see FIG. 15), the one or more processor devices 238, or other programmable device, to configure and direct the one or more computers 138, the one or more processor devices 238, or other programmable device to execute operations to be performed on or by the one or more computers 138, the one or more processor devices 238, or other programmable device, and to function in a particular way. Execution of the control logic 142 (see FIG. 15) implemented by the computer software program 140 may produce a computer-implemented system, process or method, such that the control logic 142 executed by the one or more computers 138 (see FIG. 15), the one or more processor devices 238 (see FIG. 15), or other programmable device provide operations for implementing the functions disclosed herein.

Figure 16A:
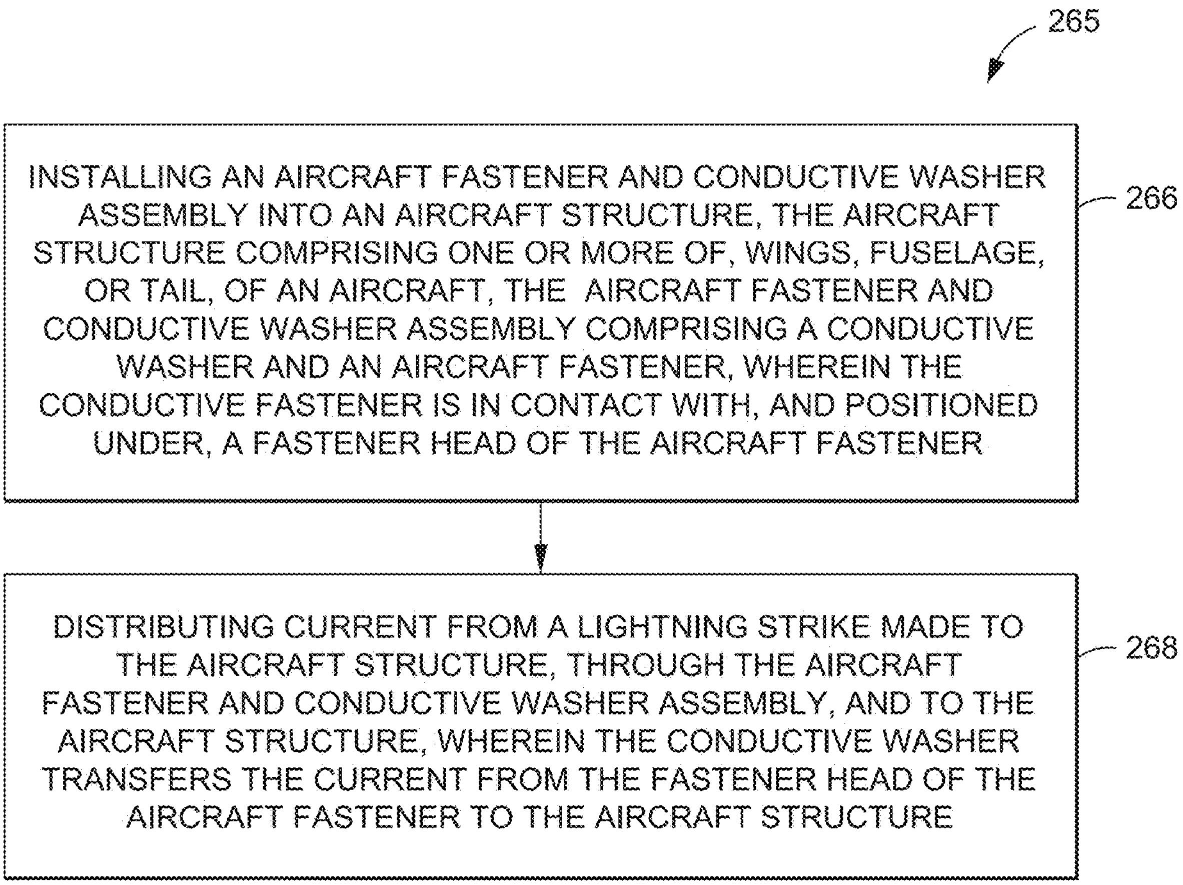
FIG. 16A is an illustration of a flow diagram of an exemplary version of an automated method of the disclosure.

Now referring to FIG. 16A, FIG. 16A is an illustration of a flow diagram of an exemplary version of a method 265 of distributing current 144 (see FIG. 17), or energy, in and through an aircraft structure 42 (see FIG. 17). The blocks in FIG. 16A represent operations and/or portions thereof, or elements, and lines connecting the various blocks do not imply any particular order or dependency of the operations or portions thereof, or elements. FIG. 16A and the disclosure of the steps of the method 265 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

The method 265 comprises providing an aircraft fastener and conductive washer assembly 14*a*, as discussed in detail above. The aircraft fastener and conductive washer assembly 14*a* is assembled using a version of the automated fastener system 10 (see FIG. 1), including the automated fastener installation 12 (see FIG. 1). The aircraft fastener and conductive washer 14*a* comprises a conductive washer 20 (see FIG. 1) made of a conductive material 54 (see FIG. 1), or having a conductive coating 53 (see FIG. 1), or made of a conductive material 54 and having a conductive coating 53. The conductive washer 20 comprises an aircraft washer 18 (see FIG. 1), such as a selected aircraft washer 18*a* (see FIG. 1). The aircraft fastener 28 (see FIG. 1) is made of one of, a metal material 56 (see FIG. 1), or a metal alloy material 58 (see FIG. 1). The aircraft fastener 28 comprises a selected aircraft fastener 28*a* (see FIG. 1). The conductive washer 20 is in contact with, and positioned under, a fastener head 160 (see FIGS. 2A, 4A) of the aircraft fastener 28 (see FIG. 1).

As shown in FIG. 16A, the method 265 comprises installing 266 the aircraft fastener and conductive washer assembly 14*a* into or in the aircraft structure 42. The aircraft structure 42 comprises one or more of, wings 284 (see FIG. 17), fuselage 282 (see FIG. 17), a tail 288 (see FIG. 17), or another suitable aircraft structure 42 of an aircraft 280*a* (see FIG. 17).

As discussed above, the aircraft fastener and conductive washer assembly 14*a* comprises the conductive washer 20 made of the conductive material 54 (see FIG. 1), or having the conductive coating 53 (see FIG. 1), or made of the conductive material 54 and having the conductive coating 53, and the aircraft fastener 28 (see FIG. 1) is made of one of, the metal material 56 (see FIG. 1), or the metal alloy material 58 (see FIG. 1). The conductive washer 20 is in contact with, and positioned under, the fastener head 160 (see FIGS. 2A, 4A) of the aircraft fastener 28 (see FIG. 1).

Installing 266 the aircraft fastener and conductive washer assembly 14*a* into or in the aircraft structure 42, may further comprise installing the aircraft fastener and conductive washer assembly 14*a*, where the conductive washer 20 comprises one of, a countersunk washer 22 (see FIGS. 1, 2A), or a chamfer washer 25 (see FIGS. 1, 4A), including a symmetrical chamfer washer 25*a* (see FIG. 5A), or a non-symmetrical chamfer washer 25*b* (see FIG. 5B).

Installing 266 the aircraft fastener and conductive washer assembly 14*a* into the aircraft structure 42, further comprises installing the aircraft fastener and conductive washer assembly 14*a*, where the aircraft fastener 28 comprises one or more of, a countersunk fastener 30 (see FIG. 2A), a protruding head fastener 32 (see FIG. 4A), a clearance fit fastener 34 (see FIG. 3B), an interference fit fastener 36 (see FIG. 3C), a transition fit fastener 37 (see FIG. 1), or another suitable fastener.

Installing 266 the aircraft fastener and conductive washer assembly 14*a* into the aircraft structure 42, further comprises installing the aircraft fastener and conductive washer assembly 14*a*, where the conductive washer 20 comprises a base washer material 52 comprising, one or more of, the metal material 56, as shown in FIG. 1, including copper 56*a*, aluminum 56*b*, nickel 56*c*, steel 56*d*, titanium 56*e*, silver 56*f*, zinc 56*g*, or gold 56*h*, or the metal alloy material 58, as shown in FIG. 1, including a copper alloy 58*a*, a nickel-chromium alloy 58*b*, brass 58*c*, bronze 58*d*, a titanium alloy 58*e*, an aluminum alloy 58*f*, a nickel alloy 58*g*, a steel alloy 58*h*, a silver alloy 58*i*, a zinc alloy 58*j*, or a gold alloy 58*k*. Further, the aircraft fastener 28 comprises a base fastener material 55 (see FIG. 1) comprising, one or more of, the metal material 56, as shown in FIG. 1, including copper 56*a*, aluminum 56*b*, nickel 56*c*, steel 56*d*, titanium 56*e*, silver 56*f*, zinc 56*g*, or gold 56*h*, or the metal alloy material 58, as shown in FIG. 1, including a copper alloy 58*a*, a nickel-chromium alloy 58*b*, brass 58*c*, bronze 58*d*, a titanium alloy 58*e*, an aluminum alloy 58*f*, a nickel alloy 58*g*, a steel alloy 58*h*, a silver alloy 58*i*, a zinc alloy 58*j*, or a gold alloy 58*k*.

As further shown in FIG. 16A, the method 265 comprises distributing 268 the current 144 (see FIG. 17), or energy, from a lightning strike 294 (see FIG. 17) made to the aircraft structure 42, through the aircraft fastener and conductive washer assembly 14*a*, and to the aircraft structure 42. The conductive washer 20 transfers the current 144, or energy, from the fastener head 160 of the aircraft fastener 28 to the aircraft structure 42. The conductive washer 20 of the aircraft fastener and conductive washer assembly 14*a* is used for electromagnet effects (EME) mitigation to disburse the current 144 (see FIG. 17), or energy, from the lightning strike 294 in a current path 144*a* (see FIG. 17) and from the fastener head 160 of the aircraft fastener 28 to the aircraft structure 42.

Distributing 268 the current 144 from the lightning strike 294 made to the aircraft structure 42, through the aircraft fastener and conductive washer assembly 14*a*, and to the aircraft structure 42, may further comprise the aircraft structure 42 (see FIG. 17) comprising a composite aircraft structure 42*a* (see FIG. 17), and the conductive washer 20 transferring the current 144, or energy, from the fastener head 160 of the aircraft fastener 28 to composite fibers 43 (see FIG. 1) of the composite aircraft structure 42*a*.

Figure 16B:
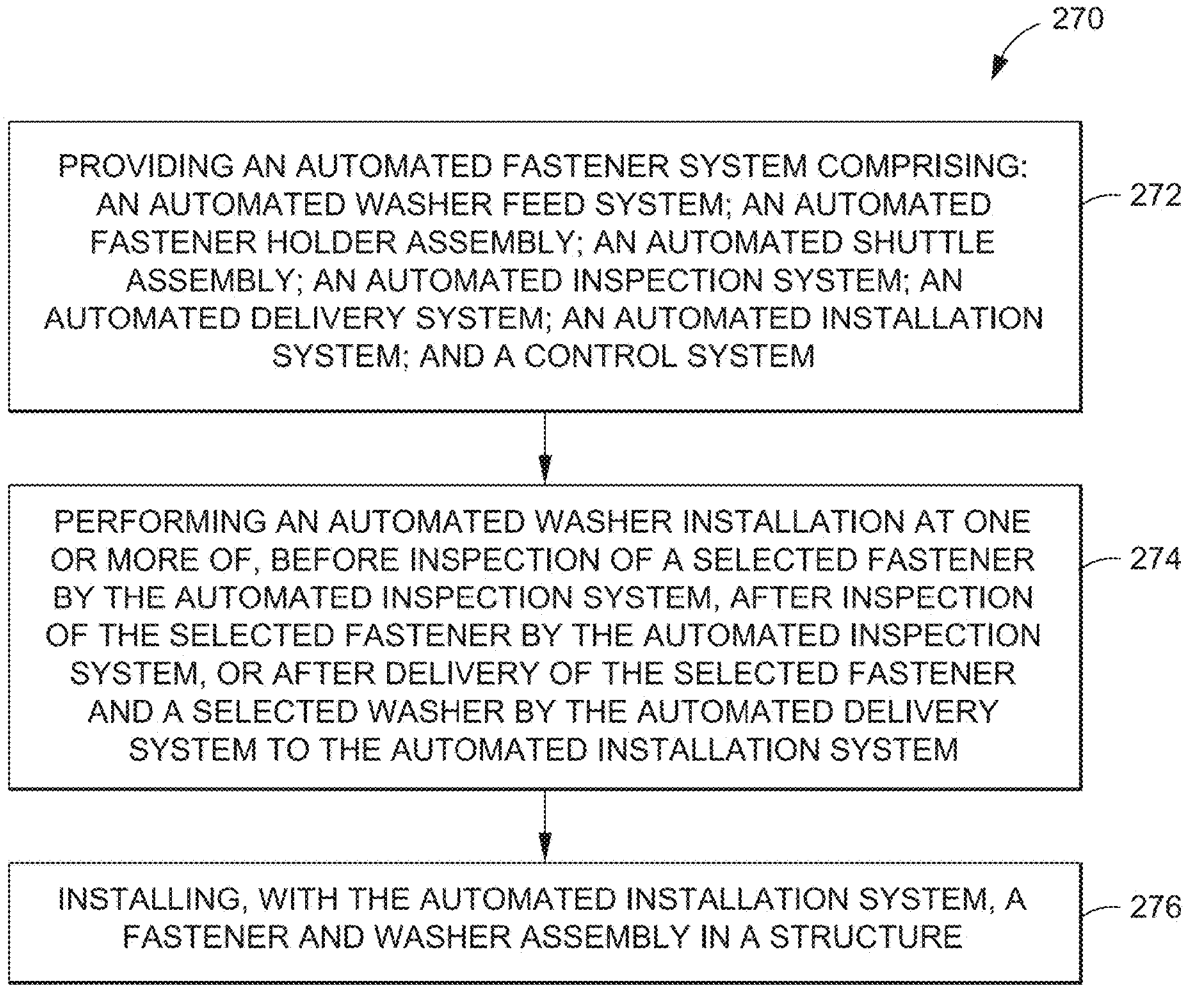
FIG. 16B is an illustration of a flow diagram of another exemplary version of an automated method of the disclosure.

Now referring to FIG. 16B, FIG. 16B is an illustration of a flow diagram of an exemplary version of an automated method 270 of the disclosure. In another version of the disclosure, there is provided the automated method 270 of performing automated washer installation 12 (see FIG. 1) in an automated fastener system 10 (see FIG. 1). The blocks in FIG. 16B represent operations and/or portions thereof, or elements, and lines connecting the various blocks do not imply any particular order or dependency of the operations or portions thereof, or elements. FIG. 16B and the disclosure of the steps of the automated method 270 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 16B, the automated method 270 comprises providing 272 the automated fastener system 10. As discussed in detail above, the automated fastener system 10 comprises the automated washer feed system 60 (see FIGS. 1, 7-9) holding and dispensing one or more washers 16 (see FIGS. 1, 7-9), such as one or more aircraft washers 18 (see FIGS. 1, 7-9), and providing a selected washer 16*a* (see FIGS. 1, 7-9), such as a selected aircraft washer 18*a* (see FIGS. 1, 7-9), for the automated washer installation 12.

Providing 272 the automated fastener system 10 may further comprise, providing the automated fastener system 10 (see FIG. 1) comprising the automated washer feed system 60 (see FIGS. 1, 7-9) further comprising a washer orientation system 72 (see FIGS. 1, 7), to orient and position one of, a countersunk washer 22 (see FIGS. 1, 7), or a nonsymmetrical chamfer washer 25*b* (see FIG. 5B), for transfer and insertion into one of, a selected holder 66*a* (see FIG. 9), or a selected shuttle cup 68*a* (see FIG. 7).

Providing 272 the automated fastener system 10 may further comprise, providing the automated fastener system 10 (see FIG. 1) comprising the automated washer feed system 60 (see FIGS. 1, 7-9) further comprising a washer type determination system 80 (see FIG. 1), to determine whether each of the one or more washers 16, such as each of the one or more aircraft washers 18, is a countersunk washer 22 (see FIGS. 1, 7), or a chamfer washer 25 (see FIGS. 1, 5A-5B).

Providing 272 the automated fastener system 10 may further comprise, providing the automated fastener system 10 (see FIG. 1) comprising the automated washer feed system 60 (see FIGS. 1, 7-9) further comprising a washer material verification system 86 (see FIG. 1), to verify a base washer material 52 (see FIG. 1) of the washer 16, such as the selected washer 16*a* (see FIGS. 1, 7), such as the aircraft washer 18, such as the selected aircraft washer 18*a* (see FIG. 1).

The automated fastener system 10 further comprises the automated fastener holder assembly 90 holding and dispensing one or more fasteners 26 (see FIGS. 1, 7-9), such as one or more aircraft fasteners 28 (see FIGS. 1, 7-9) and providing a selected fastener 26*a* (see FIGS. 1, 7-9), such as a selected aircraft fastener 28*a* (see FIGS. 1, 7-9), for the automated washer installation 12. With the automated washer installation 12, the selected fastener 26*a*, such as the selected aircraft fastener 28*a*, is inserted in the selected washer 16*a*, such as the selected aircraft washer 18*a*, for example, the selected conductive washer 20*a* (see FIG. 1), so that the selected washer 16*a*, such as the selected aircraft washer 18*a*, for example, the selected conductive washer 20*a*, is in contact with, and positioned under, a fastener head 160 of the selected fastener 26*a*, such as the selected aircraft fastener 28*a*, to obtain a fastener and washer assembly 14 (see FIGS. 1, 7-9), such as an aircraft fastener and conductive washer assembly 14*a* (see FIG. 1).

The automated fastener system 10 further comprises the automated shuttle assembly 70 (see FIGS. 1, 7, 8) having one or more shuttle cups 68 (see FIGS. 1, 7, 8, 12A-12B). A selected shuttle cup 68*a* (see FIGS. 1, 7, 8) of the one or more shuttle cups 68 is configured to receive and transport, and receives and transports, one of, the selected washer 16*a*, such as the selected aircraft washer 18*a*, from the automated washer feed system 60, the selected fastener 26*a*, such as the selected aircraft fastener 28*a*, from the automated fastener holder assembly 90, or the fastener and washer assembly 14.

The automated fastener system 10 further comprises the automated inspection system 94 (see FIGS. 1, 7-9, 11) having two or more gripper fingers 96 (see FIG. 11), such as two or more inspection gripper fingers 96*a* (see FIG. 11), configured to pick up, to inspect, and to release one of, the selected fastener 26*a*, such as the selected aircraft fastener 28*a*, or the fastener and washer assembly 14.

The automated fastener system 10 further comprises the automated delivery system 100 (see FIGS. 1, 7-8) having the delivery device 102 (see FIGS. 1, 11), such as the delivery shuttle 104 (see FIG. 11), configured to transport and deliver, and transporting and delivering, one or more of, the selected fastener 26*a*, such as the selected aircraft fastener 28*a*, the selected washer 16*a*, such as the selected aircraft washer 18*a*, or the fastener and washer assembly 14, away from the automated inspection system 94.

The automated fastener system 10 further comprises the automated installation system 110 (see FIGS. 1, 7-9, 14A-14B) having the end effector 112 (see FIGS. 1, 14A, 14B) with two or more end effector gripper fingers 96*b* configured to pick up and grip from the delivery device 102 (see FIG. 1), one or more of, the selected fastener 26*a*, such as the selected aircraft fastener 28*a*, the selected washer 16*a*, such as the selected aircraft washer 18*a*, or the fastener and washer assembly 14. The automated installation system 110 is configured to install, and installs, the fastener and washer assembly 14 in the structure 40 (see FIGS. 1, 17), such as the aircraft structure 42 (see FIGS. 1, 17).

The automated fastener system 10 further comprises the control system 130 (see FIG. 1) comprising at least the controller 132 (see FIG. 1), one or more power supplies 134 (see FIG. 1), and the computer system 136 (see FIGS. 1, 15). The control system 130 is configured to control the automated fastener system 10 and the automated washer installation 12.

As shown in FIG. 16B, the automated method 270 further comprises performing 274 the automated washer installation 12 at one or more of, before inspection of the selected fastener 26*a*, such as the selected aircraft fastener 28*a*, by the automated inspection system 94, after inspection of the selected fastener 26*a*, such as the selected aircraft fastener 28*a*, by the automated inspection system 94, such as before transfer to the automated delivery system 100 and to the automated installation system 110, or after delivery of the selected fastener 26*a*, such as the selected aircraft fastener 28*a*, and the selected washer 16*a*, such as the selected aircraft washer 18*a*, by the automated delivery system 100 to the automated installation system 110.

As shown in FIG. 16B, the automated method 270 further comprises installing 276, with the automated installation system 110, the fastener and washer assembly 14 in a structure 40 (see FIGS. 1, 17), such as an aircraft structure 42 (see FIGS. 1, 17). Installing 276 the fastener and washer assembly 14 in the structure 40, such as the aircraft structure 42, may further comprise, aligning, with an alignment assembly 120 (see FIG. 1), the fastener and washer assembly 14 with a hole 126 (see FIG. 1), such as a hole bore, in the structure 40, such as the aircraft structure 42, and maintaining an alignment position 128 (see FIG. 1) of the fastener and washer assembly 14, until the selected fastener 26*a*, such as the selected aircraft fastener 28*a*, is partially inserted through the hole 126 in the structure 40, such as the aircraft structure 42, and partially installed in the structure 40, such as the aircraft structure 42. As shown in FIG. 1, the alignment assembly 120 comprises one or more linear actuators 122 and alignment guides 124, to move one or more of, the fastener and washer assembly 14, the selected fastener 26*a*, or the selected washer 16*a*, to and from different positions in the automated installation system 110, such as home, pick-up, and installation 38.

Now referring to FIG. 17, FIG. 17 is an illustration of a perspective view of a vehicle 280, such as an aircraft 280*a*, that incorporates one or more structures 40, such as one or more aircraft structures 42, having fastener and washer assemblies 14 (see FIGS. 1, 7-9) of a type that can undergo installation 38 (see FIG. 1) with versions of the automated fastener system 10 (see FIG. 1) and the automated method 270 (see FIG. 16B) of the disclosure. As shown in FIG. 17, the vehicle 280, such as the aircraft 280*a*, comprises the fuselage 282, wings 284, engines 286, and the tail 288. As shown in FIG. 17, the tail 288 comprises a vertical stabilizer 290 and horizontal stabilizers 292. The one or more structures 40, such as the one or more aircraft structures 42, may comprise wing panels, fuselage panels, tail panels, or other suitable aircraft panels, that may comprise composite structures, such as carbon fiber reinforced plastic (CFRP) structures, or another type of composite structure, that may comprise metal structures, such as aluminum, steel, or another type of metal structure, or that may comprise a combination of composite and metal structures.

FIG. 17 further shows a lightning strike 294 striking a wing 284, and the structure 40, such as the aircraft structure 42 installed in the wing 284 can include one or more fastener and washer assemblies 14 (see FIG. 1), such as one or more aircraft fastener and conductive washer assemblies 14*a* (see FIGS. 1, 7-9), that can distribute or transfer current 144, or energy, in a current path 144*a*, from the lightning strike 294 made to the aircraft structure 42, through the fastener and washer assembly 14, such as the aircraft fastener and conductive washer assembly 14*a*, to the aircraft structure 42. The lightning strike 294 may also strike the fuselage 282, tail 288, or other areas of the aircraft 280*a*, and the one or more aircraft fastener and conductive washer assemblies 14*a* (see FIGS. 1, 7-9) can be used in the fuselage 282, tail 288, or other areas of the aircraft 280*a*, to distribute or transfer current 144, or energy, in a current path 144*a*, from the lightning strike 294 made to the aircraft structure 42, through the aircraft fastener and conductive washer assembly 14*a*, to the aircraft structure 42.

Although the aircraft 280*a* shown in FIG. 17 is generally representative of a commercial passenger aircraft having one or more aircraft structures 42, the teachings of the disclosed versions of the automated fastener system 10 and the automated method 270 may be applied to fasteners 26, such as aircraft fasteners 28, joining structures 40, such as aircraft structures 42, for other passenger aircraft. Moreover, the teachings of the disclosed versions of the automated fastener system 10 and the automated method 270 may be applied to fasteners 26 joining structures 40, such as aircraft structures 42, for cargo aircraft, military aircraft, rotorcraft, and other types of aircraft or aerial vehicles, as well as aerospace vehicles, spacecraft, satellites, space launch vehicles, rockets, and other aerospace vehicles. Further, the teachings of the disclosed versions of the automated fastener system 10 and the automated method 270 may be applied to fasteners 26 joining structures 40 such as watercraft, automobiles, trains, architectural structures, or other suitable vehicles or structures.

Figure 18:
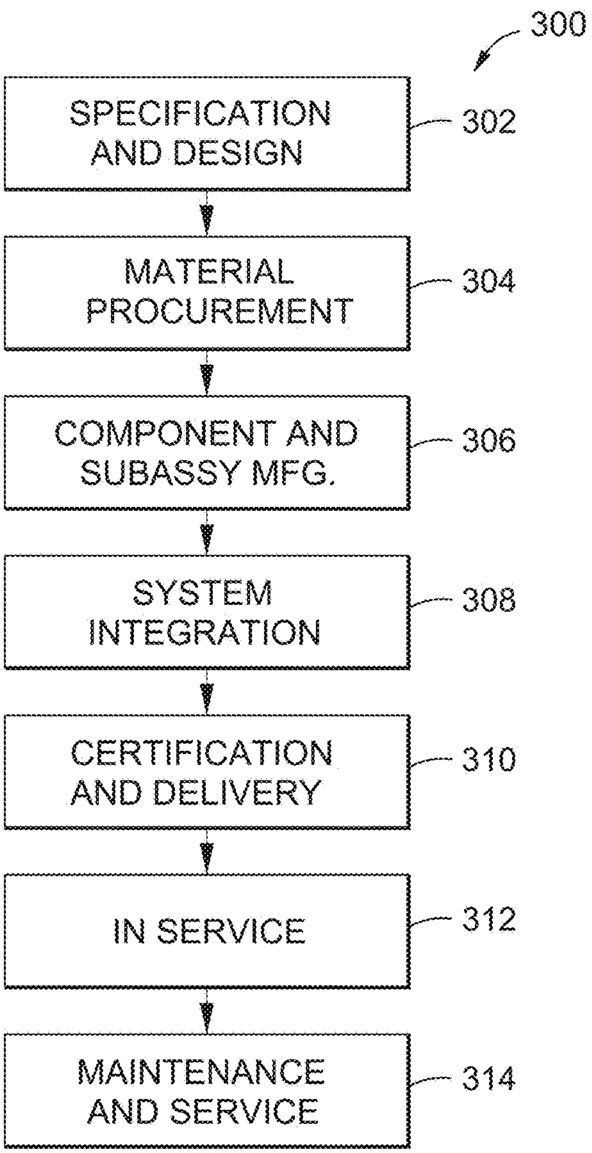
FIG. 18 is an illustration of a flow diagram of an exemplary aircraft manufacturing and service method.
Figure 19:
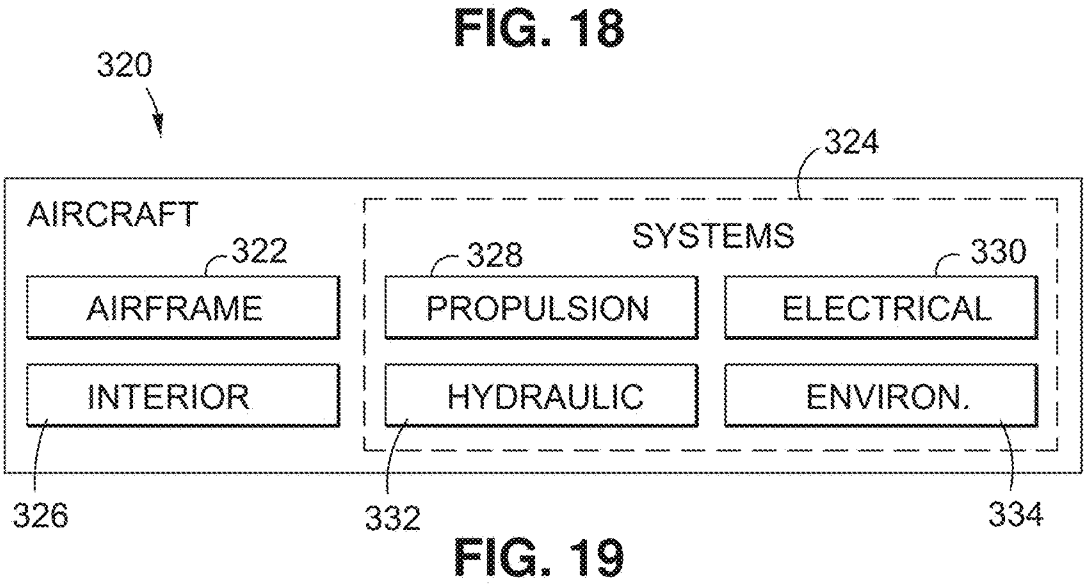
FIG. 19 is an illustration of an exemplary block diagram of an aircraft.

Now referring to FIGS. 18 and 19, FIG. 18 is an illustration of a flow diagram of an exemplary aircraft manufacturing and service method 300, and FIG. 19 is an illustration of an exemplary block diagram of an aircraft 316. Referring to FIGS. 18 and 19, versions of the disclosure may be described in the context of the aircraft manufacturing and service method 300 as shown in FIG. 18, and the aircraft 316 as shown in FIG. 19.

During pre-production, exemplary aircraft manufacturing and service method 300 may include specification and design 302 of the aircraft 316 and material procurement 304. During manufacturing, component and subassembly manufacturing 306 and system integration 308 of the aircraft 316 takes place. Thereafter, the aircraft 316 may go through certification and delivery 310 in order to be placed in service 312. While in service 312 by a customer, the aircraft 316 may be scheduled for routine maintenance and service 314 (which may also include modification, reconfiguration, refurbishment, and other suitable services).

Each of the processes of the aircraft manufacturing and service method 300 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 19, the aircraft 316 produced by the exemplary aircraft manufacturing and service method 300 may include an airframe 318 with a plurality of systems 320 and an interior 322. Examples of the plurality of systems 320 may include one or more of a propulsion system 324, an electrical system 326, a hydraulic system 328, and an environmental system 330. Any number of other systems may be included. Although an aerospace example is shown, the principles of the disclosure may be applied to other industries, such as automotive.

Methods and systems embodied herein may be employed during any one or more of the stages of the aircraft manufacturing and service method 300. For example, components or subassemblies corresponding to component and subassembly manufacturing 306 may be fabricated or manufactured in a manner similar to components or subassemblies produced while the aircraft 316 is in service 312. Also, one or more apparatus embodiments, method embodiments, or a combination thereof, may be utilized during component and subassembly manufacturing 306 and system integration 308, for example, by substantially expediting assembly of or reducing the cost of the aircraft 316. Similarly, one or more of apparatus embodiments, method embodiments, or a combination thereof, may be utilized while the aircraft 316 is in service 312, for example and without limitation, to maintenance and service 314.

Disclosed versions of the automated fastener system 10 (see FIG. 1) and the automated method 270 (see FIG. 16B) provide for automated washer installation 12 (see FIG. 1) and assembly and coupling of washers 16 (see FIG. 1), such as aircraft washers 18, and fasteners 26 (see FIG. 1), such as aircraft fasteners 28 (see FIG. 1), to obtain fastener and washer assemblies 14, such as aircraft fastener and conductive washer assemblies 14*a*. The fastener and washer assembly 14 disclosed herein provides a simple and effective system and method to enable transfer of current 144 (see FIG. 17), or energy, through the metal material 56 or metal alloy material 58 of the fastener 26, such as the metal fastener, through the metal material 56 or metal alloy material 58 of the washer 16, such as the conductive washer 20, and a highly conductive washer, for example, a copper washer, a silver washer, an aluminum washer, a brass washer, a gold washer, or another highly conductive washer, to the fibers of the composite material, and into the structure 40 itself, such as the aircraft structure 42, regardless of the fastener 26 to hole 126 (see FIG. 3A) fit in the structure 40. The washer 16, such as the conductive washer 20, made of a conductive material 54 (see FIG. 1), like copper 56*a* (see FIG. 1), under the fastener head 160 (see FIGS. 2A, 4A) of the fastener 26 (see FIGS. 2A, 4A), is used to transfer current 144 (see FIG. 17), or energy, from the lightning strike 294 (see FIG. 17) fully from the fastener head 160 to the composite fibers 43 (see FIG. 1) of the main structure 40. The washer 16 (see FIGS. 1, 2A, 4A) is made of a highly conductive material, such as a metal material 56 (see FIG. 1) or a metal alloy material 58 (see FIG. 1), and is installed under the fastener head 160 (see FIGS. 2A, 4A). The washer 16, such as the conductive washer 20 (see FIG. 1), distributes the high current 144, or energy, from a lightning strike 294 from the fastener 26 to the main structure 40, such as the aircraft structure 42, for example, a panel or skin of a wing 284 (see FIG. 17), to disburse or distribute the current 144, or energy. This prevents an ignition source, for example, from entering an aircraft fuel tank in the wing 284. The highly conductive washer 20 acts as a large surface area to distribute the current 144, or the energy, out into the multiple layers of the structure 40 and into the surface of the structure 40, such as the aircraft structure 42, for example, the composite aircraft structure 42*a* (see FIG. 17). This could also be combined with copper foil within the composite layup layer or layers to spread the current 144, or energy, even more.

The washer 16 fully contacts the fastener 26 under the fastener head 160 and the structure 40 itself. Countersunk washers 22 (see FIGS. 1, 2A) for countersunk fasteners 30 (scc FIGS. 1, 2A) contact the full depth and surface of the countersunk angled portions 195 (see FIG. 3A). Chamfer washers 25 (see FIGS. 1, 4A) for protruding head fasteners 32 (see FIGS. 1, 4A) contact the surface under the protruding fastener head 160*b* (see FIG. 4B) and the structure top portions 40*a* (see FIGS. 4A-4B) of the structure 40. The chamfer washer 25 may be the symmetrical chamfer washer 25*a* (see FIG. 5A) or the nonsymmetrical chamfer washer 25*b* (see FIG. 5B). The symmetrical chamfer washer 25*a* eliminates the need to orient the symmetrical chamfer washer 25*a* relative to the protruding head fastener 32 (see FIG. 4B) and the structure 40 (see FIG. 4B). Conducting the current 144, or energy, through the fastener head 160 to the washer 16 into the structure 40, such as the aircraft structure 42, allows flexibility of the fastener 26 both in the material or coating and the fit to the hole 126 (see FIGS. 1, 3A). This allows more flexibility in design and manufacturing, as well as improved safety regarding electromagnetic effects (EME) and other electrical events, reducing additional mitigations, such as fastener cap seals, that add weight, time, and complexity. Successful distribution of the current 144, or energy, along the outer surface layers of the structure 40, such as the aircraft structure 42, may eliminate the need for excess features, for example, fastener cap seals, edge seals, electrically insulating coatings or sealants, or other additional fastener materials. This further improves manufacturing, efficiency, such as reduced weight, sustainability, and maintenance of the structure 40, such as the aircraft structure 42.

The automated fastener system 10 (see FIG. 1) and the automated method 270 (see FIG. 16B) provide for an improved fastener system and method that is automated and provides automated washer installation 12 of washers 16, such as conductive washers 20, onto fasteners 26, such as metal fasteners, that can be used for electromagnetic effects (EME) applications across multiple models of aircraft 280*a* (see FIG. 17), that do not require special fastener materials having multiple pieces, that do not require electrically insulating coatings or sealants and the use of fastener cap seals, that save weight, and that provide advantages over known fastener systems and methods. The automated fastener system 10 with the automated washer installation 12 can improve design solutions, reduce manufacturing and performance impacts from multiple known methods, and improve sustainability and maintenance.

In addition, the automated installation of the washer 16, such as the conductive washer 20, can incorporate multiple in-process quality assurances. These include the washer orientation system 72 (see FIG. 1), the washer type determination system 80, and the washer material verification system 86 (see FIG. 1), and ensures proper installation 38 (see FIG. 9) in the structure 40, such as the aircraft structure 42. The automated washer installation 12 and verification methods can be incorporated across multiple models of aircraft 280*a* for any washer 16 installation, including the electromagnetic effects (EME) conductive washer 20. The automated fastener system 10 and the automated method 270 (see FIG. 16B) may be used for any washer 16 under the fastener head 160 and not just conductive electromagnetic effects (EME) conductive washers 20.

In one version, the automated fastener system 10 (see FIG. 1) and the automated method 270 (see FIG. 16B) assembles a conductive washer 20 with a fastener 26, such as an aircraft fastener 28, with the automated washer installation 12. The washer 16 is constructed of a conductive material 54, such as copper 56*a* (see FIG. 1), and/or coated with a conductive coating 53 (see FIG. 1), and transfers the current 144 from the lightning strike 294 (see FIG. 17) or other electromagnetic effects (EME) and electrical events, through the fastener 26, such as the metal fastener, to the composite fibers 43 (see FIG. 1) of the composite material of the composite aircraft structure 42*a* (see FIG. 17), into the overall structure 40, such as the aircraft structure 42, for example, the composite aircraft structure 42*a*, itself, regardless of the fastener 26 to hole 126 fit in the structure 40. The conductive washer 20 is installed with the fastener 26 using the automated fastener system 10 and the automated method 270 to ensure the installation 38 (see FIG. 1) and the proper orientation of the washer 16, such as the conductive washer 20. In the automated fastener system 10 for pulling a fastener 26, the automated washer feed system 60 (see FIGS. 1, 7-9) transfers the washer 16 to either the shuttle cup 68 of the automated shuttle assembly 70 (see FIGS. 1, 7, 8) or to the holder 66 (see FIG. 9), such as the cup holder 66*b* (see FIG. 9). The shuttle cup 68 or the holder 66 is transferred to the fastener 26, where the fastener 26 is inserted into the washer 16 in the shuttle cup 68 or the holder 66. This step may occur before or after inspection of the fastener 26 by the automated inspection system 94. The inspection gripper fingers 96*a* are used for inspection and may lift the fastener 26, such as the selected fastener 26*a*, or the fastener and washer assembly 14, from its position and transfers it to another location. The automated fastener system 10 continues work by pulling a second fastener 26, such as a selected fastener 26*a*, and performing its inspections. The automated fastener system 10 notifies a machine operator or a user of rejections of a fastener 26.

Many modifications and other versions of the disclosure will come to mind to one skilled in the art to which this disclosure pertains having the benefit of the teachings presented in the foregoing descriptions and the associated drawings. The versions described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

The invention claimed is:

1. An automated fastener system having automated washer installation, the automated fastener system comprising:

an automated washer feed system holding and dispensing one or more washers, and providing a selected washer for the automated washer installation;

an automated fastener holder assembly holding and dispensing one or more fasteners, and providing a selected fastener for the automated washer installation, wherein with the automated washer installation, the selected fastener is inserted in the selected washer, so that the selected washer is in contact with, and positioned under, a fastener head of the selected fastener, to obtain a fastener and washer assembly;

an automated shuttle assembly having one or more shuttle cups, wherein a selected shuttle cup receives and transports one of, the selected washer from the automated washer feed system, the selected fastener from the automated fastener holder assembly, or the fastener and washer assembly;

an automated inspection system having two or more inspection gripper fingers configured to pick up, to inspect, and to release one of, the selected fastener, or the fastener and washer assembly;

an automated delivery system having a delivery device configured to transport one or more of, the selected fastener, the selected washer, or the fastener and washer assembly;

an automated installation system having an end effector with two or more end effector gripper fingers configured to pick up from the delivery device, one or more of, the selected fastener, the selected washer, or the fastener and washer assembly, and further configured to install the fastener and washer assembly in a structure; and a control system comprising at least a controller, one or more power supplies, and a computer system, the control system configured to control the automated fastener system and the automated washer installation, wherein the automated washer installation is performed at one or more of, before inspection of the selected fastener by the automated inspection system, after inspection of the selected fastener by the automated inspection system, or after delivery of the selected fastener and the selected washer by the automated delivery system to the automated installation system.

2. The automated fastener system of claim 1, wherein each of the one or more washers is a conductive washer.

3. The automated fastener system of claim 1, wherein each of the one or more washers is one of:

a countersunk washer; or a chamfer washer, including a symmetrical chamfer washer, or a nonsymmetrical chamfer washer.

4. The automated fastener system of claim 1, wherein the automated washer feed system comprises a washer orientation system, to orient and position one of, a countersunk washer, or a nonsymmetrical chamfer washer, for transfer and insertion into one of, a selected holder, or the selected shuttle cup.

5. The automated fastener system of claim 1, wherein the automated washer feed system comprises a washer type determination system, to determine whether each of the one or more washers is a countersunk washer, or a chamfer washer.

6. The automated fastener system of claim 1, wherein the automated washer feed system comprises a washer material verification system, to verify a base washer material of the selected washer.

7. The automated fastener system of claim 1, wherein the automated installation system further comprises an alignment assembly, to align the fastener and washer assembly with a hole in the structure, and to maintain an alignment position of the fastener and washer assembly, until the selected fastener is partially inserted through the hole in the structure and partially installed in the structure.

8. The automated fastener system of claim 1, wherein each of the one or more washers comprises a base washer material comprising:

a metal material, including copper, aluminum, nickel, steel, titanium, silver, zinc, or gold; or a metal alloy material, including a copper alloy, a nickel-chromium alloy, brass, bronze, a titanium alloy, an aluminum alloy, a nickel alloy, a steel alloy, a silver alloy, a zinc alloy, or a gold alloy.

9. The automated fastener system of claim 1, wherein each of the one or more fasteners comprises one or more of, a countersunk fastener, a protruding head fastener, a clearance fit fastener, an interference fit fastener, or a transition fit fastener.

10. The automated fastener system of claim 1, wherein the structure comprises an aircraft structure, and the fastener and washer assembly comprises an aircraft fastener and conductive washer assembly, and further wherein, when the aircraft fastener and conductive washer assembly is installed in one or more of, wings, fuselage, or tail, of an aircraft, the aircraft fastener and conductive washer assembly is configured to distribute current from a lightning strike made to the aircraft structure, through the aircraft fastener and conductive washer assembly, to the aircraft structure.

11. An automated fastener system having automated washer installation, the automated fastener system comprising:

an automated washer feed system holding and dispensing one or more conductive washers, and providing a selected conductive washer for the automated washer installation;

an automated fastener holder assembly holding and dispensing one or more fasteners, and providing a selected fastener for the automated washer installation, wherein with the automated washer installation, the selected fastener is inserted in the selected conductive washer, so that the selected conductive washer is in contact with, and positioned under, a fastener head of the selected fastener, to obtain an aircraft fastener and conductive washer assembly;

an automated shuttle assembly having one or more shuttle cups, wherein a selected shuttle cup receives and transports one of, the selected conductive washer from the automated washer feed system, the selected fastener from the automated fastener holder assembly, or the aircraft fastener and conductive washer assembly;

an automated inspection system having two or more inspection gripper fingers configured to pick up, to inspect, and to release one of, the selected fastener, or the aircraft fastener and conductive washer assembly;

an automated delivery system having a delivery device configured to transport one or more of, the selected fastener, the selected conductive washer, or the aircraft fastener and conductive washer assembly;

an automated installation system having an end effector with two or more end effector gripper fingers configured to pick up from the delivery device, one or more of, the selected fastener, the selected conductive washer, or the aircraft fastener and conductive washer assembly, and further configured to install the aircraft fastener and conductive washer assembly in an aircraft structure; and a control system comprising at least a controller, one or more power supplies, and a computer system, the control system configured to control the automated fastener system and the automated washer installation, wherein the automated washer installation is performed at one or more of, before inspection of the selected fastener by the automated inspection system, after inspection of the selected fastener by the automated inspection system, or after delivery of the selected fastener and the selected conductive washer by the automated delivery system to the automated installation system.

12. The automated fastener system of claim 11, wherein each of the one or more conductive washers is one of:

a countersunk washer; or a chamfer washer, including a symmetrical chamfer washer, or a nonsymmetrical chamfer washer.

13. The automated fastener system of claim 11, wherein the automated washer feed system comprises a washer type determination system, to determine whether each of the one or more conductive washers is a countersunk washer, or a chamfer washer.

14. The automated fastener system of claim 11, wherein the automated installation system further comprises an alignment assembly, to align the aircraft fastener and conductive washer assembly with a hole in the aircraft structure, and to maintain an alignment position of the aircraft fastener and conductive washer assembly, until the selected fastener is partially inserted through the hole in the aircraft structure and partially installed in the aircraft structure.

15. The automated fastener system of claim 11, wherein each of the one or more conductive washers comprises a base washer material comprising:

a metal material, including copper, aluminum, nickel, steel, titanium, silver, zinc, or gold; or a metal alloy material, including a copper alloy, a nickel-chromium alloy, brass, bronze, a titanium alloy, an aluminum alloy, a nickel alloy, a steel alloy, a silver alloy, a zinc alloy, or a gold alloy.

16. The automated fastener system of claim 11, wherein the aircraft structure comprises one or more of, wings, fuselage, or tail, of an aircraft.

17. An automated fastener system having automated washer installation, the automated fastener system comprising:

an automated washer feed system holding and dispensing one or more conductive washers, and providing a selected conductive washer for the automated washer installation, the automated washer feed system comprising:

a washer orientation system;

a washer type determination system; and a washer material verification system;

an automated fastener holder assembly holding and dispensing one or more fasteners, and providing a selected fastener for the automated washer installation, wherein with the automated washer installation, the selected fastener is inserted in the selected conductive washer, so that the selected conductive washer is in contact with, and positioned under, a fastener head of the selected fastener, to obtain an aircraft fastener and conductive washer assembly;

an automated shuttle assembly having one or more shuttle cups, wherein a selected shuttle cup receives and transports one of, the selected conductive washer from the automated washer feed system, the selected fastener from the automated fastener holder assembly, or the aircraft fastener and conductive washer assembly;

an automated inspection system having two or more inspection gripper fingers configured to pick up, to inspect, and to release one of, the selected fastener, or the aircraft fastener and conductive washer assembly;

an automated delivery system having a delivery device configured to transport one or more of, the selected fastener, the selected conductive washer, or the aircraft fastener and conductive washer assembly;

an automated installation system having an end effector with two or more end effector gripper fingers configured to pick up from the delivery device, one or more of, the selected fastener, the selected conductive washer, or the aircraft fastener and conductive washer assembly, and further configured to install the aircraft fastener and conductive washer assembly in an aircraft structure, the automated installation system further having an alignment assembly, to align the aircraft fastener and conductive washer assembly with a hole in the aircraft structure, and to maintain an alignment position of the aircraft fastener and conductive washer assembly, until the selected fastener is partially inserted through the hole in the aircraft structure and partially installed in the aircraft structure; and a control system comprising at least a controller, one or more power supplies, and a computer system, the control system configured to control the automated fastener system and the automated washer installation, wherein the automated washer installation is performed at one or more of, before inspection of the selected fastener by the automated inspection system, after inspection of the selected fastener by the automated inspection system, or after delivery of the selected fastener and the selected conductive washer by the automated delivery system to the automated installation system.

18. The automated fastener system of claim 17, wherein each of the one or more conductive washers is one of:

a countersunk washer; or a chamfer washer, including a symmetrical chamfer washer, or a nonsymmetrical chamfer washer.

19. The automated fastener system of claim 17, wherein the automated inspection system comprises a camera and a laser scanner.

20. The automated fastener system of claim 17, wherein the automated delivery system comprises a delivery shuttle and a vacuum tube to transport the delivery shuttle.

* * * * *